United States Patent [19]

Sayward

[11] Patent Number: 5,712,712
[45] Date of Patent: Jan. 27, 1998

[54] RAPID DELIVERY OF FACSIMILE OR OTHER DATA SETS TO A MASSIVE NUMBER OF RECIPIENTS

[75] Inventor: Frederick G. Sayward, Branford, Conn.

[73] Assignee: Rapidata Systems, Inc., Durham, Conn.

[21] Appl. No.: 456,544

[22] Filed: Jun. 1, 1995

[51] Int. Cl.$^6$ .............................. H04N 1/00; H04N 1/32
[52] U.S. Cl. ...................... 358/403; 358/442; 358/468; 358/434; 370/60; 395/200.15
[58] Field of Search .................. 358/403, 407, 358/402, 440, 468, 442, 405, 434; 395/200.15; 370/60, 61.1, 94.3, 94.2, 94.1; 379/100, 98, 202, 205

[56] References Cited

U.S. PATENT DOCUMENTS

| | | | |
|---|---|---|---|
| 3,678,180 | 7/1972 | Bond | 348/6 |
| 4,558,369 | 12/1985 | Shinohara et al. | 380/18 |
| 4,649,533 | 3/1987 | Chorley et al. | 379/94 |
| 4,918,722 | 4/1990 | Duehren et al. | 379/100 |
| 4,922,348 | 5/1990 | Gillon et al. | 358/407 |
| 4,932,026 | 6/1990 | Dev et al. | 370/94.1 |
| 4,994,926 | 2/1991 | Gordon et al. | 358/440 |
| 5,040,077 | 8/1991 | Hamano et al. | 358/407 |
| 5,050,006 | 9/1991 | Ogawa | 358/440 |
| 5,057,935 | 10/1991 | Williams | 358/402 |
| 5,079,767 | 1/1992 | Perlman | 370/94.3 |
| 5,146,348 | 9/1992 | Kaneyama | 358/407 |
| 5,170,428 | 12/1992 | Watanabe et al. | |
| 5,196,843 | 3/1993 | Yoshino | 340/825.52 |
| 5,245,609 | 9/1993 | Ofek et al. | 370/94.3 |
| 5,257,112 | 10/1993 | Okada | 358/402 |
| 5,287,202 | 2/1994 | Kumarappan | 358/440 |
| 5,289,460 | 2/1994 | Drake, Jr. et al. | 370/94.3 |
| 5,291,302 | 3/1994 | Gordon et al. | 358/400 |
| 5,291,477 | 3/1994 | Liew | 370/94.3 |
| 5,331,637 | 7/1994 | Francis et al. | 370/94.3 |
| 5,355,371 | 10/1994 | Auerback | 370/94.3 |
| 5,384,835 | 1/1995 | Wheeler et al. | 358/442 |
| 5,408,526 | 4/1995 | McFarland et al. | 379/202 |
| 5,459,729 | 10/1995 | Bodner et al. | 370/94.3 |
| 5,461,488 | 10/1995 | Witek | 358/440 |
| 5,473,608 | 12/1995 | Gagne et al. | 370/94.3 |
| 5,488,608 | 1/1996 | Flammer, III | 370/94.3 |
| 5,488,651 | 1/1996 | Giller et al. | 358/407 |
| 5,491,690 | 2/1996 | Alfonsi et al. | 370/94.3 |

Primary Examiner—Edward L. Coles, Sr.
Assistant Examiner—Fan Lee
Attorney, Agent, or Firm—St. Onge Steward Johnston & Reens LLC

[57] ABSTRACT

A method and apparatus for rapid delivery of facsimile or other data sets to a massive number of recipients is disclosed. In accordance with the invention, the data set is distributed and delivered by a number of general purpose computers. A scheduling computer defines the paths for communicating the data set via a plurality of general purpose computers. A broadcasting job comprising the fax to be delivered and the distribution instructions for a first GP computer and the other GP computers in its assigned path is delivered to a first general purpose computer. The first general purpose computer communicates a portion of its fax broadcast job to a second GP computer. The broadcast job is distributed in an exponential tree having at least two, and preferably many, levels. Through the use of an exponential distribution tree, the fax is delivered quickly through the use of many general purpose computers.

15 Claims, 36 Drawing Sheets

Master Fax Job Scheduling Software

Data Transmission Package

Data Delivery Software

Figure 5   Data Receive Software

Fax Delivery Software

Control Software -- GP Computer

Figure 10  Fax Delivery Assignment Software

Time Driven Fax Delivery Assignment Software

Time Primary, Cost Secondary Fax Delivery Assignment Software

Cost Primary, Time Secondary
Fax Delivery Assignment Software

1301 ——— ①      1    $(X + Y)^0$
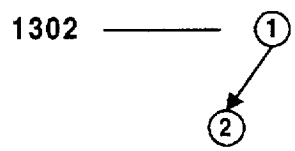
1302 ——— 1    $(X + Y)^1$
             1
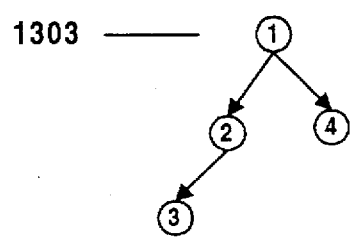
1303 ——— 1    $(X + Y)^2$
             2
             1
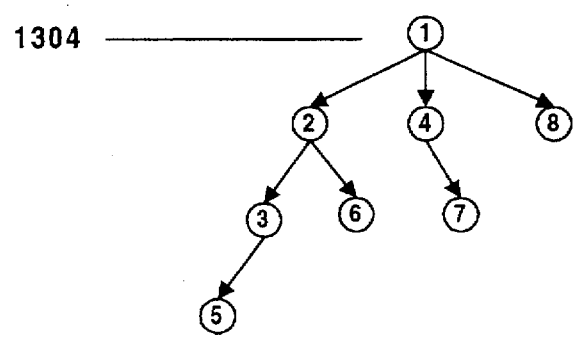
1304 ——————— 1    $(X + Y)^3$
             3
             3
             1
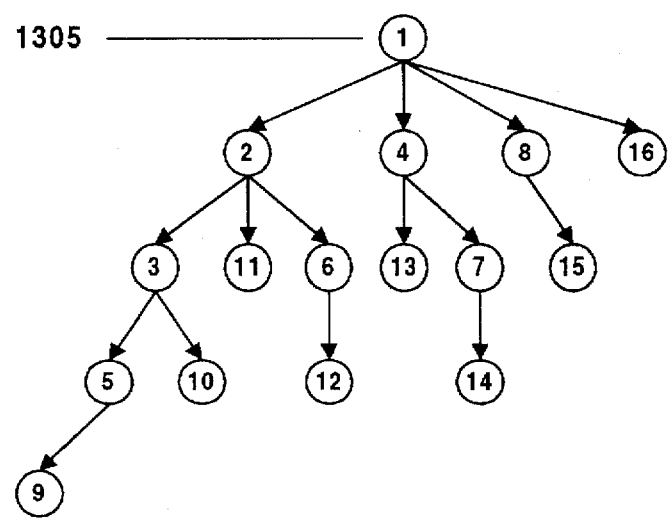
1305 ——————— 1    $(X + Y)^4$
             4
             6
             4
             1
Figure 13

Master Fax Job Scheduling Software

Time Driven DBT Node Association Software

Cost Conscious DBT Node Association Software

DBT Node Pruning Software

Scheduling Computer Extensions to
the Data Receive Software

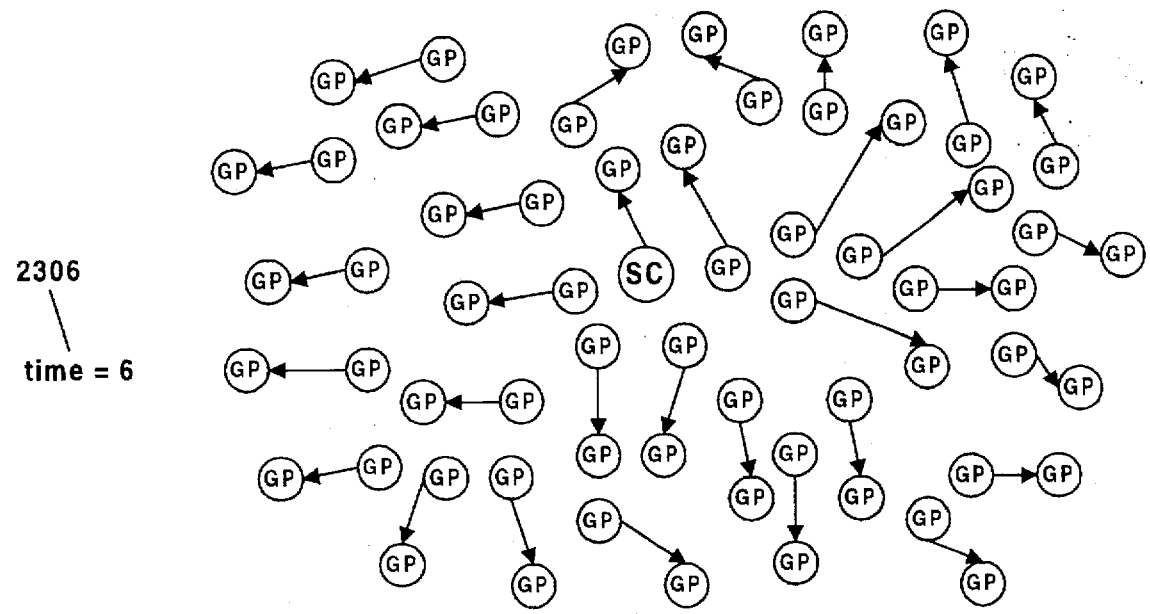
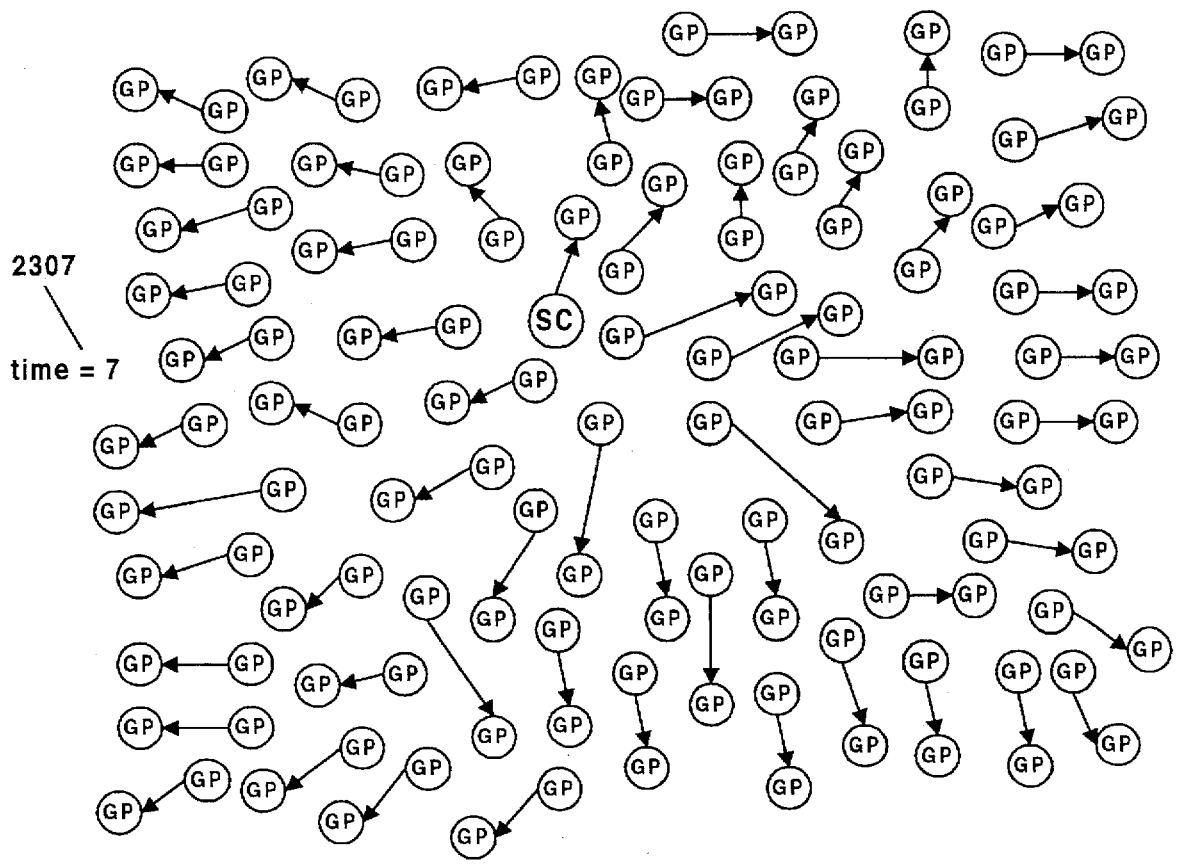
Figure 23b

Fax Broadcast Job Handler Software

Completion Notice Handler Software

Error Notice Handler Software

Control Software -- Scheduling Computer

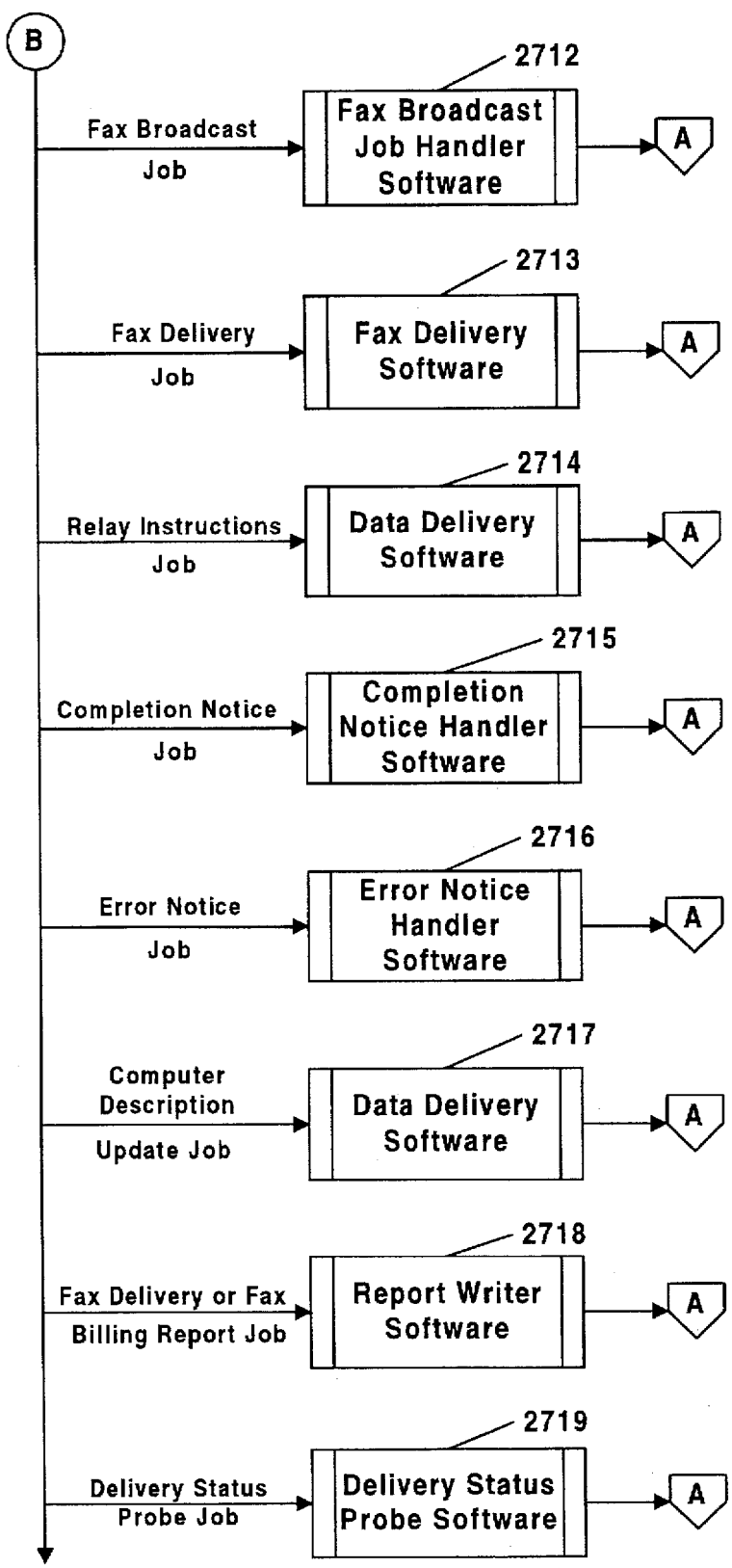
Figure 27b  Control Software -- Scheduling Computer

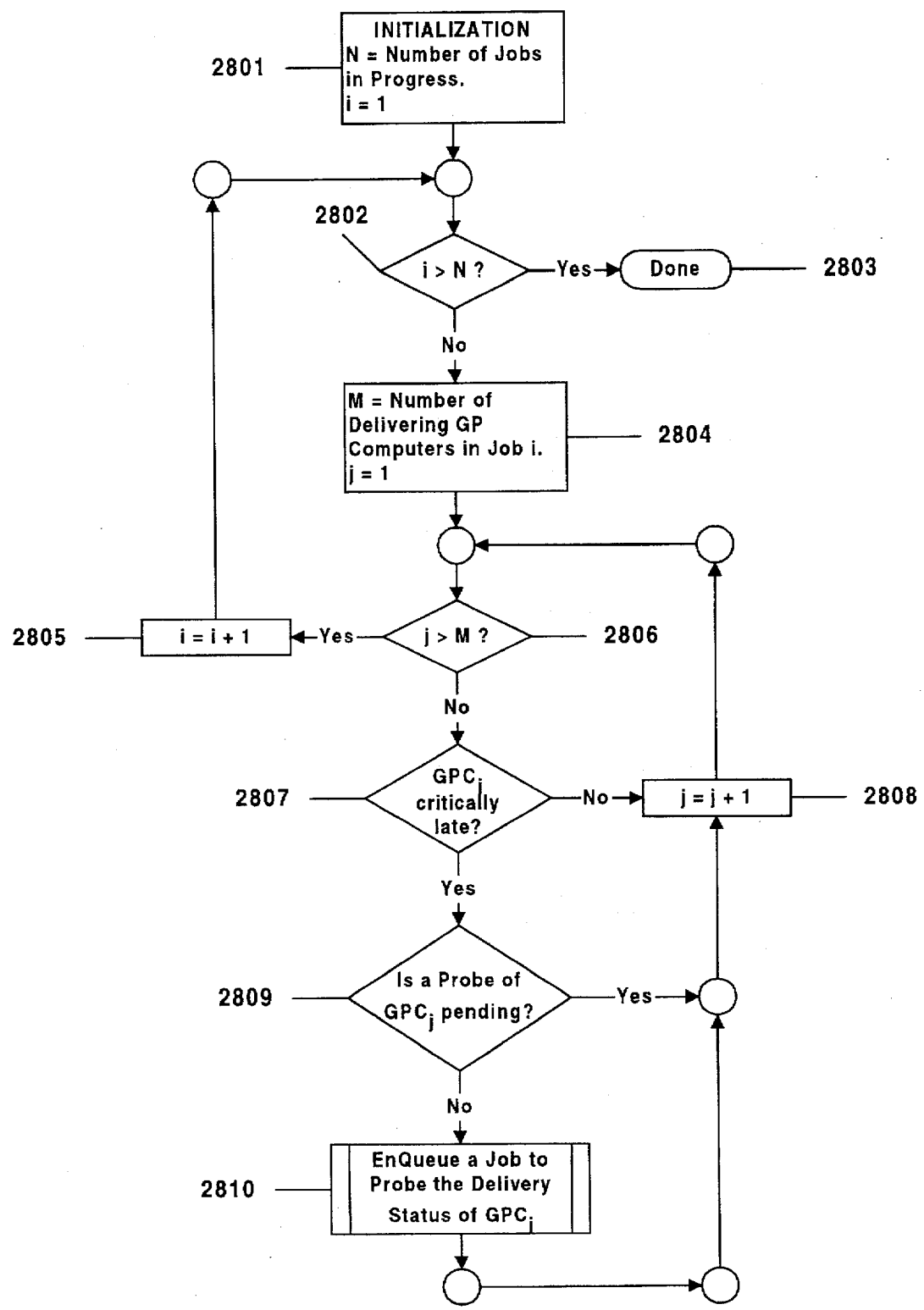
Figure 28  Fax Jobs Progress Monitoring Software

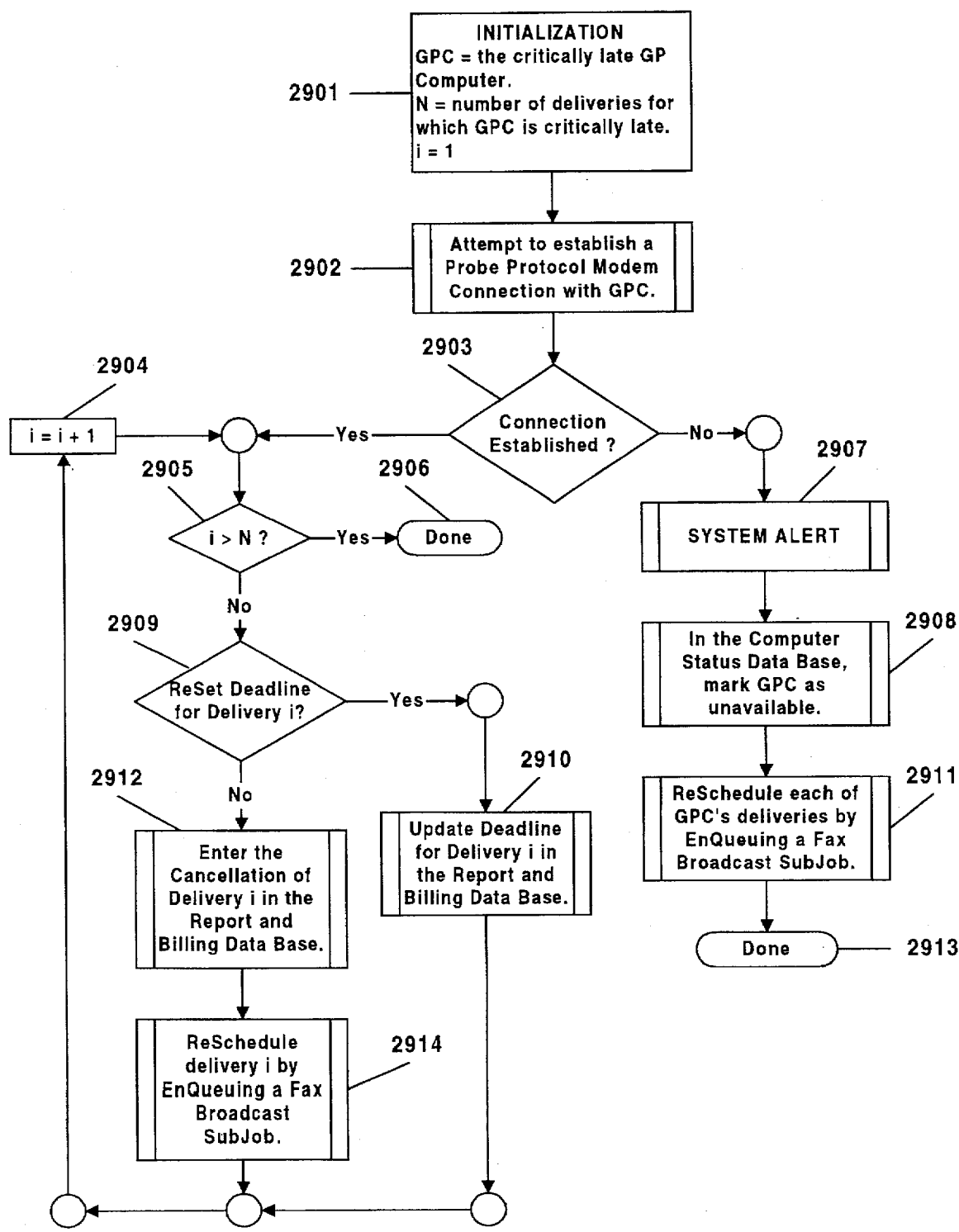
Figure 29      Delivery Status Probe Software

Single Scheduling Computer with Multiple GP Computers

Multiple Scheduling Computers

RAPID DELIVERY OF FACSIMILE OR OTHER DATA SETS TO A MASSIVE NUMBER OF RECIPIENTS

FIELD OF THE INVENTION

The field of this invention is telecommunications systems used for the distribution and delivery of data. More specifically, the invention relates to delivering facsimile data to a multitude of recipients, a process called "fax broadcast" in the art. The term "fax" is used interchangeable with the term "facsimile" throughout. Compared to conventional fax broadcast methods, the method and apparatus of this invention dramatically reduce the following parameters when there are a massive number of recipients: (1) the time required to broadcast a fax, (2) the cost required to broadcast a fax, as measured in public telephone network long distance charges, and (3) the capital cost of equipment by utilizing a large number of under utilized general purpose computers and computer communication media.

BACKGROUND OF THE INVENTION

There are several known methods which provide the ability to broadcast a facsimile document (fax) from a single source to a multitude of fax recipients. These methods include:

- Facsimile machines with memory and processors for storing scanned fax documents and for transmitting such in an unattended mode of operation,
- Broadcast features in fax software for personal workstation computers equipped with fax modems,
- Broadcast features in the software which controls fax server computing equipment, and
- Broadcast options offered by Telcoms which supply faxing services.

Each method has inherent limitations and problems. For example, when a fax machine is in broadcast mode other outgoing faxes must queue up and wait, and any incoming faxes will detect the busy signal for a prolonged period of time.

Further, each of the above methods is bandwidth limited and can require several hours, or in extreme cases several days, to broadcast a multipage document from a single source to a moderate or large number of recipients. The principal reason for using fax broadcast over other means of distributing documents, such as US Mail or Express Courier, is the criticality of putting the document into the hands of all recipients as rapidly as possible. Unless the fax document delivery capacity is sufficient, other means will be used. By utilizing a multitude of fax servers, the fax broadcast services being offered by Telcoms have increased the fax broadcast capacity to thousands per hour for moderately sized fax documents (3–5 pages of text), and thus have broadened the domain of fax broadcasting practicality.

The problem of broadcasting a fax document from a single source to hundreds of thousands of recipients within an hour, or to millions of recipients within a day, is well beyond the capacity of present methods. The methods presented in this invention provide a solution to this problem.

SUMMARY OF THE INVENTION

In accordance with the present invention, a method and apparatus for delivering facsimile or other data sets to a massive number of recipients is disclosed. The solution is to have a large number of computers, each with a modem, combine to deliver the fax or other data set to large numbers of recipients by having each computer deliver the fax or other data set to a few recipients.

As will be discussed in more detail below, the group of computers serves at least two functions, including distributing information and the fax or other data set to others in the group of computers, thus continually expanding the number of active computers by a geometric or other mathematical progression.

In accordance with one aspect of the invention, a method of delivering a fax to a group of recipients each having delivery instructions is disclosed. Each recipient has delivery instructions including salutation information and the delivery information from a scheduling computer via a plurality of general purpose computers.

Initially, the method includes providing a data base of cost and speed for communication between the general purpose computers. The method further includes partitioning the group of recipients into final delivery sets for delivery by the general purpose computers. Further, paths are defined for communicating the fax via a plurality of general purpose computers and assigning each delivery set to a delivery general purpose computer, utilizing the data base of cost and speed to determine the partitioning and paths according to an algorithm.

Initially, the scheduling computer communicates to one of the general purpose computers a broadcasting job comprising the fax to be delivered, the distribution instructions for the one general purpose computer first receiving the information and the other general purpose computers in the assigned paths of the one computer. The delivery instructions include the salutation information and the delivery information for each general purpose computer in the path of the first general purpose computer.

The one general purpose computer communicates to a second general purpose computer a portion of the broadcasting job received from the scheduling computer. The portion of the broadcasting job comprises the fax to be delivered, the distribution instructions for the second general purpose computer and any other general purpose computers in its assigned paths.

As can be appreciated, as each general purpose computer shares and distributes a portion of the broadcasting job assigned and determined by the scheduling computer, more and more computers become involved in distributing the fax and instructions, as well as eventually involved in the delivery of the fax itself.

Once the fax and the delivery instructions are received by a large number of general purpose computers, the general purpose computers deliver the fax, or other data set, as instructed by the scheduling computer.

As can be appreciated, because a mathematical progression involving a large number of general purpose computers is utilized, the information is distributed in a massive and quick manner.

In accordance with a further aspect of the invention, the scheduling computer contains speed and cost data which will enable the user to set priorities. More specifically, in some occasions, speed may be a critical factor and it may be desirable to optimize speed, at the expense of cost. In other situations, the user may wish to reduce the cost of distributing a fax or other data, and is not so concerned with speed. Thus, in the case where cost is a factor, the scheduling computer, including the cost data base, can calculate the cost of each transmission and attempt to select paths that incur the lowest telephone cost. Further, if it is desired, the user can select an algorithm that is a blend of cost, speed or other variables.

BRIEF DESCRIPTION OF THE DRAWINGS

FIG. 13 is a diagram illustrating the directed binomial tree data structure;

FIG. 23a illustrates the number of computers that will be distributing relay instructions as a result of the master fax job schedule at time quanta 1–5;

FIG. 23b illustrates the number of computers that will be distributing relay instructions as a result of the master fax job schedule at time quanta 6–7;

FIG. 27b is a flow chart describing the general steps required by the scheduling computer's software for controlling the processing of jobs on the scheduling computer;

FIG. 28 is a flow chart describing the general processing steps required by the scheduling computer's software to monitor the progress being made by GP computers that are assisting in processing fax broadcast jobs;

FIG. 29 is a flow chart describing the general processing steps required by the scheduling computer's software to determine and decide a course of action when a GP computer does not report on the completion of fax deliveries within a time deadline;

DETAILED DESCRIPTION OF THE INVENTION

Figure 1:
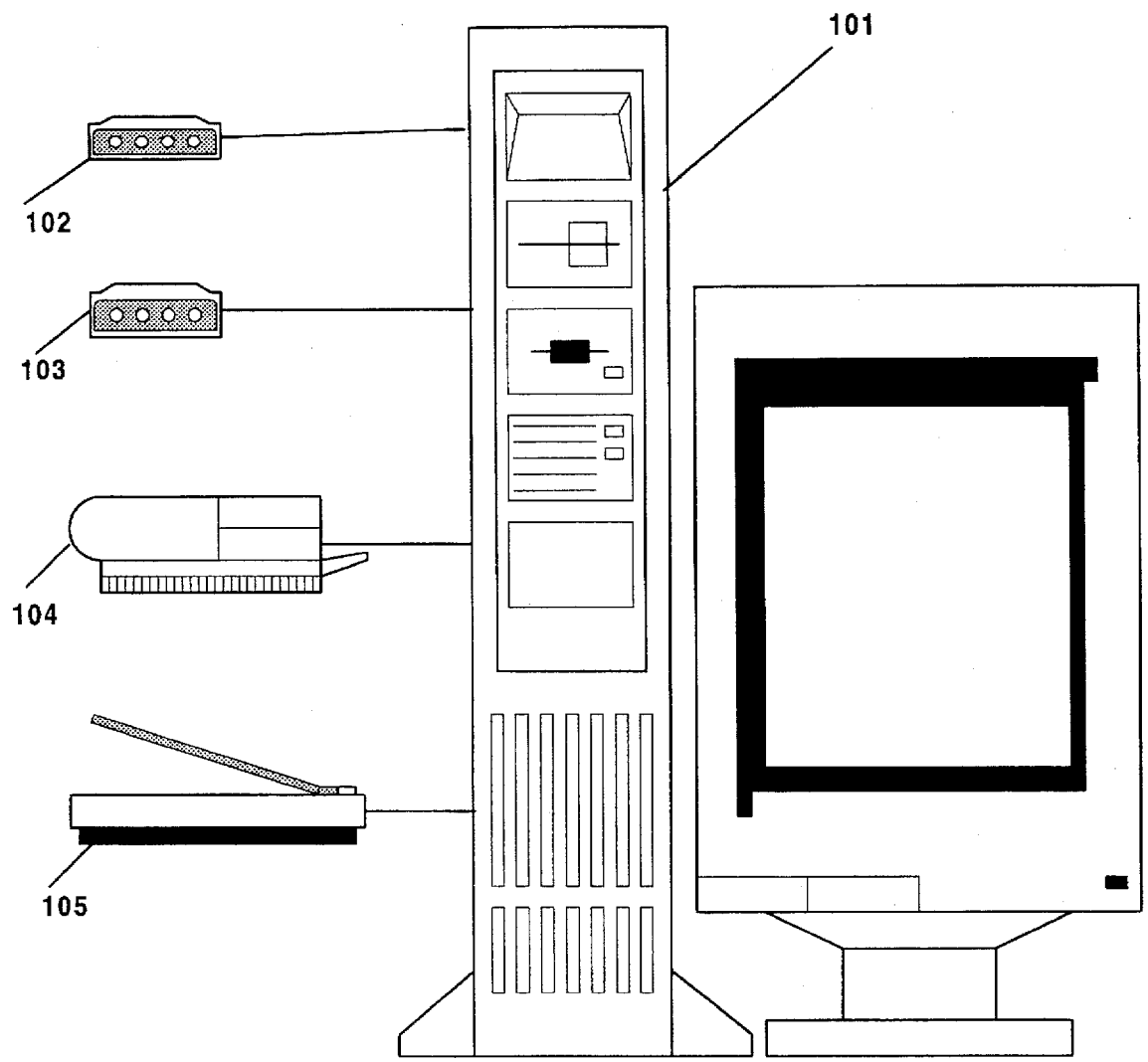
FIG. 1 is a schematic diagram that illustrates the components of a general purpose computer.

The methods defined in this invention are meant to be implemented as software which executes on general purpose (GP) computers like the one illustrated in FIG. 1, the simplest example being a personal computer. The GP computer 101 illustrated in FIG. 1 is an IBM compatible personal computer. It is representative of any desktop or tower model workstation commonly found today in great multitudes in the home, office, schools, small businesses and large corporations. Implicitly represented in the GP computer 101 are ROM, RAM, CPU, display adapter, monitor, keyboard, mouse, serial ports, parallel ports, storage controllers, hard disk, removable disk, CD ROM, tape drive, and LAN and WAN network interface cards. External asynchronous analog modems items 102 and 103 are attached to computer 101 by serial cables. These modems are capable of transmitting and receiving binary data over the public switched telephone network (PSTN). Also, the modems are capable of transmitting and receiving over the PSTN fax image data which is binary data structured in accordance with a fax transmission protocol. Internal modems are not shown in FIG. 1 since they have essentially the same capabilities as external modems. The methods of this invention are independent of the number of modems attached to the GP computers. A laser printer 104 can optionally be attached to a GP computer for printing reports. A document scanning device 105 can optionally be attached to a GP computer for scanning documents to be faxed.

The invention is described with respect to the distribution of fax image data. The invention is also useful for the distribution of various data sets, including voice messages and data files, and as memory and computer speeds are enhanced, music data, video data and motion picture data may be distributed.

A scheduling computer is essentially the same as a GP computer but has redundant and/or additional equipment in order to provide a higher degree of reliability, with an objective of being operational 24 hours a day, 7 days per week. Examples of such reliability techniques would be backup power sources such as batteries and power generators, standby computers, mirror image hard drives, dual controllers, standby modems, and standby PSTN subscriber lines.

One embodiment of this invention is a single scheduling computer and a set of GP computers. Each GP computer has a single attached fax modem whose use is multiplexed by the software for purposes of transmitting binary data, receiving binary data, and transmitting fax image data. Moreover, the single modem is the sole means of communicating with the scheduling computer. Likewise, in the first embodiment the single scheduling computer has a single attached fax modem that is multiplexed by the software for purposes of transmitting binary data, receiving binary data, and transmitting fax image data.

The following lists the software salient to this invention that executes on a GP computer:

Operating System

Job Queue Data Structure and Access Software

Data Delivery Software

Data Reception Software

Fax Delivery Software

Computer Description and Status Data Base and Access Software

Control Software

The Operating System comes packaged with a workstation computer and the features assumed in this invention include a hierarchical file system, sequential and random access file I/O, transparent scheduling of multiple processes, I/O device support, graphical user interface, printer driver, scanner driver, serial port driver, and LAN and WAN network drivers. The Job Queue Data Structure and Access Software will be detailed below in the discussion on FIG. 2. The Data Delivery Software uses the modem to deliver binary data to another computer and it will be detailed below in the discussion on FIG. 4. The Data Reception Software uses the modem to receive binary data from another computer and it will be detailed below in the discussions on FIGS. 5 and 17. The Fax Delivery Software uses the modem to deliver fax image data to a Fax Reception Device (FRD), which can be a fax machine or computer with attached fax modem, and the software will be detailed below in the discussion on FIG. 6. The Computer Description and Status Data Base and Access Software records a description and status of the GP computer and a description of the scheduling computer, and it will be described in detail below. The Control Software for a GP computer will be described in detail below in the discussion on FIG. 7.

The following lists the software salient to this invention that executes on a scheduling computer:

Operating System

Job Queue Data Structure and Access Software

Data Delivery Software

Data Reception Software

Fax Delivery Software

Computer Description and Status Data Base and Access Software

Telephone Number and Toll Rate Data Base and Access Software

Master Fax Job Scheduling Software

Completion Notice Handling Software

Error Notice Handling Software

Report and Billing Data Base, Access Software, and Report Writer Software

Fax Delivery Progress Monitoring Software

Control Software

The Operating System Software is similar to that of the GP computer but has enhancements to manage the redundant components used to provide the scheduling computer's high degree of operational reliability. The Job Queue Data Structure and Access Software, the Data Delivery Software, and the Fax Delivery Software are essentially the same as for the GP computer. The Data Reception Software is similar to that of the GP computers but it is extended to handle the reception of Fax Broadcast Jobs, as described below in the discussion on FIG. 22, and also to handle the reception of data that reports on job processing. The Computer Description and Status Data Base and Access Software is like its GP computer counterpart but is broadened to include information on each GP computer known to the scheduling computer. The Telephone Number and Toll Rate Data Base and Access Software records information on the cost of making telephone calls over the PSTN, and it will be described in detail below. The Master Fax Job Scheduling Software constructs the Instruction Relaying Jobs and the Fax Delivery Jobs used in rapidly delivering a Fax Document to a massive number of recipients with minimal cost, and it will be described in detail below in the discussions on FIGS. 8–16 and 18–21. The Completion Notice Handling Software processes Fax Delivery Completion Notices received from GP computers, and it will be described in detail below in the discussion on FIG. 25. The Error Notice Handling Software processes Relay Instruction Delivery Failure Notices, and it will be described in detail below in the discussion on FIG. 26. The Report and Billing Data Base, Access Software, and Report Writer Software summarizes the results of a Fax Broadcast Delivery and generates a bill for the service. This Data Base also has fields for recording and tracking the progress of all computers involved in processing a Fax Broadcast Job. Report and Billing Data Bases and Software are known art and details will not be presented. The Fax Delivery Progress Monitoring Software periodically checks that GP computers are reporting Fax Delivery Completion in a timely manner, and the scheduling computer will take remedial action if it determines a lack of timely progress. This software will be described in detail below in the discussions on FIGS. 28 and 29. The Control Software for the scheduling computer will be described in detail below in the discussions on FIG. 27a and 27b.

Figure 2A:
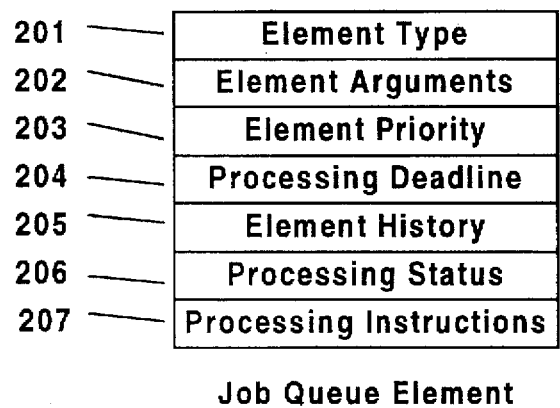
FIG. 2a is a diagram showing the format of a Job Queue Element.
Figure 2B:
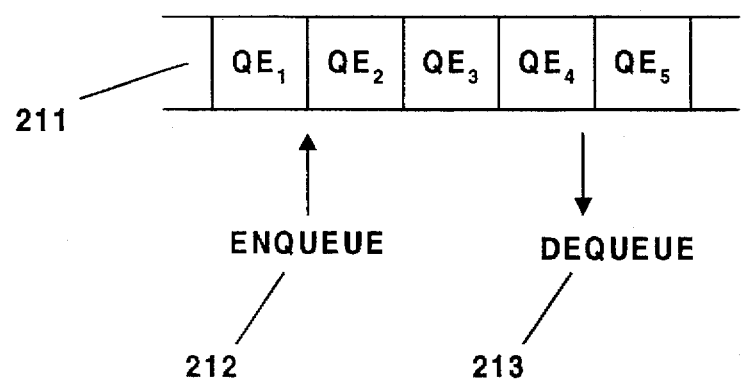
FIG. 2b is a diagram showing the software used to access a Job Queue.

Central to the operation of the software on the GP computers and on the scheduling computer is the notion of a Job Queue (JQ) as depicted in FIGS. 2a and 2b. FIG. 2a shows the data contained in a Job Queue Element (JQE). FIG. 2b illustrates that a Job Queue Data Structure 211 is a plurality of Job Queue Elements illustrated as $QE_1$ through $QE_5$. Each computer has a permanent JQ, the JQEs have finite life and at any time the JQ may contain zero, one, or more JQEs. There are two software modules, enqueue 212 and dequeue 213 used to manage a JQ. The details of enqueue software 212 and the dequeue software 213 are known to those skilled in telecommunications software. The enqueue software 212 places a JQE into the JQ while the dequeue software removes a JQE from the JQ, both software modules using a queuing discipline to determine how the JQ is to be manipulated. There are several queuing disciplines known in the art, the most common being the first-in-first-out (FIFO) discipline, the deadline scheduling discipline, and the highest priority discipline. The methods of this invention use the priority queuing discipline. When enqueuing a JQE, if no explicit priority is indicated, then the lowest level of priority is assigned to the JQE. In the present invention each JQE has a contained JQE type as indicated in item 201. The JQE types used in this invention are as follows:

a Fax Broadcast Job a Fax Delivery Job an Instructions Relaying Job a Completion Notice Job an Error Notice Job a Computer Description Update Job a Computer Status Update Job a Fax Delivery Status Probe Job a Fax Delivery Report Job a Fax Delivery Billing Job.

Item 202 indicates that a JQE may have zero, one, or more data arguments, stored outside the JQ itself, the exact count depending on the JQE element type. For example, a Fax Broadcast Job JQE would have three arguments: the Fax Document, Job Processing Parameters, and a list of Fax Recipients. Items 203–205 in FIG. 2a are used in implementing Queuing Disciplines. The processing of a JQE by a computer will in some cases, but not all, cause a transmission of binary data to another computer. A JQE may be partially processed and, if so, it would then be the subject of several enqueue and dequeue operations. Data to control this is recorded in the element history 205 and the processing status 206. The processing instructions 207 records JQE processing information such as other JQEs related to this JQE and such as actions to take in the case of failure when processing the JQE.

Figure 3:
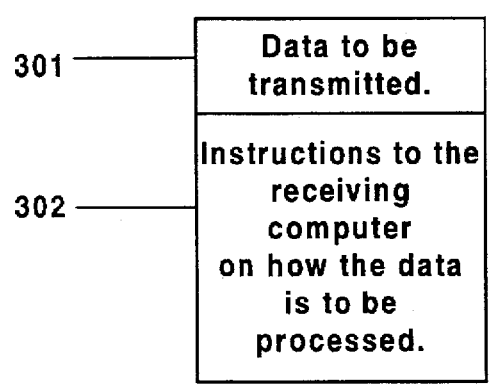
FIG. 3 is a diagram showing the format of a Data Transmission Package.

One central theme of the invention is for the scheduling computer to determine how a large Fax Broadcast Job can be optimally divided and assigned to the GP computers, and to determine how these assignments can be rapidly distributed to the GP computers. The Data Transmission Package (DTP), illustrated in FIG. 3, is the communication mechanism used to distribute such assignments. DTPs are related to JQEs in that DTPs get created as a result of performing the job defined or implied by a JQE. The DTP also is the mechanism for the scheduling computer to monitor the status of GP computers and to track the progress of GP computers in carrying out instructions. The DTP consists of two parts; the data part 301 of a DTP and the instructions part 302 of a DTP, the latter indicating how the transmitted data is to be processed by the receiving computer. The following lists the types of data that are transmitted:

a Fax Broadcast Job DTP a Relaying Instructions DTP a Completion Notice DTP an Error Notice DTP a Computer Description Update DTP a Computer Status Update DTP A Fax Broadcast Job is a subject well known in the art. For the purposes of this invention, a Fax Broadcast Job consists of a Fax Document to be faxed to a plurality of Fax Recipients, where a Fax Recipient consists of salutation information and a PSTN telephone number. A Fax Broadcast Job can be received by the scheduling computer from any number of sources; for example, the GP computers, other computers, and specialized fax machines. The Fax Broadcast Job processing options considered in this invention are concerned with selecting parameters for Fax Broadcast Job Scheduling. More details about Fax Broadcast Job Scheduling will be presented in the discussions on FIGS. 8–16 and 18–21 below.

In a Relaying Instruction Data Transmission Package the data part can be Fax Delivery Lists and/or embedded Relaying Instructions. A Fax Delivery List is a Fax Document and a subset of a Fax Broadcast Job's Fax Recipients; those to which a particular GP computer is instructed to deliver the Fax Document. More details about Fax Delivery Lists will be presented in the discussion on FIG. 9 below. The instructions part 302 of a Relaying Instructions Package indicates to which GP computers the various data is to be transmitted. More details about Relaying Instructions will be presented in the discussion on FIG. 15 below.

Completion Notice data is received by the scheduling computer from a GP computer to indicate the successful processing of a Fax Delivery List. Note that success here does not imply that the Fax Document has been successfully delivered to each Fax Recipient in the Fax Delivery List. For example, the FRD may be turned off, or the PSTN line might be dead. Error Notice data is received by the scheduling computer from a GP computer indicating an error in attempting to transmit Relaying Instructions to another GP computer. Computer Description Update data is sent between the scheduling computer and any GP computer to indicate changes to a Computer Description Data Base are needed. More details about Computer Description Update data will be presented in the discussions on FIG. 7 below. Computer Status Update data is sent to the scheduling computer by any GP computer in order to indicate its state of readiness to carry out instructions. More details about Computer Status Update data will be presented in the discussions on FIG. 7 below.

Figure 4:
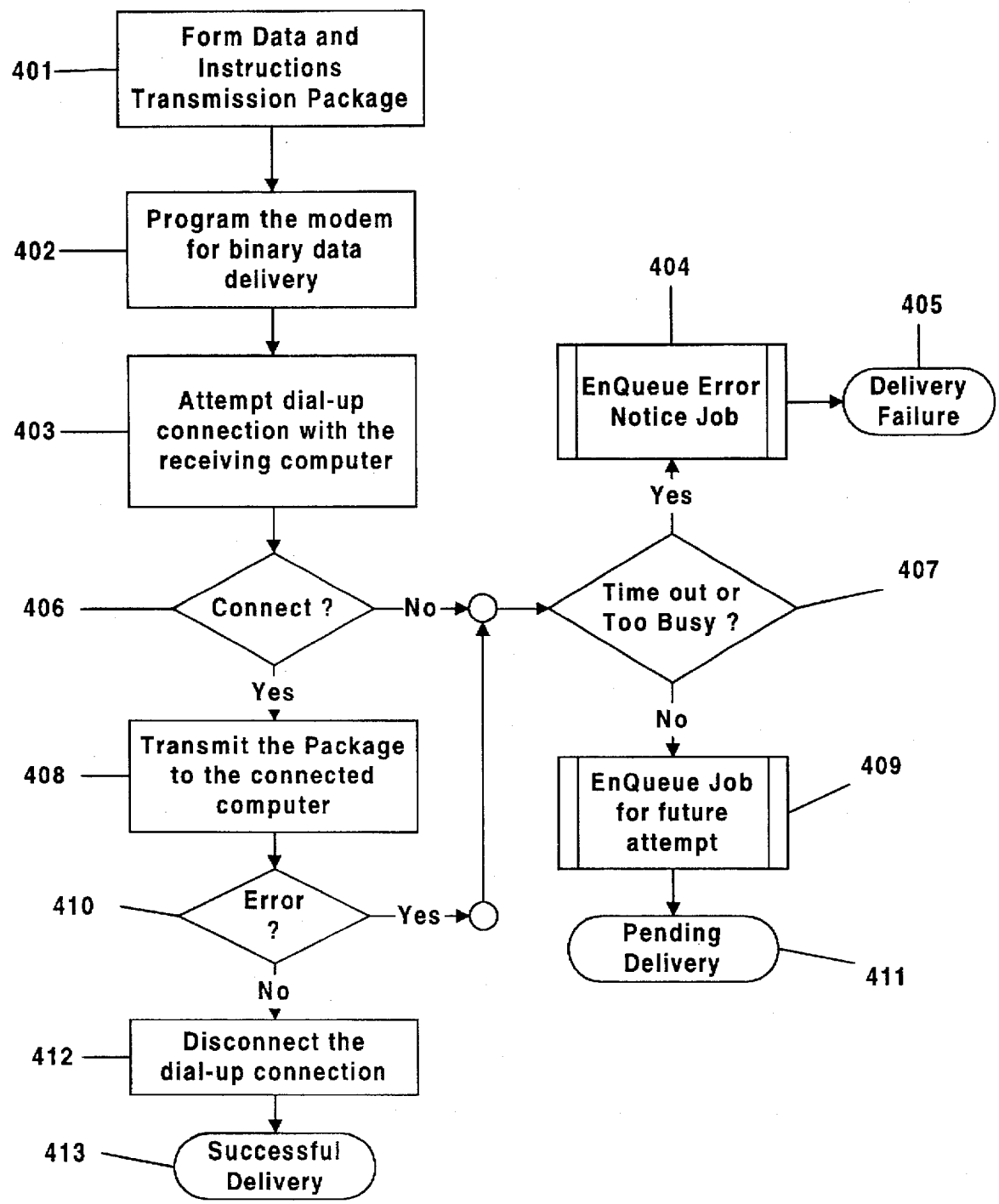
FIG. 4 is a flow chart describing the general processing steps required by a computer to transmit a Data Transmission Package to another computer using modems and the public switched telephone network.

In FIG. 4 the method and software used by a computer to transmit a DTP to another computer is presented. First the DTP is formed in item 401, typically from the information contained in or attached to a JQE. In item 402 commands are sent by the transmitting computer to its modem to prepare the modem for binary data transmission. Next, in item 403 a call is placed to the receiving computer's modem. If the computers are seen to successfully connect in item 406, then the binary data transmission commences. Part of the connection process is for the modems to physically connect, and for the transmitting computer to identify itself and to pass any security tests required by the receiving computer. A subsequent part of the connection process is for the receiving computer to indicate whether or not it is too busy to process the DTP. If the modems fail to physically connect then a check is made in item 407 to determine whether or not there is time for another attempt at delivering the binary data. If so, the JQE is returned to the JQ in item 409 and the software terminates with a pending DTP delivery in item 411. If it is determined in item 407 that there is insufficient time for another DTP delivery attempt, or if the modems physically connected but the receiving computer was too busy to process the DTP, then an Error Notice JQE is created in item 404 and placed in the JQ, and the software terminates with a DTP delivery failure in item 405. In the case of a successful connection in item 406, a binary data communication protocol is used in item 408 to transmit the DTP to the receiving computer. A test for mid-stream transmission failure is made in item 410. If there is a failure then, as above, a time out check is made in item 407. If the transmission in item 408 completes without error, then the connection disconnects normally in item 412 and the software terminates with a successful delivery in item 413.

Note that for simplicity of illustration, the Data Delivery Software sends a single DTP to the receiving computer. The generalization to sending multiple DTPs during a single transmission connection session, as would be done in practice, is straight forward and is not presented. In the discussions that follow, when a DTP is sent to a computer, there is an implicit assumption that it might be ganged with a multitude of DTPs.

Figure 5:
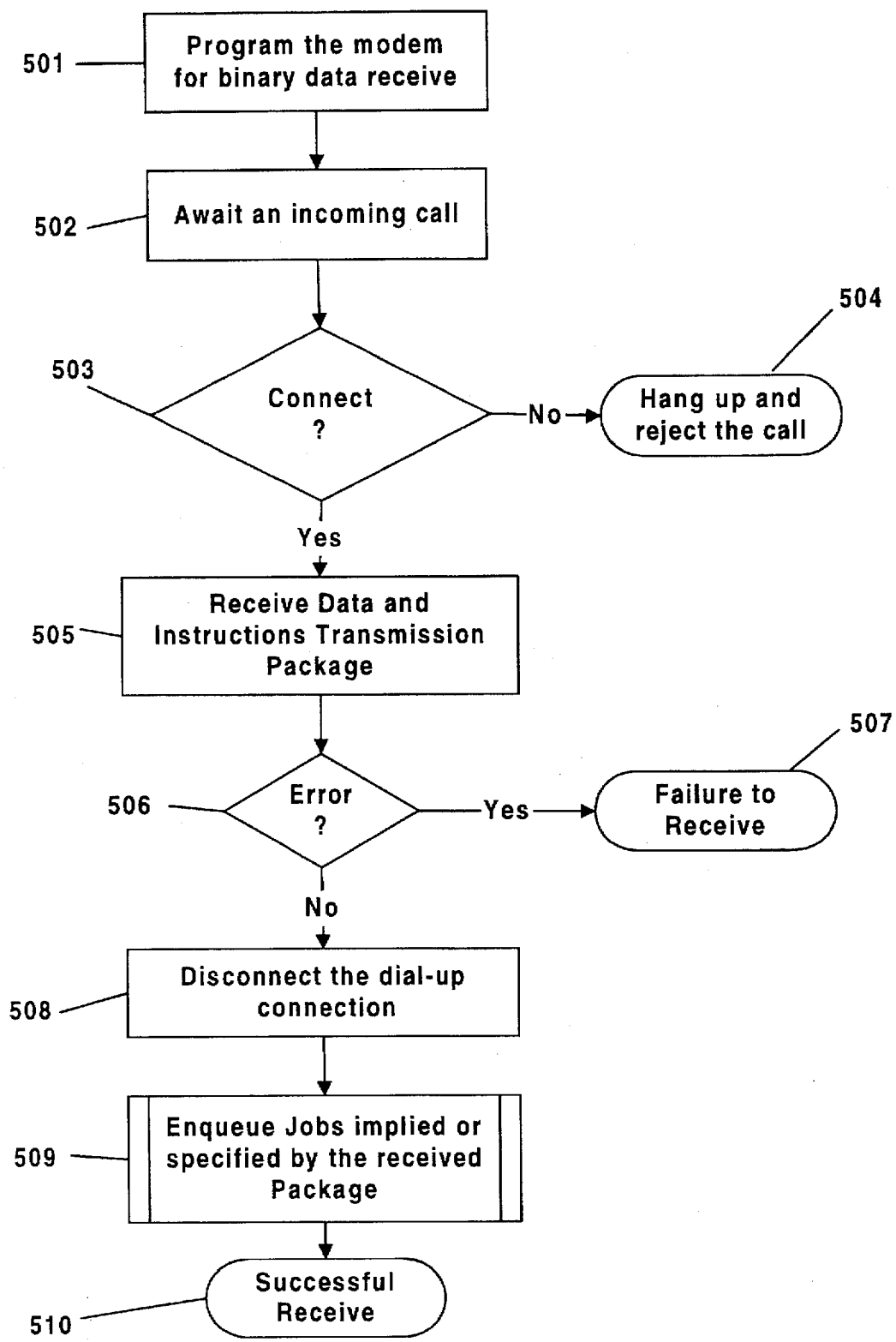
FIG. 5 is a flow chart describing the general processing steps required by a computer to receive a Data Transmission Package from another computer using modems and the public switched telephone network, and to process the received data.

In FIG. 5 the method and software used by a computer to receive a DTP from another computer is presented. In item 501 commands are sent by the receiving computer to its modem to prepare the modem for binary data reception. Since the receiving computer is passive until a call arrives, the software waits for a call in item 502. Once a call arrives, in item 503 the receiving computer requires that the transmitting computer identify itself and pass a security test. Should the calling computer fail the test in item 503, the software completes with failure to connect in item 504. Another part of the connection process is for the transmitting computer to indicate a processing deadline associated with the DTP and if the receiving computer is too busy to meet this deadline, the connection attempt will fail in item 504. In the case of a successful connection in item 503, an agreed upon binary data communication protocol is used in item 505 to receive the DTP from the transmitting computer. A test for mid-stream transmission failure is made in item 506. If there is a failure then the software terminates with failure to receive in item 507. If the reception in item 505 completes without error, then the connection disconnects normally in item 508. The received DTP is then examined in item 509 and zero, one or more JQEs are created and enqueued to the JQ. An example of zero created JQEs is a GP computer receiving notice to update its scheduling computer description data base. The details on item 509 are presented below in the discussions on FIG. 17 for GP computers and on FIG. 22 for the scheduling computer. The software then terminates with a successful receive in item 510.

Figure 6:
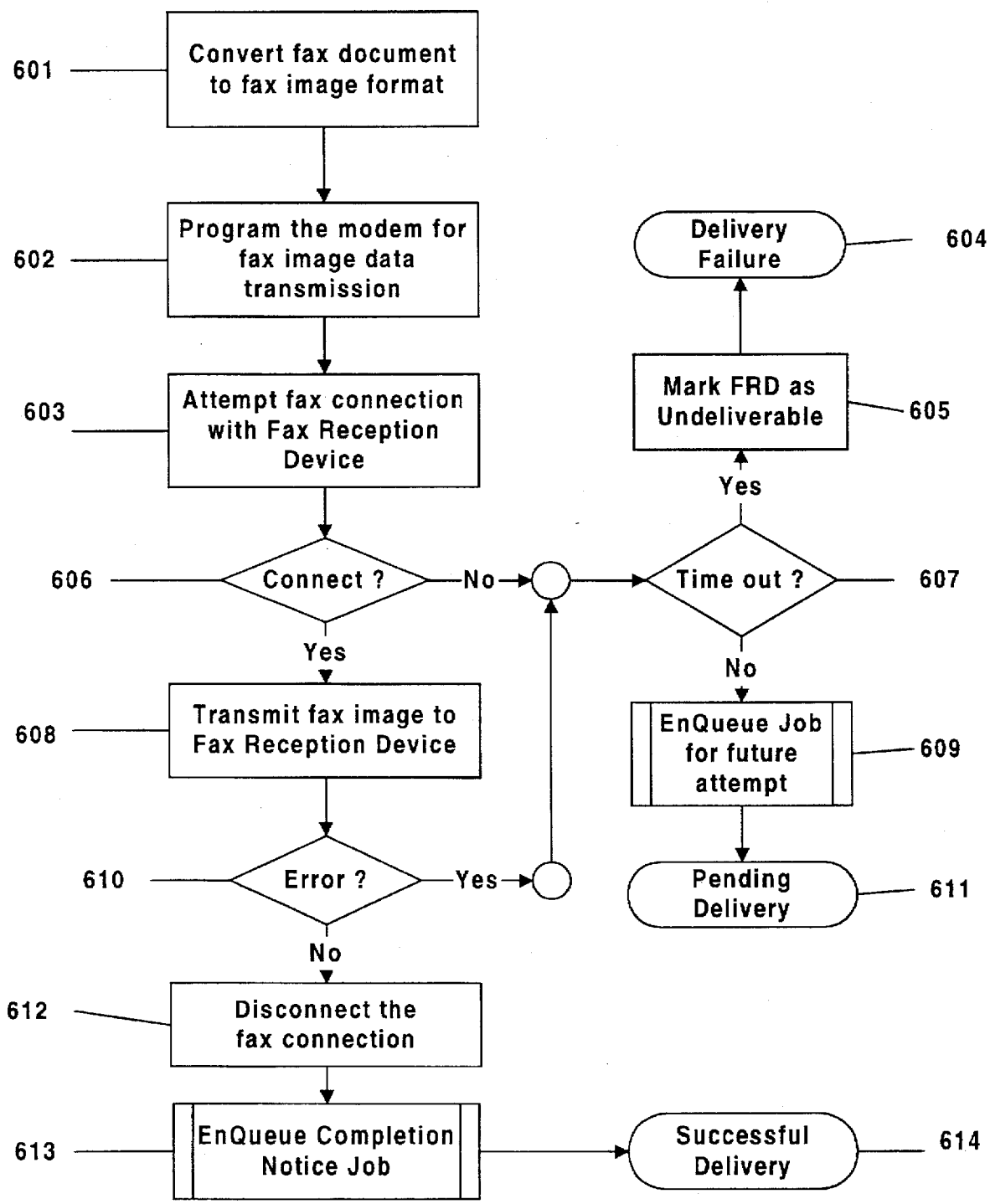
FIG. 6 is a flow chart describing the general processing steps required by a computer to deliver a fax document to a fax reception device using a fax modem and the public switched telephone network.

In FIG. 6 the method and software used by a computer to deliver a Fax Document to a Fax Reception Device (FRD) is presented. For simplicity, the software sends to a single Fax Recipient. The generalization of sending to one of the multiple Fax Recipients typically found in a Fax Delivery JQE is straight forward and is not presented. First in item 601, if not already available, a fax image data representation of the Fax Document suitable for sending to a FRD is formed and stored in RAM or hard disk. Salutation information, if present, would be included in forming the image. In item 602 commands are sent by the Fax Delivery Computer to its modem to prepare the modem for fax transmission. Next, in item 603 a call is placed to the FRD. In item 606 a test to see if the computer successfully connected to the FRD is made. Connection in this case means that the computer's modem and the FRD's modem physically connected and agreed to use a fax transmission protocol. If there is a failure to connect then a check is made in item 607 to determine whether there is time for another fax delivery attempt. If so, the JQE is returned to the JQ in item 609 and the software terminates with a pending fax delivery in item 611. If it is determined in item 607 that there is insufficient time for another fax delivery attempt, then the Fax Recipient is recorded as being undeliverable in item 605, and the software terminates with a fax delivery failure in item 604. In the case of a successful connection in item 603, the fax transmission protocol is used in item 608 to transmit the fax image data to the receiving FRD. A test for mid-stream fax transmission failure is made in item 610. If there is a failure then, as above, a time out check is made in item 607. If the fax transmission in item 608 completes without error, then the connection disconnects normally in item 612, in item 613 a Fax Delivery Completion Notice JQE is created and enqueued into the JQ, and the software terminates with a successful fax delivery in item 614.

Computer Description and Status Data Bases are central operational concepts used in this invention. One such data base is the GP computer Description and Status data base, resident on each GP computer, which contains descriptive and status information about the GP computer itself. Data base operations that synchronize the entering, modifying, and retrieving of data base information by multiple concurrent processes are known in the art and therefore are not presented. The following lists the information areas of this data base:

Physical Location and Operational Staff
Computer Configuration Description
Communication and Security Parameters
Operational Status and Load
History and DB Synchronization Status The Physical Location and Operational Staff area records information such as the address and room where the computer is located and the telephone numbers of the responsible operational staff. The Computer Configuration Description records information such as the number, type, and capabilities of attached modems and other communication devices such as WAN and LAN. The Communication and Security Parameters area records information such as the telephone numbers, network addresses, passwords, and encryption keys for each means of communicating with this GP computer. The Operational Status and Load area records information such as whether or not a communication device is currently available and the number of JQEs currently in the JQ. The History and DB Synchronization Status area records information such as the time and date when the data base information was last changed and the time and date when the data base information was last sent to the scheduling computer.

A second data base resident on each GP computer is the scheduling computer Description and Status Data Base which contains descriptive and status information about the scheduling computer. The following lists the information areas of this data base:

Physical Location and Operational Staff
Computer Configuration Description
Communication and Security Parameters These areas of information about the scheduling computer have details that are similar in nature to their GP computer counterpart areas.

Figure 7:
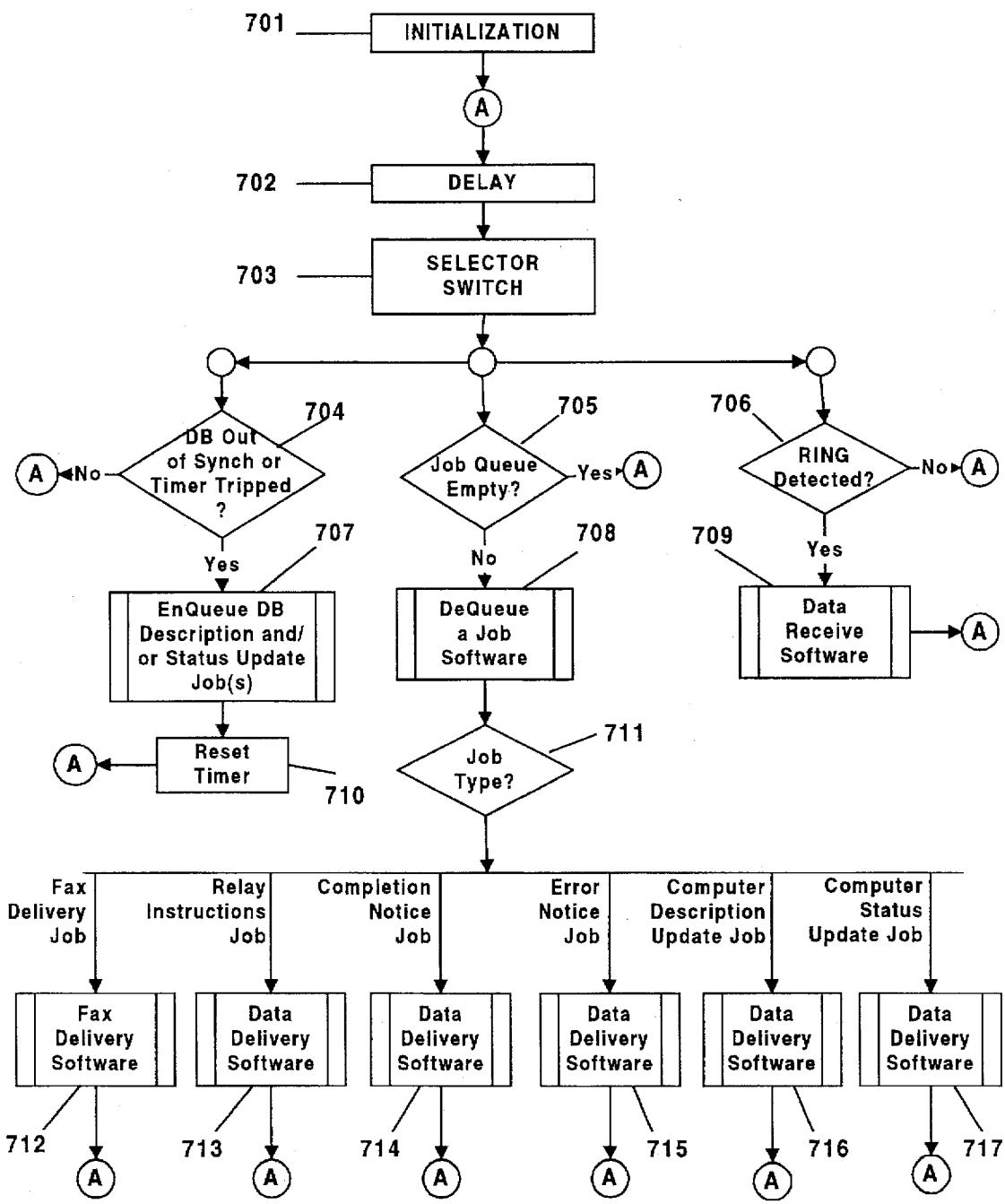
FIG. 7 is a flow chart describing the general processing steps of the general purpose computer.

The method and software for controlling the operations of a GP computer is illustrated in FIG. 7. When the computer is reset or powered on, an initialization takes place in item 701. Initialization involves testing the attached communication devices, updating data bases, and setting control parameters such as watch dog timers and selector switches. Also during initialization, a Computer Status Update Notice JQE is created and enqueued to the JQ for transmission to the scheduling computer. Following initialization, the software enters a non-terminating loop beginning at item 702. Item 702 is a time delay programmed to allow other computers to transmit DTPs to a heavily loaded GP computer. Without such a delay, a GP computer could be unavailable to receive DTPs over its single modem for an arbitrarily long period of time. Item 703 is a selector switch that multiplexes the flow of control among items 704-706 in a round robin fashion. The scheduling computer needs to be made aware of changes to the GP computer Description or Operational Status. In item 704 such changes are detected and, when appropriate, a Computer Description Update and/or Status Update DTP are/is created and enqueued to the JQ in item 707. There is a watch dog timer mechanism which periodically causes a Computer Status Update JQE and DTP to be created and enqueued to the JQ in item 707. Whenever status information is sent to the scheduling computer, the watch dog timer is reset in item 710. In item 706, a test is made to determine if the modem has detected an incoming call. If so, the previously described Data Receive Software is invoked in item 709. In item 705, a test is made to see if there are entries in the JQ. If so, then in item 708 the JQE having highest priority is dequeued from the JQ. Item 711 is a case selector on the element type of the dequeued JQE. If a Fax Delivery JQE was selected, then the previously described Fax Delivery Software is invoked in item 712. If a Relay Instructions JQE was selected, then the previously described Data Delivery Software is invoked in item 713 to transmit instructions and data to another GP computer. If a Completion Notice JQE, an Error Notice JQE, a Computer Description Update JQE, or a Computer Status Update JQE was selected, then the Data Delivery Software is invoked in item 714, 715, 716, or 717 respectively to transmit a DTP to the scheduling computer.

The method and software for operating the scheduling computer will now be described. Whereas each GP computer maintains one Computer Description and Status Data Base for the GP computer itself and one for the scheduling computer, the scheduling computer maintains one Computer Description and Status Data Base for the scheduling computer itself and one for each GP computer to which it may send job processing instructions. The following lists the information areas that the scheduling computer maintains about itself:

Physical Location and Operational Staff
Computer Configuration Description
Communication and Security Parameters
History and DB Synchronization Status The first three areas of information are as in the above GP computer Data Bases discussion. The History and DB Synchronization Status area records information such as the time and date when the data base information was last changed and the time and date when the information was last sent to each of the GP computers. The following lists the information areas that the scheduling computer maintains about each of the GP computers:

Physical Location and Operational Staff
Computer Configuration Description
Communication and Security Parameters
Operational Status and Load
History and DB Synchronization Status The first four areas of information are as in the above GP computer Data Bases discussion. The History and DB Synchronization Status area records information such as the time and date when the data base information was last changed and the time and date when the information was last sent to and last received from the particular GP computer.

Note that a GP computer can initiate modifications only to its self Description and Status Data Base and it can send those modifications to the scheduling computer. A GP computer, however, can receive instructions from the scheduling computer to update either or both of the scheduling computer Description and Status Data Base and the GP computer's Description and Status Data Base. On the other hand, the scheduling computer can initiate modifications to any of the Description and Status Data Bases that it maintains. This permits, for example, the operator of the scheduling computer to periodically change a GP computer's password even when that GP computer is operating unattended.

The Telephone Number and Toll Rate Data Base that is maintained on the scheduling computer is used by the methods of this invention to answer the following basic question:

Given two PSTN telephone numbers $TN_1$ and $TN_2$, what is the cost per unit time of making a call from $TN_1$ to $TN_2$?

Such data bases are known in the art and will not be discussed in detail herein, other than to indicate that in practice the scheduling computer is most concerned about calls within its geographical region and thus the Telephone Number and Toll Rate Data Base is structured to be most efficient in answering the basic question for telephone numbers within the scheduling computer's geographical region. The concept of a scheduling computer's geographical region will be defined below in the discussions on FIGS. 30 and 31.

Figure 8:
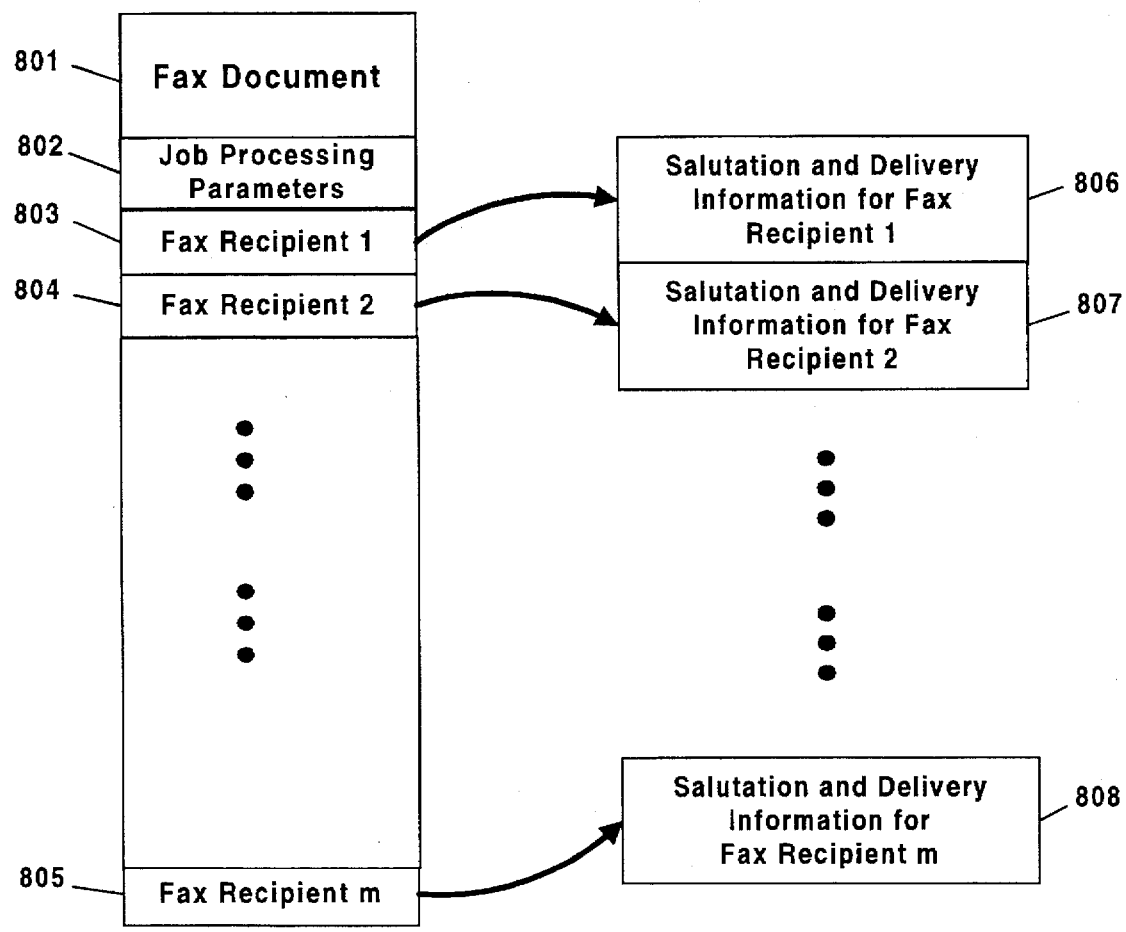
FIG. 8 is a diagram showing the format of a fax broadcast job, which is the principal input to the scheduling computer's software.

The Master Fax Job Scheduling Software and method is one of the core concepts in this invention. Input to the Software is a Fax Broadcast Job, whose format is illustrated in FIG. 8, and the resulting software output is the Master Fax Job Schedule, whose format will be described in detail below in the discussion on FIG. 15. A Fax Broadcast Job consists of a Fax Document, Job Processing Parameters, and a number of Fax Recipients. Item 801 of FIG. 8 represents the Fax Document which is to be broadcast to a plurality of FRDs. Many forms of Fax Document representation are known in the art. Item 802 represents the Job Processing Parameters which, for the purposes of describing this invention, consist of indicating which one of three Scheduling Goals should be used in processing the Fax Broadcast Job. The three Scheduling Goals are as follows:

A Goal of Minimizing Fax Delivery Time (called Time Driven Scheduling).
   A Primary Goal of Minimizing Fax Delivery Time, in conjunction with a Secondary Goal of Minimizing Fax Delivery Cost (called Time Driven, Cost Conscious scheduling).
   A Primary Goal of Minimizing Fax Delivery Cost, in conjunction with a Secondary Goal of Minimizing Fax Delivery Time (called Cost Driven, Time Conscious Scheduling).

Note that the methods described in this first embodiment of the invention, while focused on reducing fax delivery time and cost, do not necessarily achieve an optimal fax delivery schedule in the sense of constructing minimal time/minimal cost schedules.

Items 803–805 represent the Fax Recipients, with respective items 806–808 indicating that a Fax Recipient consists of Salutation Information and Delivery Information. Salutation Information includes data such as the recipient's name, address, and voice telephone number(s)—data that can be used as the basis of a fax cover page. Salutation Information can also be used for making insertions into the Fax Document to customize the delivery for the individual recipient. Such processing would be done in the Fax Delivery Software item 601 of FIG. 6. Delivery Information includes at a minimum the PSTN telephone number of the FRD. Sophisticated delivery schemes are known in the art and the information required to implement them would be included as Delivery Information in the Fax Broadcast Job.

Figure 9:
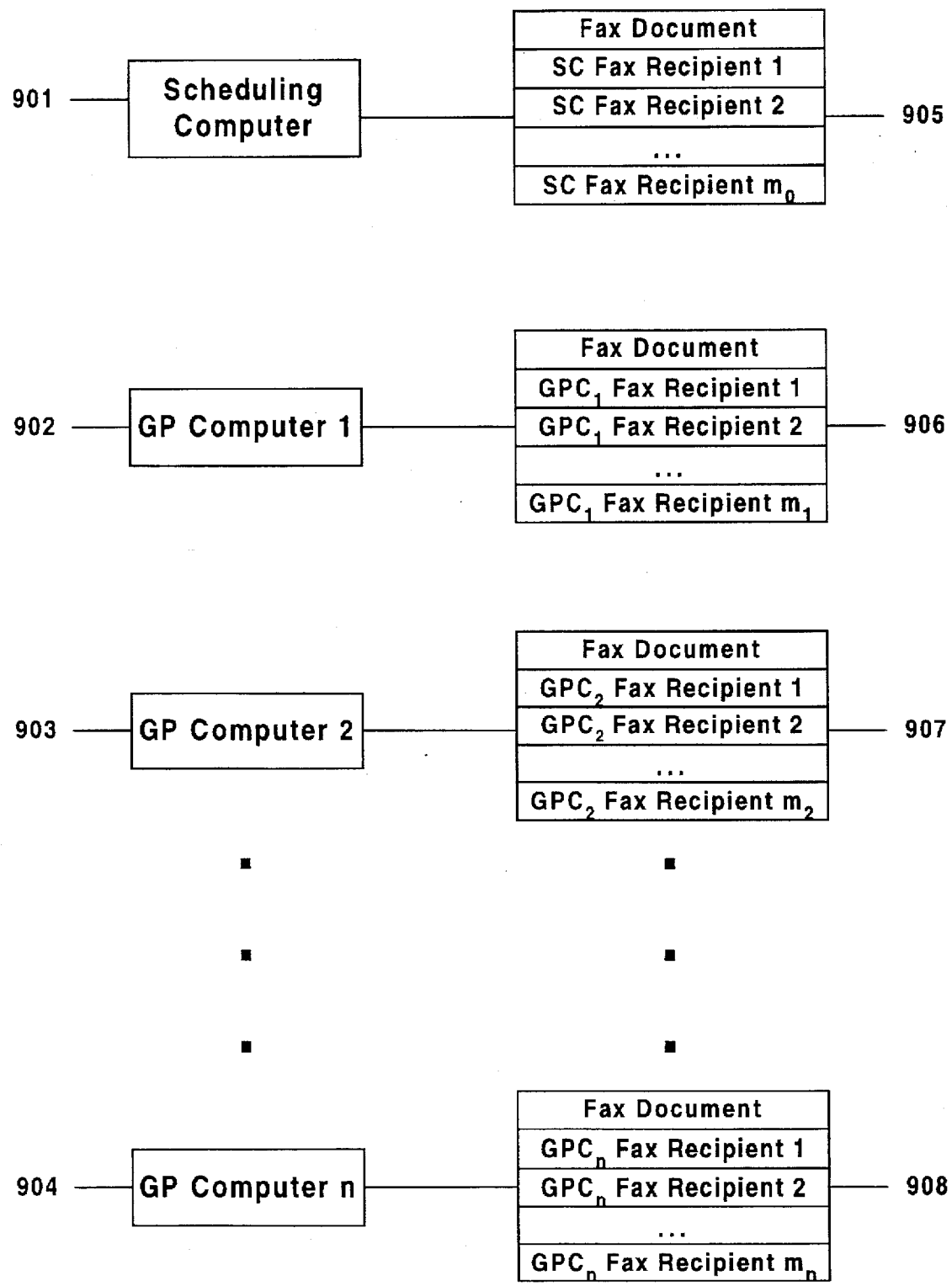
FIG. 9 is a diagram showing the format of a fax delivery assignment, which assigns fax recipients to general purpose computers.

The first step of the Master Fax Job Scheduling method and software is to produce a set of Fax Delivery Assignments, the format of which is illustrated in FIG. 9. A Fax Delivery Assignment consists of two parts: a set of Fax Delivery Computers which is a subset of the invention's computer apparatus (i.e., the scheduling computer and the GP computers), and for each Fax Delivery Computer a non-empty subset of the Fax Recipients listed in the Fax Broadcast Job, subject to the following constraint: each Fax Recipient must be assigned to one and only to one Fax Delivery Computer. Items 901–904 in FIG. 9 illustrate Fax Delivery Computers and items 905–908 illustrate their respective Fax Delivery Assignments where for convenience the Fax Document is adjoined to each Fax Delivery Assignment. Note that the following are true about Fax Delivery Assignments: the scheduling computer need not be a Fax Delivery Computer, the scheduling computer could be the only Fax Delivery Computer, and the number of assigned Fax Recipients could vary widely among the Fax Delivery Computers.

Figure 10:
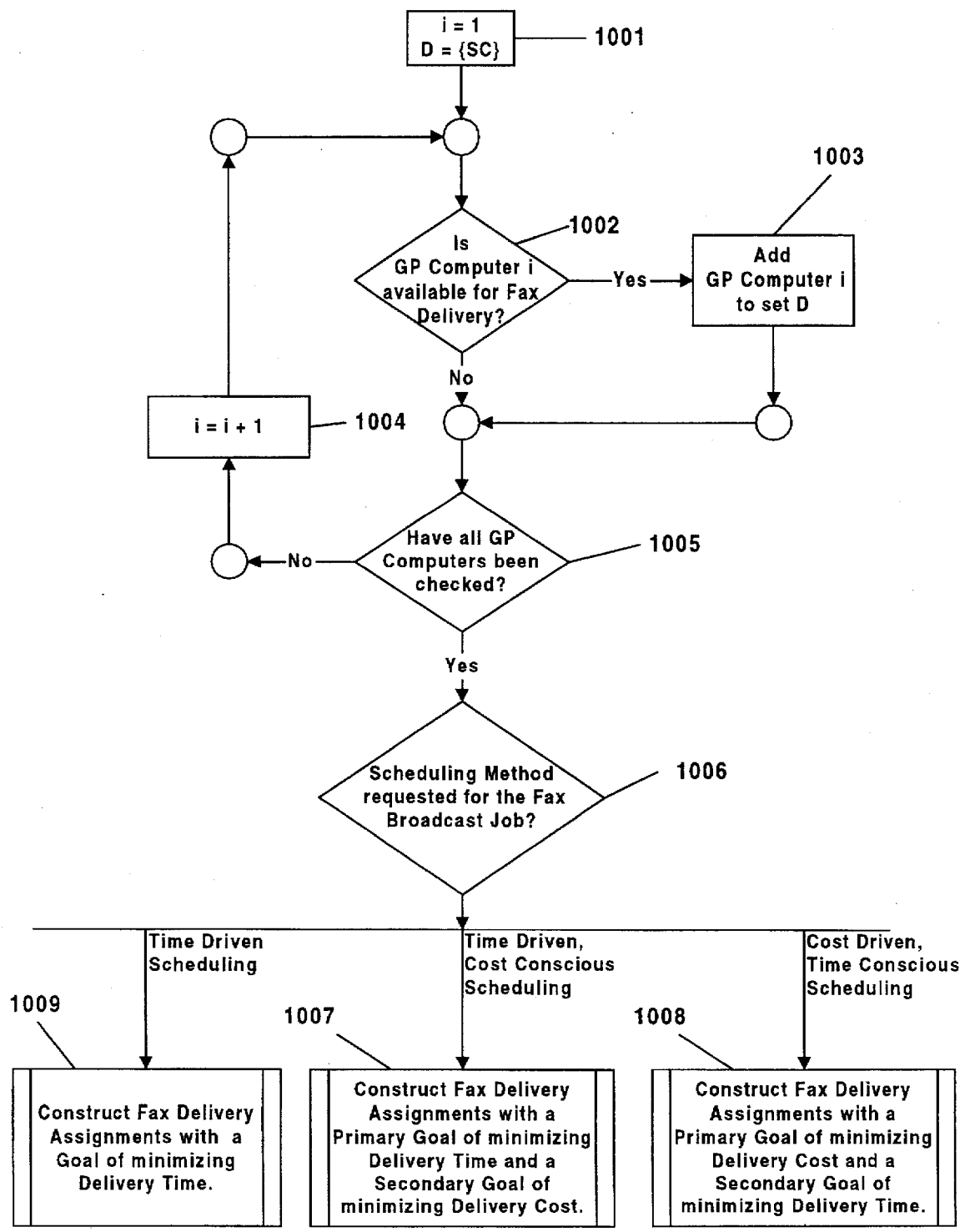
FIG. 10 is a flow chart describing the general processing steps required by the scheduling computer's software to construct fax delivery assignments for a fax broadcast job.
Figure 11:
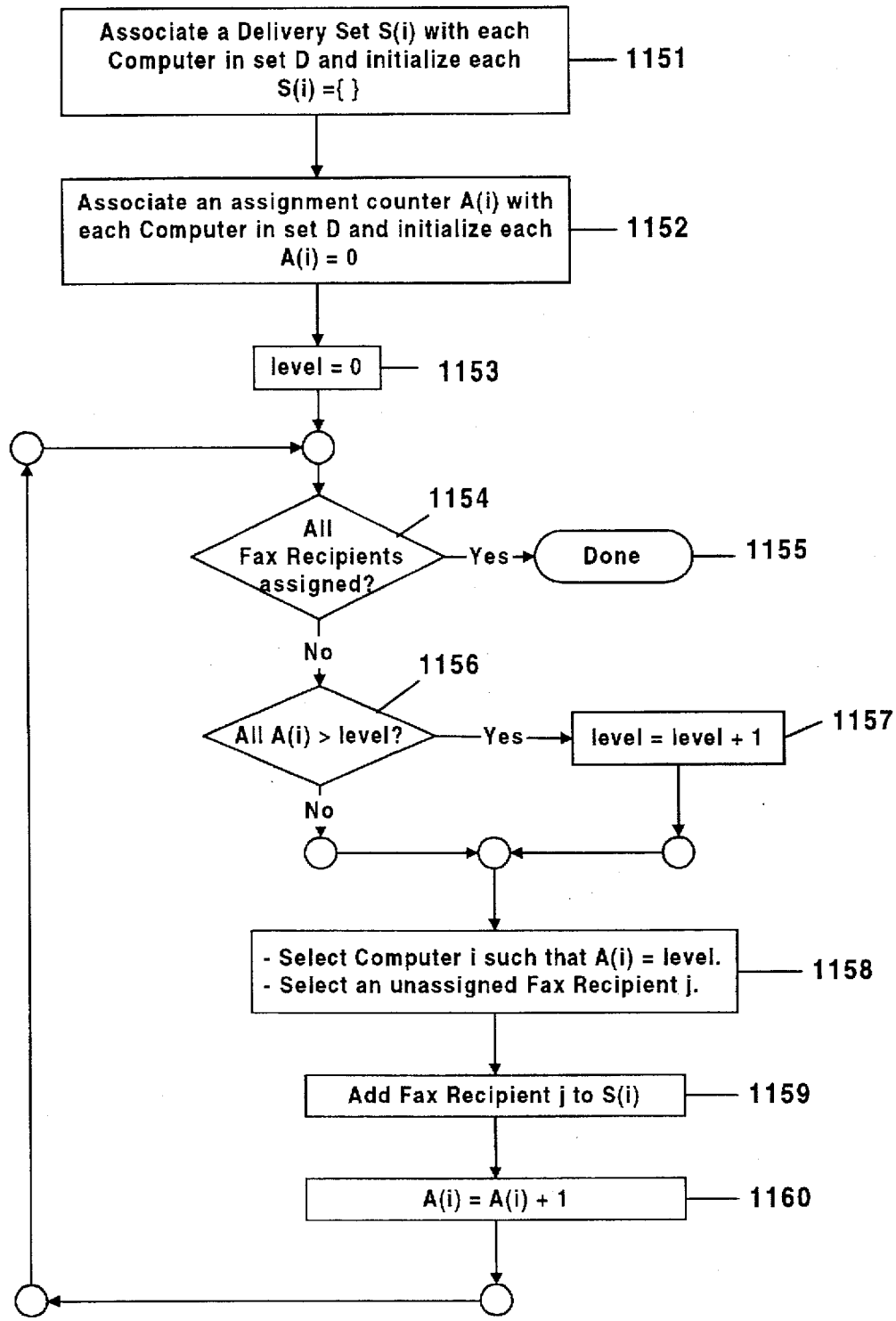
FIG. 11(a) is a flow chart describing the detailed processing steps required by the scheduling computer's software for constructing a fax delivery assignment when minimum delivery time is the scheduling goal.
FIG. 11(b) is a flow chart similar to FIG. 11(a), but when reduced time is the primary scheduling goal and cost is secondary.
Figure 11:
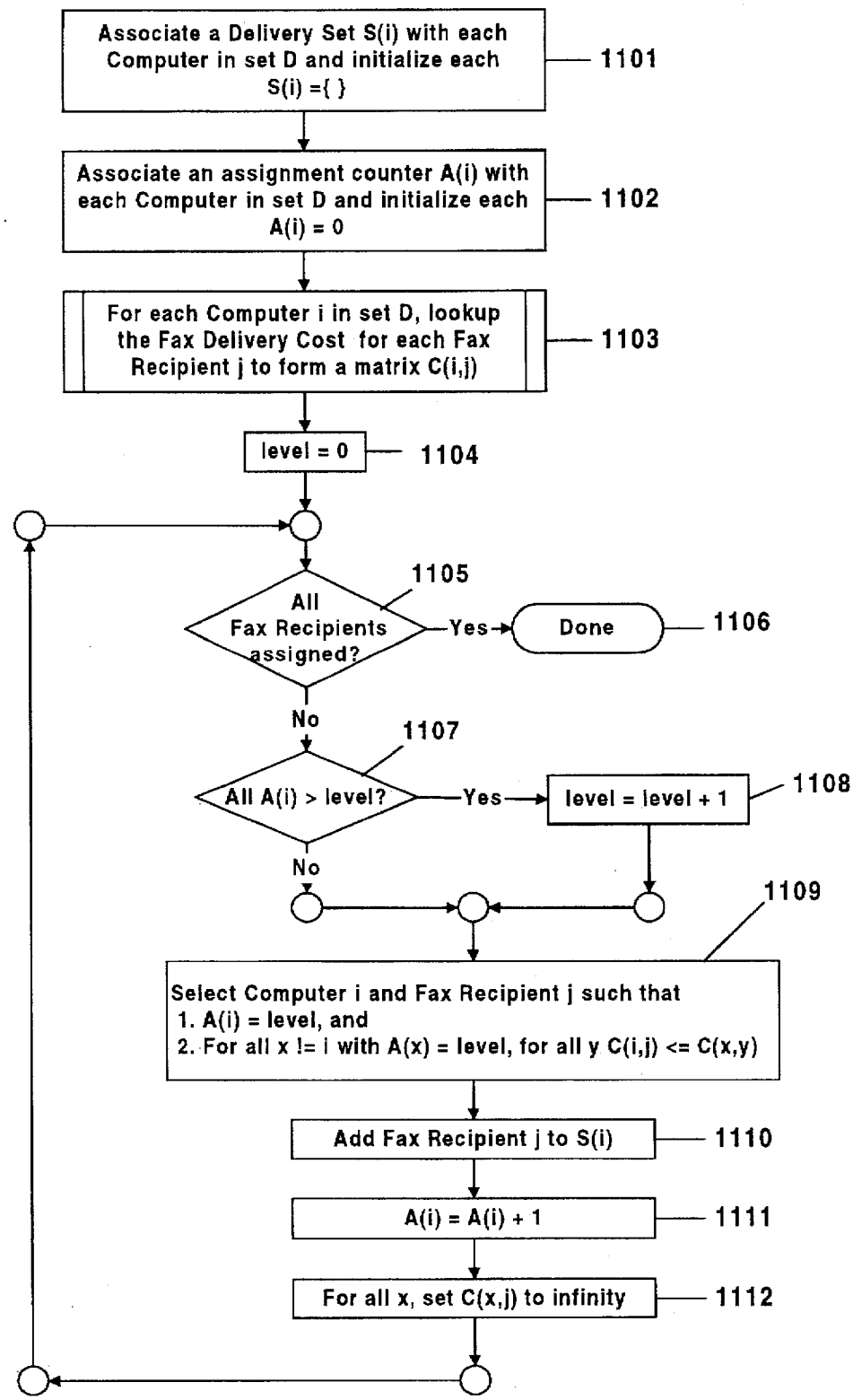

The method and software for constructing a Fax Delivery Assignment is illustrated in FIG. 10. The software consists of two parts: a part which determines which computers are candidates for being a Fax Delivery Computer, and a part which, under one of three assignment methods, assigns Fax Recipients to Candidate Delivery Computers. Note that a Candidate Delivery Computer might end up not being assigned Fax Recipients and thus it might end up not being a Fax Delivery Computer. In item 1001 two variables used in part one of the Fax Delivery Assignment Software are initialized: variable i for controlling a loop through all GP computers, and variable D for recording the eligible Candidate Delivery Computers. As indicated, the scheduling computer is always a Candidate Delivery Computer. Items 1004 and 1005 are used to control the loop. In item 1002 a query is made to the scheduling computer's Computer Description and Status Data Base to determine if the $i^{th}$ GP computer is operational and not overloaded. If it is available, then the $i^{th}$ GP computer is added to set D in item 1003. In item 1006 a test of the Fax Broadcast Job's Scheduling Goal Parameter is made to determine the corresponding method to use when assigning Fax Recipients to Candidate Delivery Computers. If the Scheduling Goal requested with the Fax Broadcast Job was Time Driven Scheduling, then the Minimize Delivery Time Fax Delivery Assignment Software in item 1009 is used to assign recipients to computers. The Minimize Delivery Time Fax Delivery Assignment Software will be described in the discussion on FIG. 11a below. If the Scheduling Goal requested with the Fax Broadcast Job was Time Driven, Cost Conscious Scheduling, then the Time Primary, Cost Secondary Fax Delivery Assignment Software in item 1007 is used to assign recipients to computers. The Time Primary, Cost Secondary Fax Delivery Assignment Software will be described in the discussion on FIG. 11b below. If the Scheduling Goal requested with the Fax Broadcast Job was Cost Driven, Time Conscious Scheduling, then the Cost Primary, Time Secondary Fax Delivery Assignment Software in item 1008 is used to assign recipients to computers. The Cost Primary, Time Secondary Fax Delivery Assignment Software will be described in the discussion on FIG. 12 below.

When the Fax Broadcast Job contains a Scheduling Goal request for Time Driven Scheduling of Fax Deliveries, then the Minimize Delivery Time Fax Delivery Assignment Software illustrated in FIG. 11a is used to assign Fax Recipients to Candidate Delivery Computers. Assuming that the recipient list is larger than the number of Candidate Delivery Computers, all computers will make deliveries and equally share the delivery load. Item 1151 introduces an array of set variables S(i) that are used to record the delivery assignments for each Candidate Delivery Computer and each array element is initialized to the empty set. Item 1152 introduces an array of counter variables A(i) that are used to count the number of delivery assignments for each Candidate Delivery Computer and each array element is initialized to zero. Item 1153 introduces a variable named "level", with initial value zero, that is used in the decision process of the Software's main loop. "Level" is used to control the growth of the delivery sets S(i). During each loop iteration, exactly one Fax Recipient is assigned to a Fax Delivery Computer. At any time during the construction of the delivery assignments, the size of each S(i) will be no less than the value of "level", and no more than one plus this value.

The main loop beings at item 1154 where a test is made to determine if all Fax Recipients have been assigned to Fax Delivery Computers. If so then the software terminates at item 1155 and the contents of the set variables S(i) indicate the Fax Delivery Assignment for each Fax Delivery Computer. In item 1156 a test is made to see if all assignment counters are greater than "level". If so, before proceeding to item 1158 the value of "level" is incremented by one in item 1157. This ensures that in item 1158 there will be at least one computer whose assignment count is equal to the value of "level". In item 1158 the decision as to which Fax Recipient will be assigned to which Candidate Delivery Computer is made. The decision consists of selecting at random one of the unassigned Fax Recipients and also selecting at random one of the computers whose current assignment count is equal to the value of "level". Then the selected Fax Recipient is assigned to the selected Delivery Computer in item 1159 by adding the selected Fax Recipient to the delivery set S(i) of the selected Fax Delivery Computer. In item 1160 the assignment counter for the selected Fax Delivery Computer is incremented by one.

When the Fax Broadcast Job contains a Scheduling Goal request for Time Driven, Cost Conscious Scheduling of Fax Deliveries, then the Time Primary, Cost Secondary Fax Delivery Assignment Software illustrated in FIG. 11b is used to assign Fax Recipients to Candidate Delivery Computers. Assuming that the recipient list is larger than the number of Candidate Delivery Computers, all computers will make deliveries and equally share the delivery load. Moreover, the Software is also cost conscious—it attempts to minimize delivery cost but not at the expense of delivery time. Item 1101 introduces an array of set variables S(i) that are used to record the delivery assignments for each Candidate Delivery Computer and each array element is initialized to the empty set. Item 1102 introduces an array of counter variables A(i) that are used to count the number of delivery assignments for each Candidate Delivery Computer and each array element is initialized to zero. Item 1103 introduces a matrix of delivery costs $C(i,j)$ where the rows of the matrix represent the Candidate Delivery Computers, the columns of the matrix represent the Fax Recipients, and the matrix elements $c(i,j)$ represent the delivery cost of Candidate Delivery Computer i delivering the Fax Document to Fax Recipient j.

The delivery cost is computed by first estimating the delivery time for the Fax Document and then looking up in the Telephone Number and Toll Rate Data Base the cost per unit time for Candidate Delivery Computer i to call the FRD of Fax Recipient j. For this embodiment of the invention, the delivery time estimate is based only on the fax image size corresponding to the Fax Document. Thus in this embodiment it is assumed that the time differentials for delivering the fax image from the various Candidate Delivery Computers to the various Fax Recipients is an inconsequential difference. In other embodiments of this invention, the delivery time estimate will be refined under the assumption that details about the receiving FRD, such as its supported baud rate and supported fax transmission protocols, are known.

Item 1104 introduces a variable named "level", with initial value zero, that is used in the decision process of the Software's main loop. "Level" is used to control the growth of the delivery sets S(i). During each loop iteration, exactly one Fax Recipient is assigned to a Fax Delivery Computer. At any time during the construction of the delivery assignments, the size of each S(i) will be no less than the value of "level", and no more than one plus this value. The loop begins at item 1105 where a test is made to determine if all Fax Recipients have been assigned to Fax Delivery Computers. If so then the Software terminates at item 1106 and the contents of the set variables S(i) indicate the Fax Delivery Assignment for each Fax Delivery Computer. In item 1107 a test is made to see if all assignment counters are greater than "level". If so, before proceeding to item 1109 the value of "level" is incremented by one in item 1108.

In item 1109 the decision as to which Fax Recipient will be assigned to which Candidate Delivery Computer is made. The decision is made in terms of selecting an element of the cost matrix C. This is a two step decision. In the first step, the computers whose assignment set sizes are at the current value of "level" are identified. Then in the second step, for this restricted set of computers, a search of the cost matrix $C(i,j)$ is made to find the minimal value $c(i,j)$. The row and column position in the matrix of this minimal delivery cost value then determine the selected Fax Delivery Computer and the selected Fax Recipient for the loop iteration. In item 1110 the selected Fax Recipient is added to the delivery set S(i) of the selected Fax Delivery Computer. In item 1111 the assignment counter for the selected Fax Delivery Computer is incremented by one. The final part of the loop, in item 1112, is to set the delivery costs for the selected Fax Recipient so high that the selected Fax Recipient will not be chosen again in a subsequent loop iteration.

Figure 12:
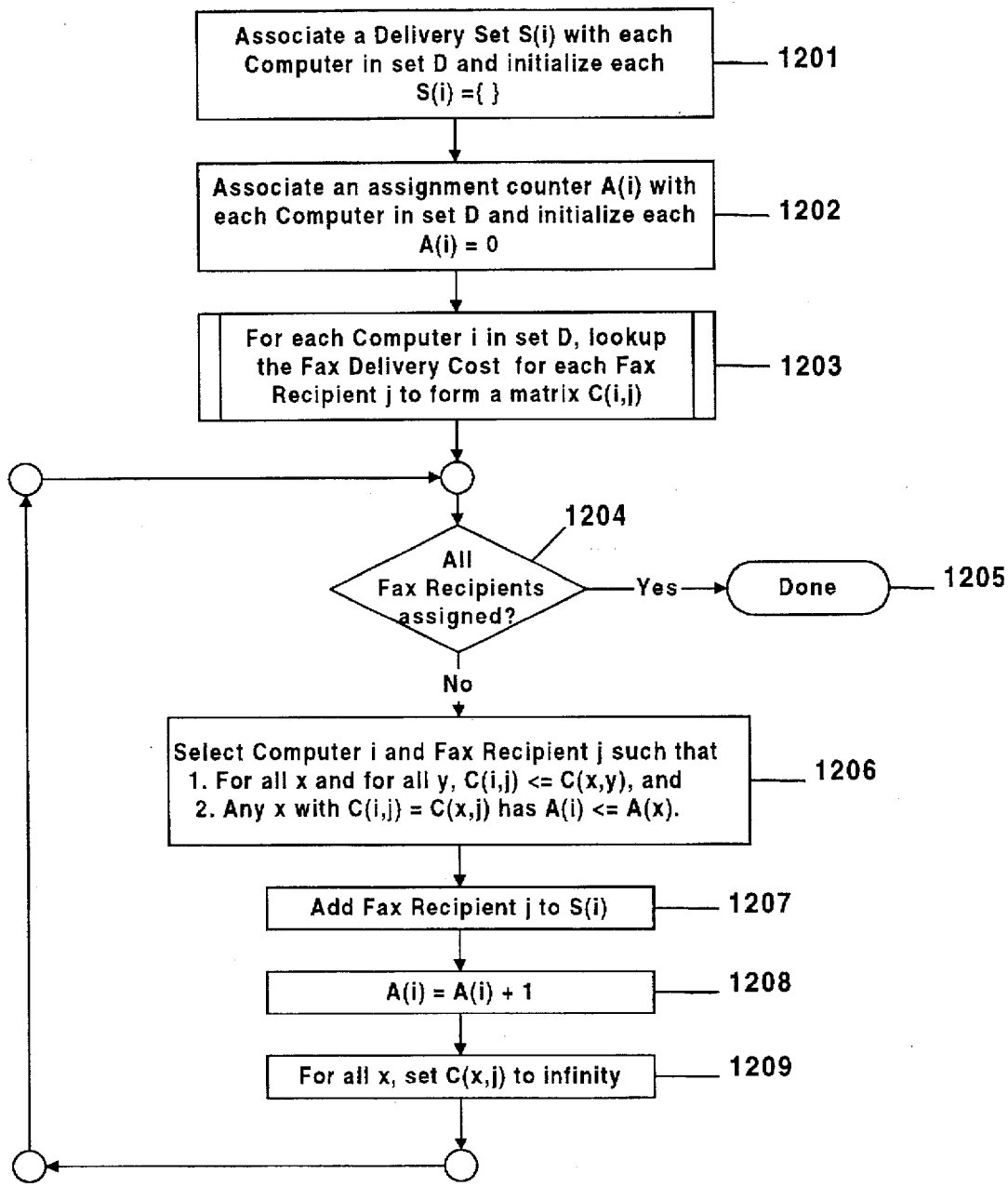
FIG. 12 is a flow chart describing the detailed processing steps required by the scheduling computer's software for constructing a fax delivery assignment when reducing delivery cost is the primary scheduling goal and time is secondary.

When the Fax Broadcast Job contains a request for Cost Driven, Time Conscious Scheduling of fax deliveries, then the Cost Primary, Time Secondary Fax Delivery Assignment Software illustrated in FIG. 12 is used to assign Fax Recipients to Candidate Delivery Computers. Items 1201–1203 are exactly the same as items 1101–1103 of FIG. 11, in which the initial Delivery Sets, initial Assignment Counters, and the Delivery Cost Matrix are defined. Item 1204 is the first step of the Software's main loop and during each loop iteration exactly one Fax Recipient is assigned to a Candidate Delivery Computer. In item 1204 a test is made to see if all Fax Recipients have been assigned to Fax Delivery Computers. If so, then the software terminates at item 1205 and the contents of the set variables S(i) indicate the Fax Delivery Assignments for the Fax Delivery Computers. Note that there may be Candidate Delivery Computers that are not assigned any Fax Deliveries by the Cost Primary, Time Secondary Fax Delivery Assignment Software. An empty assignment set is a consequence of this software's willingness to sacrifice delivery time in order to lower delivery costs.

In item 1206 the decision as to which Fax Recipient will be assigned to which Candidate Delivery Computer during the main loop is made. The decision is made in terms of selecting an element of the cost matrix C. This is a two step decision. In the first part, the cost matrix C is searched for the element with minimum value. If this minimal element is unique then it is the element selected and the second step of item 1206 is not done. If there are multiple minimal elements in C then the element that corresponds to a candidate computer with minimal assignment count is selected. The row and column positions in the matrix of the select minimal delivery cost value then determine the selected Fax Recipient and its Fax Delivery Computer for the loop iteration. Items 1207–1209 are exactly the same as items 1110–1112 of FIG. 11, in which the selected Fax Recipient is assigned to the selected Fax Delivery Computer's assignment set, the selected Fax Deliver Computer's assignment counter is updated, and the delivery costs for the selected Fax Recipient are set so high that the selected Fax Recipient will not be chosen again in a subsequent loop iteration.

The last part of the Master Fax Job Scheduling Software is to determine how the scheduling computer will rapidly distribute the Fax Delivery Assignments to the Fax Delivery Computers. The Software that makes the distribution decisions uses a data structure known in the art as a Directed Binomial Tree (DBT). A DBT has nodes, directed edges, a distinguished root node which is the node having no inward edges, and one or more leaf nodes which are the nodes having no outward edges. Nodes that are not leaf nodes have one or more successor nodes and each node, except for the root node, has a unique parent node. The order of a DBT is the maximum distance, in terms of the number of edges, from the root node to a leaf node. In FIG. 13 five examples of DBTs are given. Item 1301 illustrates the order 0 DBT, item 1302 illustrates the order 1 DBT, item 1303 illustrates the order 2 DBT, item 1304 illustrates the order 3 DBT, and item 1305 illustrates the order 4 DBT. As is illustrated, the name Binomial Tree comes from the direct correspondence of the node count at each DBT level of depth to the coefficients in the polynomial expansion of $(X+Y)^k$, where k is the order of the DBT. The following recursive definition of DBTs is the basis of software known in the art that can be used to generate DBTs:

1. A single node is a DBT of order 0.
2. A DBT of order k, k>0, is constructed from the DBT of order k-1 by attaching a leaf node to each node in the DBT of order k-1.

It is easily seen that a DBT of order k contains a total of $2^k$ nodes, and thus a DBT can be called a Complete DBT (CDBT). A Partial Directed Binomial Tree (PDBT) is similar to a CDBT but its node count is not a power of two. The following definition of PDBTs is the basis of software known in the art that can be used to generate a PDBT containing a node count N which is not a power of two:

1. Set n=floor(X), where floor(X) is the largest integer not greater than X.
2. Set $M=N-2^n$.
3. The PDBT containing N nodes is constructed from the CDBT of order n by attaching M leaf nodes to the nodes in the CDBT of order n.

Note that there is a multitude of structurally different PDBTs that contain N nodes, N not a power of two. The methods of the invention are valid for any PDBT.

Figure 14:
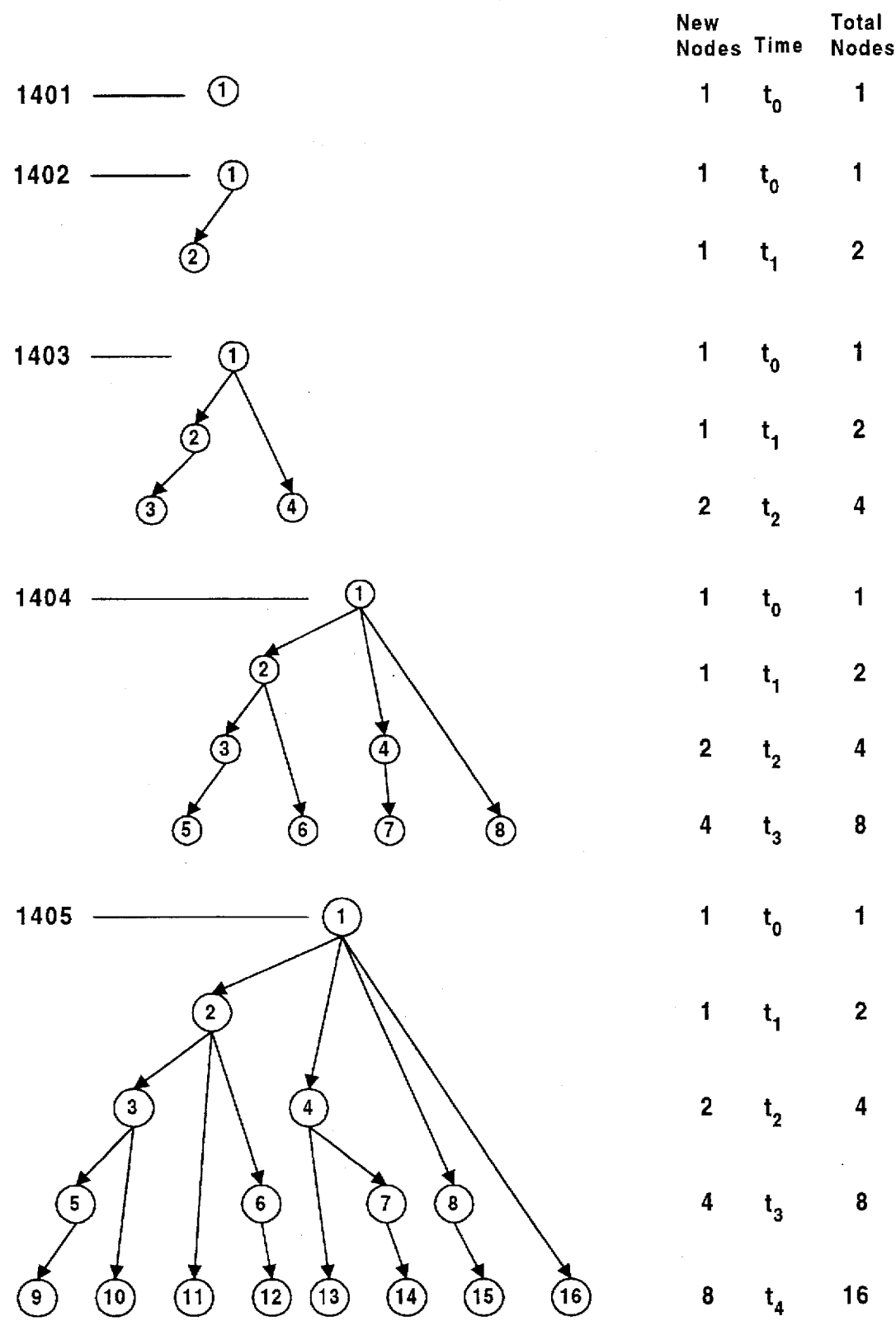
FIG. 14 is a diagram illustrating the time-oriented directed binomial tree data structure.
Figure 15:
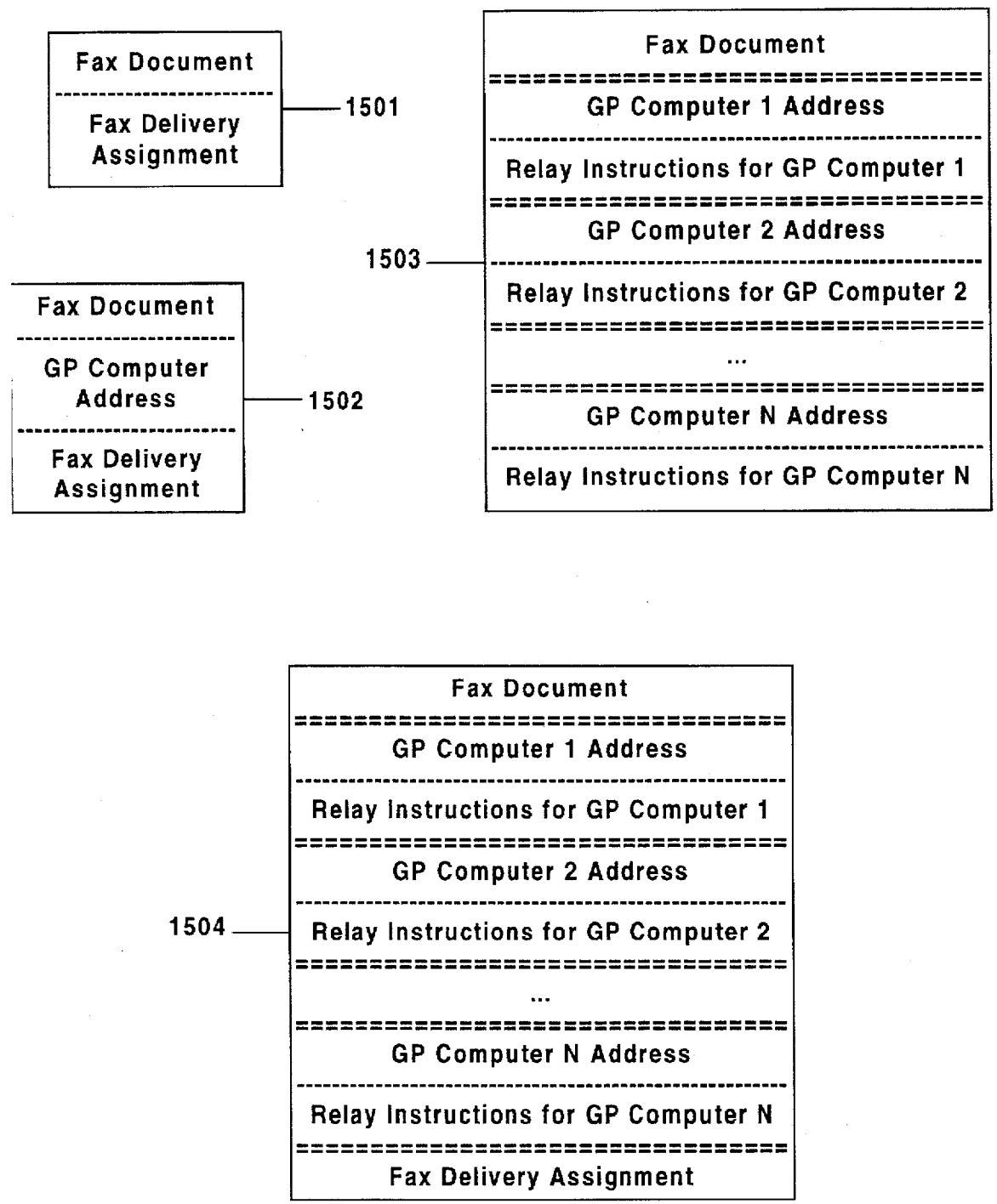
FIG. 15 is a diagram showing the format of a relay instructions data transmission package.

In FIG. 14 the five CDBTs of FIG. 13 are redrawn with the nodes oriented to illustrate the "time" at which they are added to the CDBT. Items 1401–1405 correspond to the re-orientation of items 1301–1305 in FIG. 13. This re-orientation will be called a Time-Oriented Complete Directed Binomial Tree (TOCDBT). Note that "time" here indicates the iteration in the above recursive definition of CDBTs during which a node is added in the CDBT construction. In the re-orientation, the count of the nodes across the horizontal positioning of the nodes no longer corresponds to the coefficients of expansion of $(X+Y)^k$; rather, these counts correspond to the number of nodes being added at time t. Adjoining items 1401–1405 in FIG. 14 is a table listing the number of nodes added, and resulting total number of nodes, during each iteration in the construction of the CDBT. Note that the number of nodes added during each iteration is a power of two. The above readily extends to Time-Oriented Partial Directed Binomial Trees (TOPDBT). In a TOPDBT only the final iteration adds a number of nodes that is not a power of two and a TOCDBT can be considered to be a special case of a TOPDBT. The Master Fax Job Scheduling Software constructs a TOPDBT data structure in determining how to distribute the Fax Delivery Assignments to Fax Delivery Computers.

Before continuing with the Master Fax Job Scheduling Software description for this embodiment of the invention, it is noted that if the scheduling computer and/or GP computers have more than one attached modem, or if they have a multitude of computer-computer communication means, then a generalization of Directed Binomial Trees is required. To illustrate this generalization, assume each computer has four attached modems. Then the tree generation algorithm is based on the following recursive definition:

1. A single node is a DBT of order 0.
2. A DBT of order k,k>0, is constructed from the DBT of order k-1 by attaching four leaf nodes to each node in the DBT of order k-1.

It is easily seen that the four modem DBT of order k contains a total of $5^k$ nodes. The formula for each computer having M attached modems is: the M-modem DBT of order k contains a total of $M^k$ nodes. A suitable definition can be constructed for the case when the computers have a differing number of modems.

Relay Instructions are a type of Data Transmission Package used to distribute Fax Delivery Assignments to Fax Delivery Computers. There are four forms of Relay Instructions used in this invention and they are illustrated in items 1501–1504 of FIG. 15. A Relay Instructions DTP is transmitted by a sending computer to a receiving computer, and following the reception the receiving computer processes the Relay Instructions DTP. This processing was indicated in item 509 of FIG. 5 in conjunction with items 712–713 of FIG. 7 and will be described in more detail below in the discussion on FIG. 17. Item 1501 illustrates the simplest form of Relay Instruction, consisting of the Fax Document and the receiving computer's Fax Delivery Assignment. The receiving computer, after receiving this Format One Relay Instructions DTP, commences to deliver the Fax Document to the indicated recipients. In practice, this processing step is accomplished by enqueuing a Fax Delivery Job in item 509 of FIG. 5, where the job JQE is used to list the Fax Recipients in the Fax Delivery Assignment.

A Format Two Relay Instructions DTP is illustrated in item 1502. This format consists of the Fax Document, the address of a GP computer, and the Fax Delivery Assignment for the addressed GP Computer. The GP Computer Address field contains any required information, such as a password, needed to connect to the receiving computer. After receiving a Format Two Relay Instructions DTP, the receiving computer ($RC_0$) extracts the GP Computer Address to yield a Format One Relay Instructions DTP, and then delivers the newly formed Relay Instructions DTP to the GP Computer ($RC_1$) defined by the extracted information. In practice, this processing step is accomplished by $RC_0$ enqueuing a Relay Instructions Job in item 509 of FIG. 5. Upon reception, $RC_1$ processes the received Format One Relay Instructions as above.

Recursion will be used to describe the third and fourth forms of Relay Instructions. Item 1503 illustrates Relay Instructions Format Three which consists of the Fax Document followed by a number N>0 of GP Computer Address/Relay Instructions pairs. The GP Computer Address part of the pair is the same as was defined above for Format Two Relay Instructions. The Relay Instructions part of the pair is a Relay Instructions DTP in any of the four formats and thus this is the recursive part of the description. The GP Computer Address/Relay Instructions pairs contained in other Relay Instructions are called Embedded Relay Instructions. After receiving a Format Three Relay Instructions DTP, the receiving computer ($RC_0$) sequentially processes the Embedded Relay Instructions, commencing with the first Embedded Relay Instructions. Processing the $i^{th}$ Embedded Relay Instructions consists of $RC_0$ forming a new Relay Instructions DTP from the Fax Document and the Relay Instructions for GP computer i, and then delivering the newly formed Relay Instructions DTP to the $i^{th}$ GP computer ($RC_i$). In practice, the sequential processing of the Embedded Relay Instructions is accomplished by $RC_0$ enqueuing Relay Instructions Jobs with appropriate priority levels in item 509 of FIG. 5, one job for each Embedded Relay Instructions.

Item 1504 illustrates Relay Instructions Format Four which consists of the Fax Document, a number N>0 of Embedded Relay Instructions, and a Fax Delivery Assignment. After receiving a Format Four Relay Instructions DTP, the receiving computer ($RC_O$) first sequentially processes all Embedded Relay Instructions, commencing with the first Embedded Relay Instructions. Following this, $RC_O$ then proceeds to delivering the Fax Document to the recipients listed in the Fax Delivery Assignment. In practice, the sequential processing of the Embedded Relay Instructions followed by the delivery of Fax Documents is accomplished using the priority mechanism of the receiving computer's Job Queue.

Figure 16:
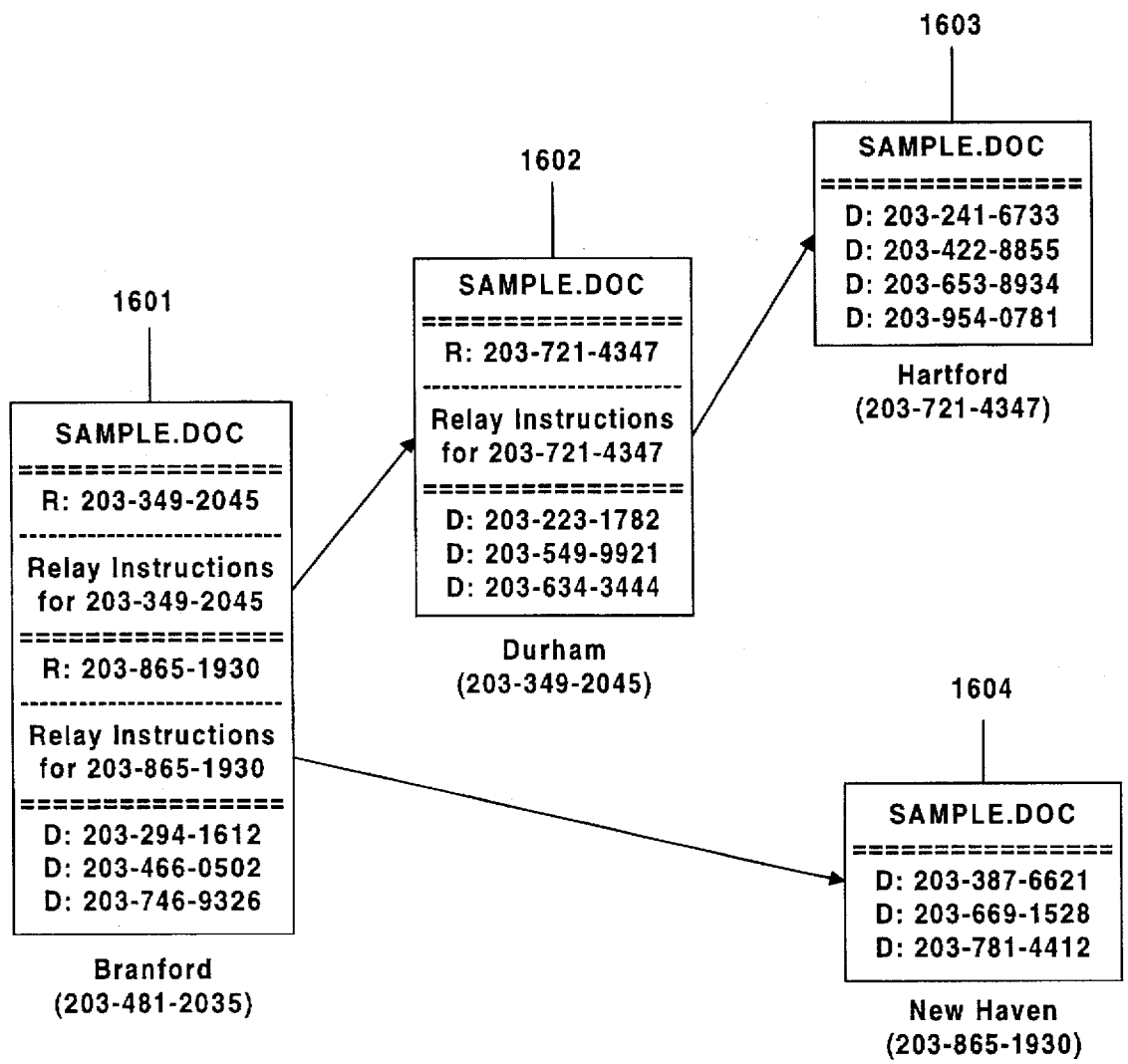
FIG. 16 is a diagram illustrating a detailed example of a relay instructions data transmission package.

FIG. 16 illustrates the creation and processing of four Relay Instructions examples. Item 1601 is a Format Four Relay Instructions received at a computer located in Branford. The Branford Computer first forms the Format Four Relay Instructions illustrated in item 1602 and delivers it to the Durham Computer, then it forms the Format One Relay Instructions illustrated in item 1604 and delivers it to the New Haven Computer, and lastly it delivers the Fax Document to three recipients. The Durham Computer first forms the Format One Relay Instructions illustrated in item 1603 and delivers it to the Hartford Computer, and lastly it delivers the Fax Document to three recipients. The Hartford Computer delivers the Fax Document to four recipients and the New Haven Computer delivers the Fax Document to three recipients.

Figure 17:
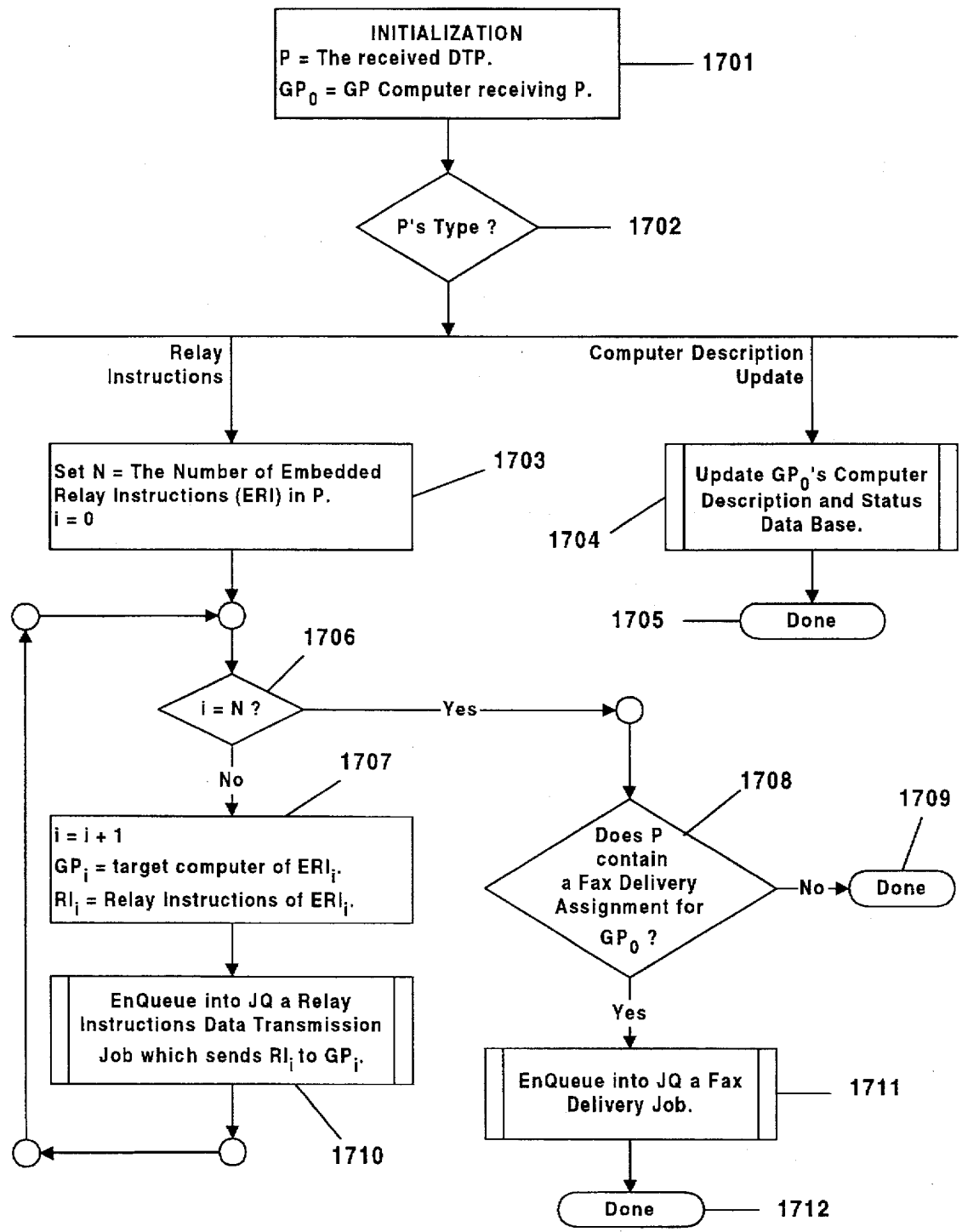
FIG. 17 is a flow chart describing the detailed processing steps required by a GP computer's software for creating processing jobs from a received relay instructions data transmission package, and from received other types of data transmission packages.

Thus, from the above discussions, it follows that the Master Fax Job Schedule for a Fax Broadcast Job is a Relay Instructions DTP "received" by the scheduling computer as the result of executing the Master Fax Job Scheduling Software. What remains to complete this part of the invention's description is a discussion of how the Relay Instructions DTP is generated. Before doing so, the details of Relay Instructions processing, illustrated in FIG. 17 as part of the GP computer's Data Receive Software, will be discussed. FIG. 17 is a detailed expansion of FIG. 5, item 509. Item 1701 is an initialization step in which the DTP received by GP computer $GP_O$ is identified as P. Item 1702 is a case selection on the two DTP types which P can receive. In item 1704 the Computer Description Update DTP, which can only be received from the scheduling computer, is reflected by directly making modifications to the indicated Computer Description and Status Data Base(s). In this case, following the update, the Software terminates in item 1705. The processing of Relay Instruction DTP types, which can be received from any computer, begins with an initialization step in item 1703. The number of received embedded Relay Instructions is determined and held in the variable N. Note that N can be zero in the case of a Format One Relay Instructions. The Embedded Relay Instructions, if any, are processed first in the loop consisting of items 1706, 1707 and 1710. During each loop iteration, a target computer and Relay Instructions are extracted from P in item 1707, and packaged as a new DTP, and then enqueued in item 1710 to the JQ with appropriate priority. The priority setting is crucial and the details of how it is calculated will be presented below in the discussion on FIG. 21. Following a successful test for loop termination in item 1706, a test is made in item 1708 to see if P contains a Fax Delivery Assignment for $GP_O$. If so, then in item 1711 a Fax Delivery Job is formed and enqueued to the JQ with low priority and the Software terminates in item 1712. If P does not contain a Fax Delivery Assignment for $GP_O$ then the Software terminates in item 1709.

Figure 18:
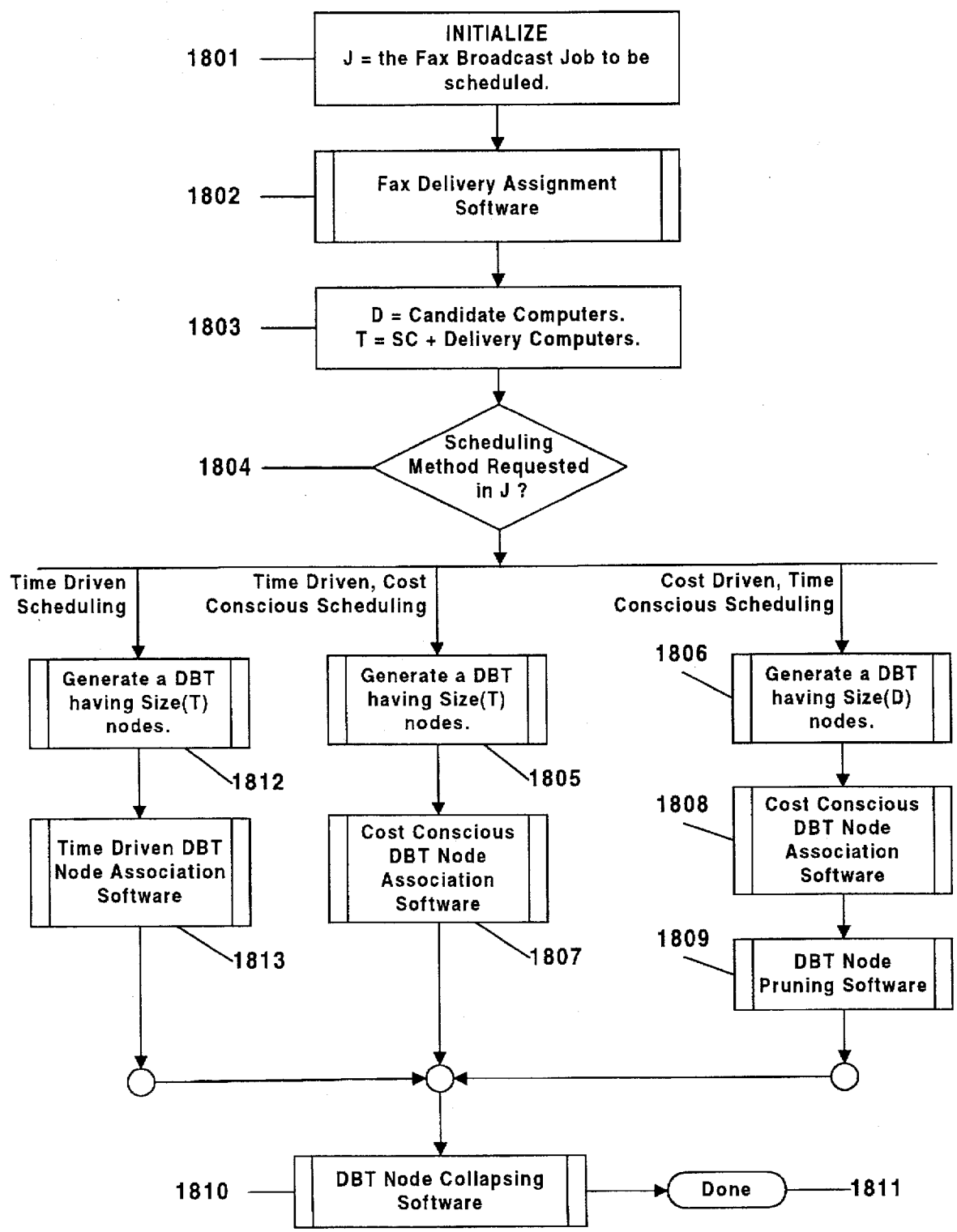
FIG. 18 is a flow chart describing the general processing steps required by the scheduling computer's software to construct the master fax job schedule for processing a fax broadcast job.

FIG. 18 illustrates the high level view of the Master Fax Job Scheduling Software. In item 1801 the Fax Broadcast Job to be scheduled is received by the Scheduling Software and initialized to variable J. In item 1802 the Delivery Assignments for each available computer are constructed by the scheduling computer's Delivery Assignment Software (FIGS. 10—2). Item 1803 identifies two sets which were computed in item 1802: the set D of computers that were Candidate Delivery Computers, and the set T of computers that were selected to be Fax Delivery Computers. The scheduling computer SC is adjoined to T, if not already present. Note that set D is a subset of all known computers and always includes SC. T is a subset of D and will be equal to D for a suitably large number of Fax Recipients when the selected Scheduling Goal is either Time Driven Scheduling or is Time Driven, Cost Conscious Scheduling.

The generation part of the Master Fax Job Scheduling Software manipulates a Directed Binomial Tree (DBT). If a Time Driven Scheduling request, with or without cost consciousness, is determined in item 1804 then a DBT having a number of nodes equal to the size of set T, Size(T), is generated in either item 1812 or in item 1805 respectively, by using software known in the art. If Cost Driven, Time Conscious Scheduling is requested, then a DBT having Size(D) nodes is generated in item 1806. In all cases the next step is to determine how the Fax Delivery Assignments will be distributed to Fax Delivery Computers. For Time Driven Scheduling, this is done in items 1813 and 1810. For Time Driven Cost Conscious Scheduling requests, this is done by items 1807 and 1810. In items 1813 and 1807 each node of the DBT is labeled (associated) with a unique Fax Delivery Computer-Fax Delivery Assignment pair, under differing methods. The details of the two forms of Node Association Software will be presented in the discussions on FIGS. 19a and 19b below. The Master Fax Job Schedule is then generated iteratively during the collapsing of the DBT to a single node in item 1810. The details of the Node Collapsing Software will be presented in the discussion on FIG. 21 below.

For Cost Driven, Time Conscious Scheduling requests, item 1808 parallels item 1807, the difference being that the Node Association Software starts with a DBT potentially having more nodes, one for each Candidate Delivery Computer, than the number of Fax Delivery Computers. The Node Association Software in Cost Driven, Time Conscious Scheduling associates a unique Distribution Computer with each node of the DBT. By definition of the sets of computers, each Fax Delivery Computer will be associated with a DBT node. In the Cost Driven, Time Conscious Scheduling Strategy, before the DBT is collapsed in item 1810, any extraneous nodes are pruned from the DBT in item 1809. The details of the Node Pruning Software will be presented in the discussion on FIG. 20 below.

The DBT Node Association Software illustrated in FIG. 19a, which is used during Time Driven Scheduling, begins with an initialization step in item 1951. B is assigned a representation of the input DBT, of which several such representations are known in the art. V is assigned the set of all Delivery Computers which were identified in item 1802 of FIG. 18, each of which now becomes involved in distributing Relay Instructions and/or Fax Delivery Assignments. In item 1952 the first association of a computer to a DBT node is made, wherein the scheduling computer SC is associated with the root node of the B. As is common in the art, the act of associating a computer and a DBT node will be referred to as "labeling" the node, the terminology coming from the act of drawing labels on DBT diagrams. Indeed, the example Master Fax Job Schedule of FIG. 16 is a labeling of the example DBT given in item 1303 of FIG. 13.

After labeling B's root note in item 1952, since it is desired to associate a computer with no more than one of B's nodes, SC is removed from future consideration by removing it from V. Item 1953 is the Software's termination condition, triggered when all of B's nodes are labeled with a Distribution Computer. Before the software terminates in item 1956, a second labeling of B's nodes is made in item 1954. This second labeling consists of the Fax Delivery Assignment of the computer labeling the node. Items 1953, 1955, 1957 and 1958 form a loop and during each loop iteration one additional node of B is labeled. In item 1955 one of the computers not yet used as a node label in B is selected at random. The selected computer is denoted as Computer j and it is used for labeling during this loop iteration. In item 1957 one of B's unlabeled nodes is selected at random and is labeled with Computer j. The loop terminates in item 1958 where the computer used to label the selected node is removed from consideration for subsequent loop iterations.

Figure 19:
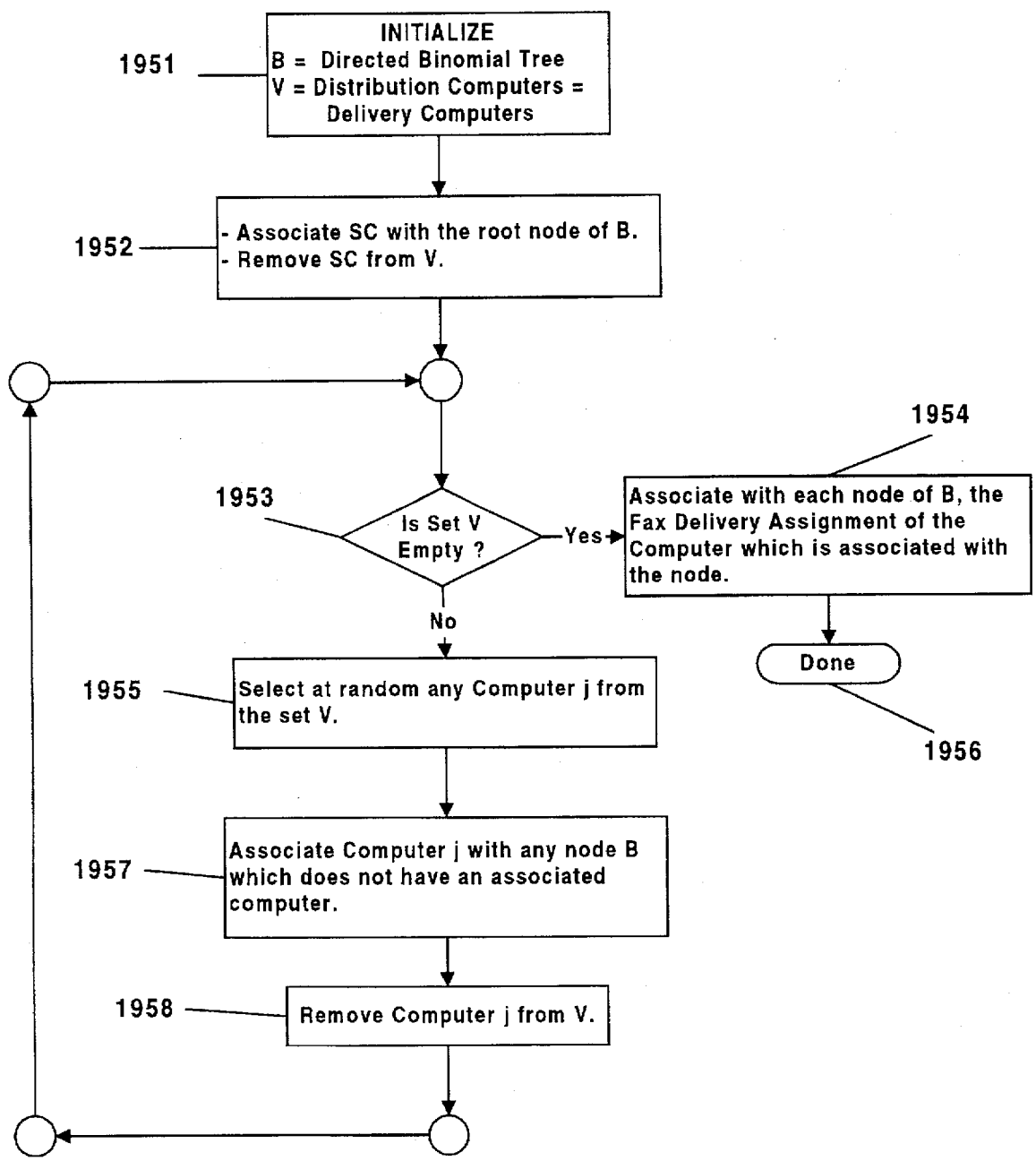
FIG. 19(a) is a flow chart describing the detailed processing steps required by the scheduling computer's software to associate fax delivery computers with the nodes of a directed binomial tree.
FIG. 19(b) is a flow chart similar to 19(a), but the node association software is cost conscious.
Figure 19:
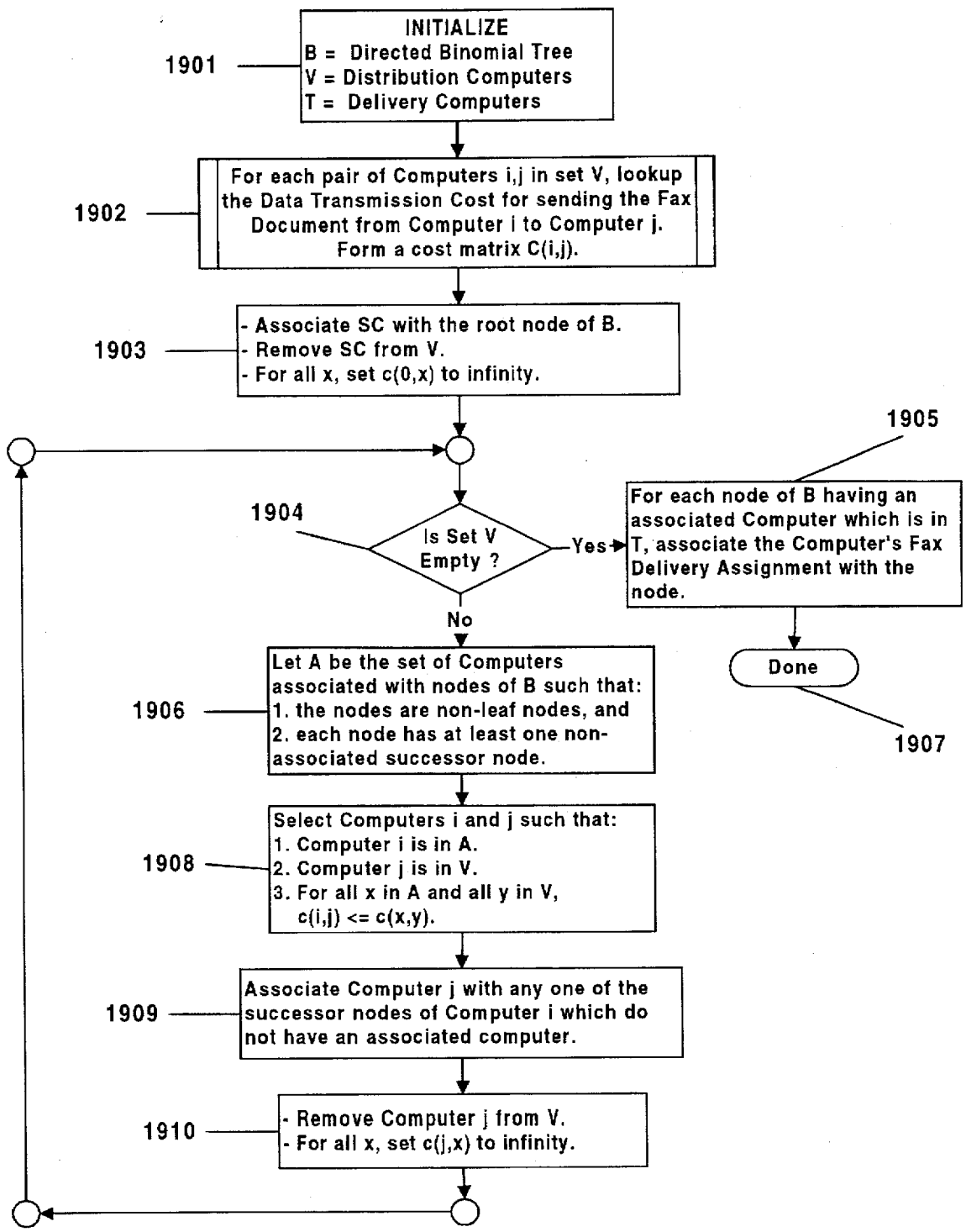

The Cost Conscious DBT Node Association Software illustrated in FIG. 19(*b*) begins with an initialization step in item 1901. B is assigned a representation of the input DBT, of which several such representations are known in the art. V is assigned the set of all Candidate Delivery Computers identified in item 1802 of FIG. 18, and these computers now become candidates for distributing the Relay Instructions and/or Fax Delivery Assignments. T is assigned the set of Fax Delivery Assignment- Fax Delivery Computer pairs. In item 1902 the Telephone Number and Toll Rate Data Base is again used, this time to compute a cost matrix which focuses on the cost of computer-to-computer data transfers. The elements of the matrix are computed by looking up the communication cost per unit time and then multiplying this rate by the estimated time to transmit the Fax Document. As discussed above, the number of bytes in the Fax Document normally dominates the size of a DTP. In item 1903 the first association of a computer to a DBT node is made, wherein the root node of B is labeled with the scheduling computer SC.

After labeling B's root node in item 1903, since it is desired to associate a computer with no more than one of B's nodes, SC is removed from future consideration by removing it from V and by setting to infinity the cost of transmitting the Fax Document from SC to any other computer. Item 1904 is the software's termination condition, triggered when all of B's nodes are labeled with a Distribution Computer. Before the software terminates in item 1907, a second labeling of B's nodes is made in item 1905. Each node of B that is labeled with a Distribution Computer which also serves as a Fax Delivery Computer is given a second label consisting of the Fax Delivery Computer's corresponding Fax Delivery Assignment. In the case of Time Driven, Cost Conscious Scheduling, every DBT node will get this second labeling. Items 1904, 1906, 1908–1910 form a loop and during each loop iteration one additional node of B is labeled. In item 1906 the nodes of B that are eligible for labeling are identified. An eligible node is any non-labeled node whose parent node is labeled. Item 1906 expresses this by identifying the set A of computers that label the parent nodes of eligible nodes. In item 1908 the loop's labeling decision is made by selecting from all pairs formed from the eligible nodes and the Distribution Computers not yet used as a label, that pair which minimizes the cost of transmitting the Fax Document from the Distribution Computer labeling the parent node to the Distribution Computer which might label the eligible node. Note that the involved parent node might have several unlabeled successor nodes, any of which will satisfy the decision making criteria. In this embodiment of the invention, as indicated in item 1909, the selection is made at random. The loop terminates in item 1910 where the Distribution Computer used to label the selected node is removed from consideration for subsequent loop iterations.

Figure 20:
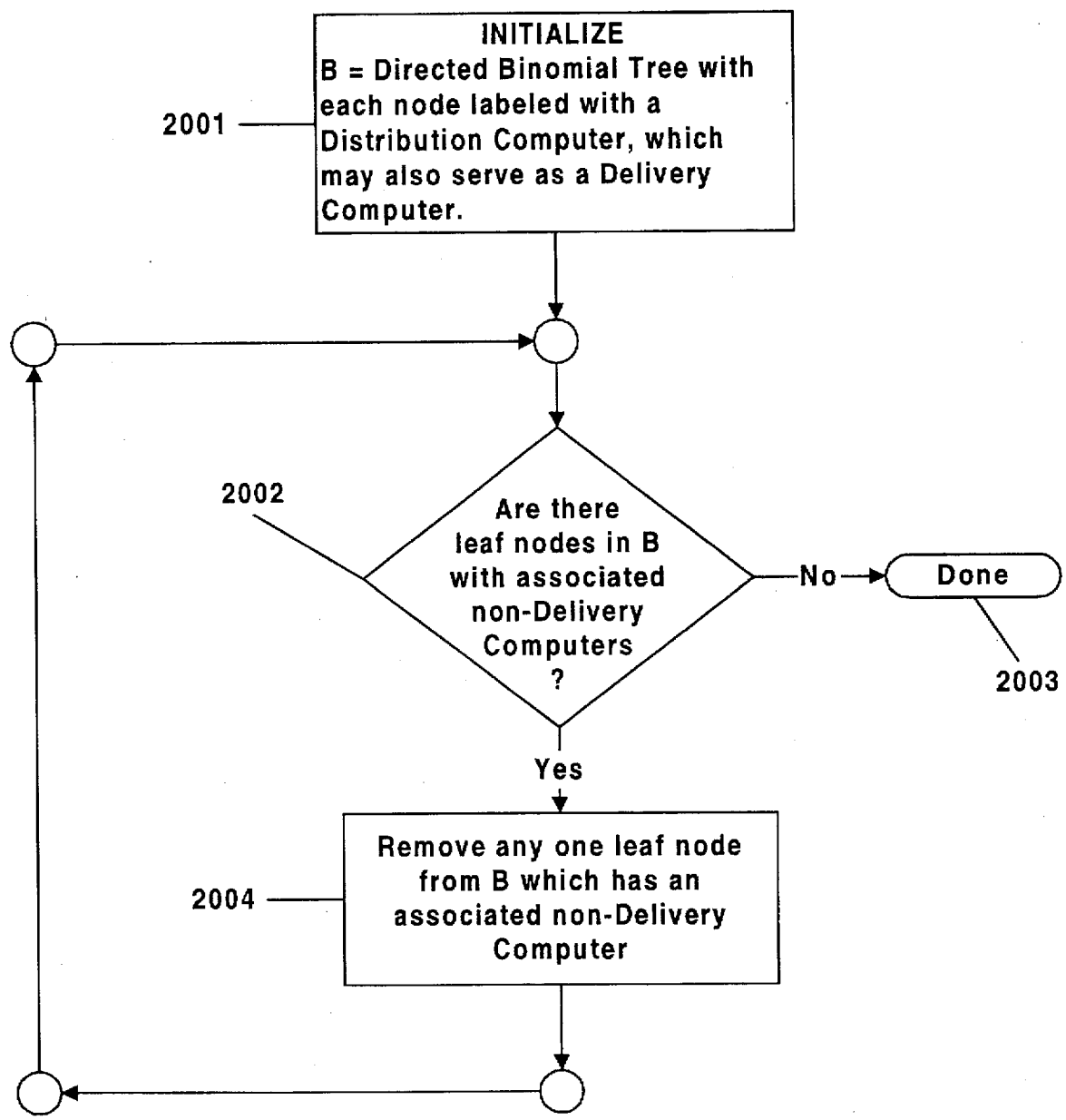
FIG. 20 is a flow chart describing the detailed processing steps required by the scheduling computer's software to eliminate directed binomial tree nodes which do not correspond to computers which contribute to the delivery of faxes.

The DBT Node Pruning Software illustrated in FIG. 20, cleans up an anomaly that may occur when the use of Cost Driven, Time Conscious Scheduling is requested in the Fax Broadcast Job. When Cost Driven, Time Conscious Scheduling is requested, to reduce distribution costs, a computer which does not deliver faxes might be used to transmit a Relay Instructions DTP containing fax delivery instructions to a computer which does deliver faxes. The anomaly, which will become clearer following the discussion below on collapsing a DBT, is eliminated by the items 2002 and 2004 in FIG. 20. Item 2001 is an initialization step that sets B to represent the fully labeled DBT. In item 2002 a test is made for the anomaly: are there leaf nodes in B which are labeled with Distribution Computers which do not deliver faxes? If not, then the Software terminates in item 2003. If so, then one such leaf node is selected at random from the aggregate of such leaf nodes, and the selected leaf node and its directed edge are removed from B. Note that the removal could result in forming a new leaf node that is labeled with a Distribution Computer which does not deliver the Fax Document to Fax Recipients. This new leaf node would be removed in a subsequent loop iteration.

Figure 21:
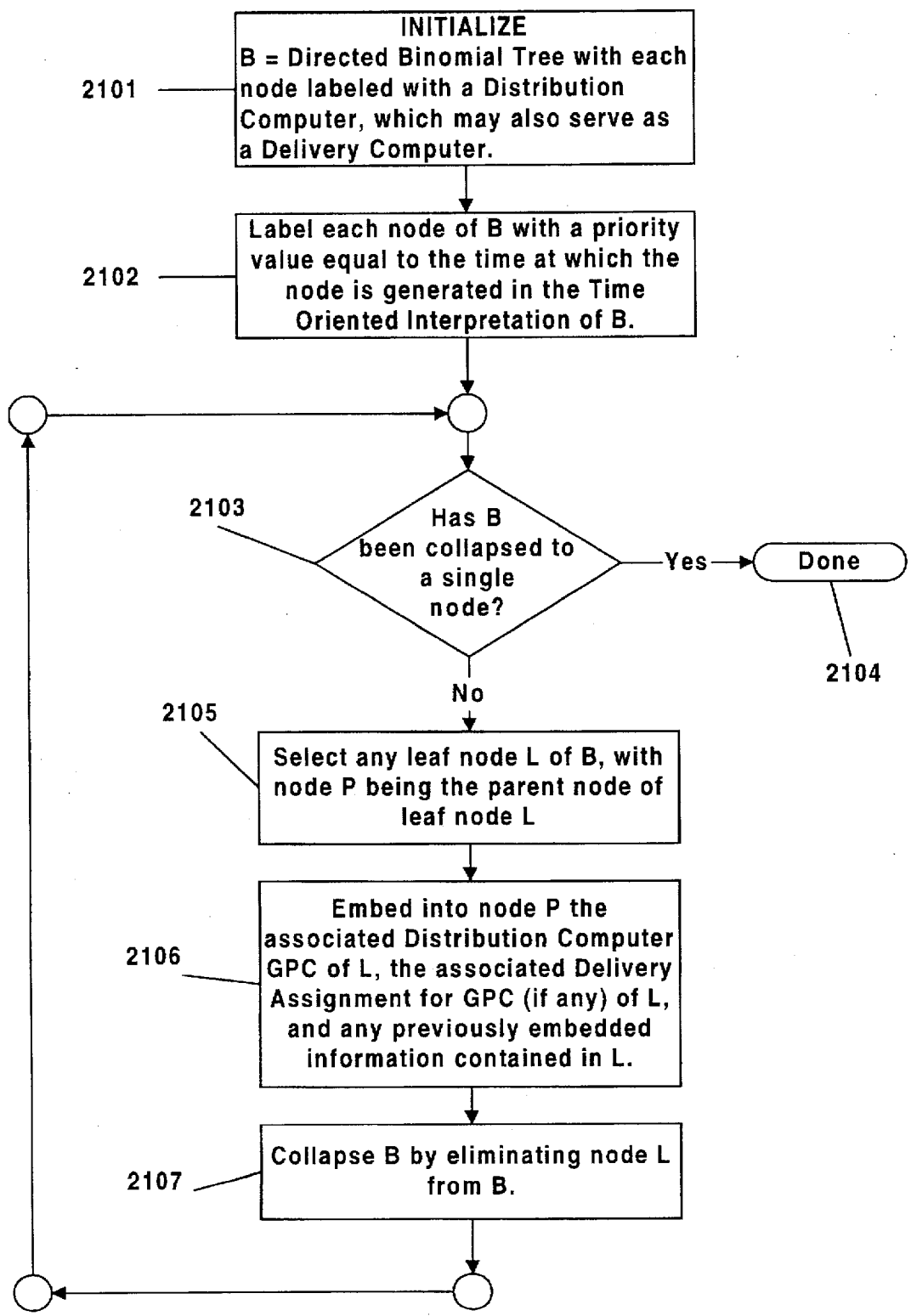
FIG. 21 is a flow chart describing the detailed processing steps required by the scheduling computer's software to collapse the nodes of a directed binomial tree to a single node.

The final step in the Master Fax Job Scheduling Software is to generate the Relay Instructions DTP that defines the Master Fax Job Schedule. FIG. 21 illustrates this software. Item 2101 is an initialization step that sets B to a fully labeled DBT; at this point in the algorithm it is guaranteed that each leaf node of B is labeled with a Fax Delivery Computer. That is, initially each leaf node is labeled with a Format One Relay Instructions DTP. In item 2102 a "priority" label is added to each node of B. The priority value used to label B's nodes comes from viewing B as a Time Oriented DBT. Each node is assigned as its priority a value equal to the time at which it is generated under the Time Oriented Interpretation of B (lower values have higher priority). Item 2103 is the Node Collapsing Software's termination condition, consisting of a test on the number of nodes currently present in B. If the node count is one, then the Software terminates in item 2103 and the Relay Instructions labeling this single node is the resulting Master Fax Job Schedule. If there is more than one node in B, the loop body defined by items 2105–2107 is executed. In item 2105, one of B's leaf nodes (L) is selected for elimination, using random selection if there are multiple leaf nodes. Node L is eliminated by first embedding its label into its parent (P) node and then pruning L from B. The effect this has, in terms of Relay Instructions, is to create either a Format Three or Format Four Relay Instruction DTP in P; the operational effect this has, in terms of delivering Relay Instructions, is the Distribution Computer labeling P will distribute Relay Instructions to the computer labeling L by enqueuing a Relay Instructions DTP at the indicated priority. If P is labeled with a Distribution Computer which is not a Fax Delivery Computer, then a Format Three Relay Instructions DTP is created by the embedding. If P is labeled with a Fax Delivery Computer, then a Format Four Relay Instructions DTP is created by the embedding. The embedding takes place in item 2106 and the pruning takes place in item 2107. Thus, B's node count is reduced by one and the Software eventually terminates with a resulting Master Fax Job Schedule.

Figure 22:
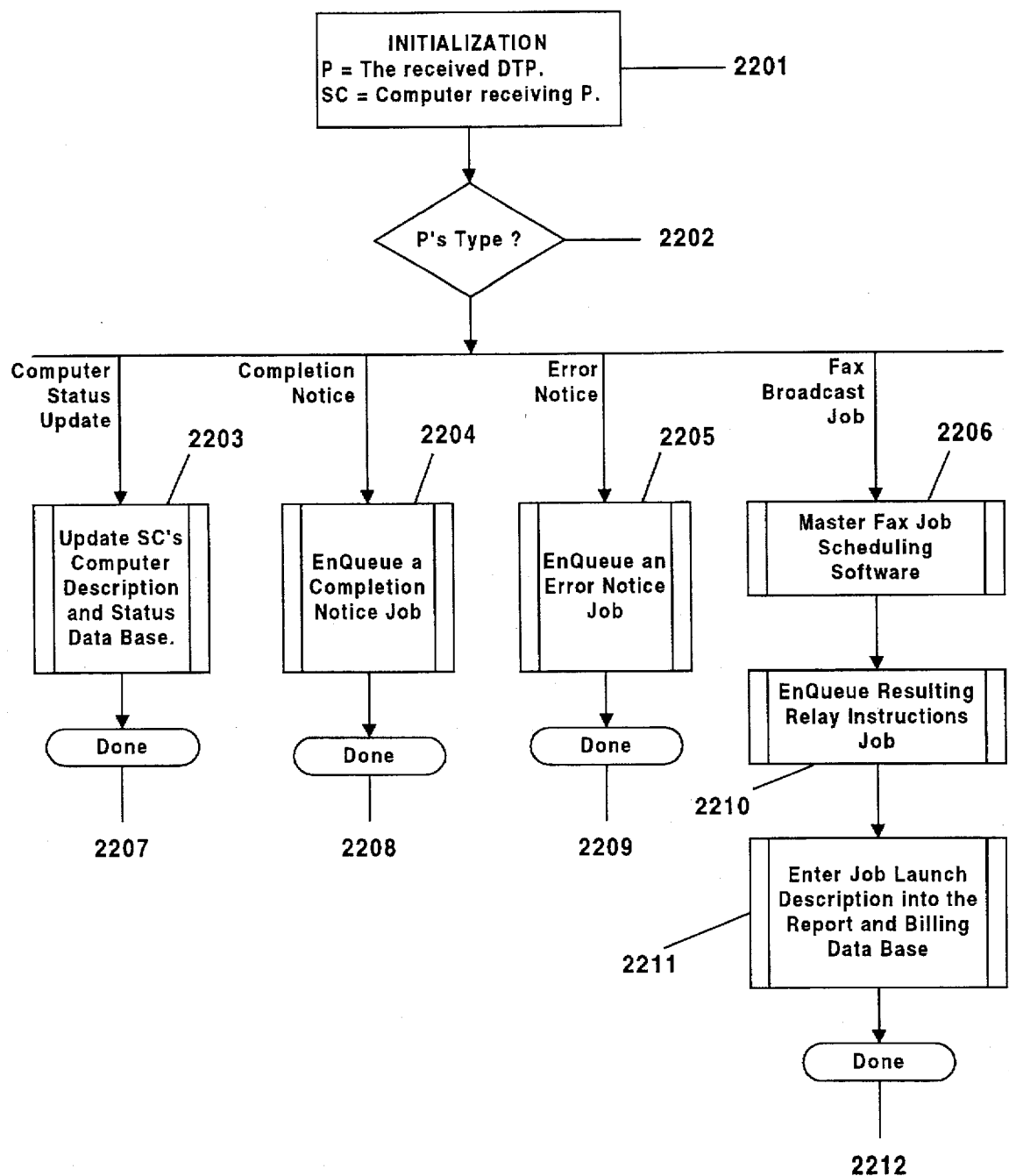
FIG. 22 is a flow chart describing the additional general processing steps required by the scheduling computer's data receive software, which are adjoined to those of a GP computer which were presented in FIGS. 5 and 17, for creating processing jobs from a received fax broadcast job data transmission package, and from other types of received data transmission packages.

Having described all dependent software, the details of the scheduling computer's Data Receive Software can now be described. FIG. 22 is a detailed expansion of FIG. 5 item 509. When this Software is adjoined with FIG. 17 the result is the scheduling computer's Software which generates jobs from received DTPs. Item 2201 is an initialization step in which the DTP received by the SC is identified as P. Item 2202 is a case selection on the six DTP types which the scheduling computer can receive. Four new cases on P's type are shown in FIG. 22 and the two other cases are analogous to the cases listed in FIG. 17. In item 2203 the Computer Status Update DTP is processed directly by making modifications to the indicated Computer Description and Status Data Base. In this case, following the update, the Software terminates in item 2207. In item 2204 a Completion Notice type DTP, which can be received from any GP computer, is enqueued as a Completion Notice Job and then the Software terminates in item 2208. Details on processing Completion Notice Jobs will be presented below in the discussion on FIG. 25. In item 2205 an Error Notice type DTP, which can be received from any GP computer, is enqueued as an Error Notice Job and then the Software terminates in item 2209. Details on processing Error Notice Jobs will be presented below in the discussion on FIG. 26.

Item 2206 begins the processing of a Fax Broadcast Job DTP that is received via modem dial-in. Rather than enqueuing the job, in the single modem embodiment of this invention the received Fax Broadcast Job is processed immediately. In item 2206 the Master Fax Job Scheduling Software of FIG. 18 produces a resulting Master Fax Job Schedule. The Schedule is then enqueued at the highest priority level to the scheduling computer's JQ as a Relay Instructions Job in item 2210. In item 2211 the launching of a Fax Job's processing is recorded in the Report and Billing Data Base. The information recorded includes the time of launch, the Master Fax Job Schedule itself, and the estimated time of completion for each computer involved in processing the Fax Broadcast Job. Following these data base entries, the Software terminates in item 2212.

Figure 23A:
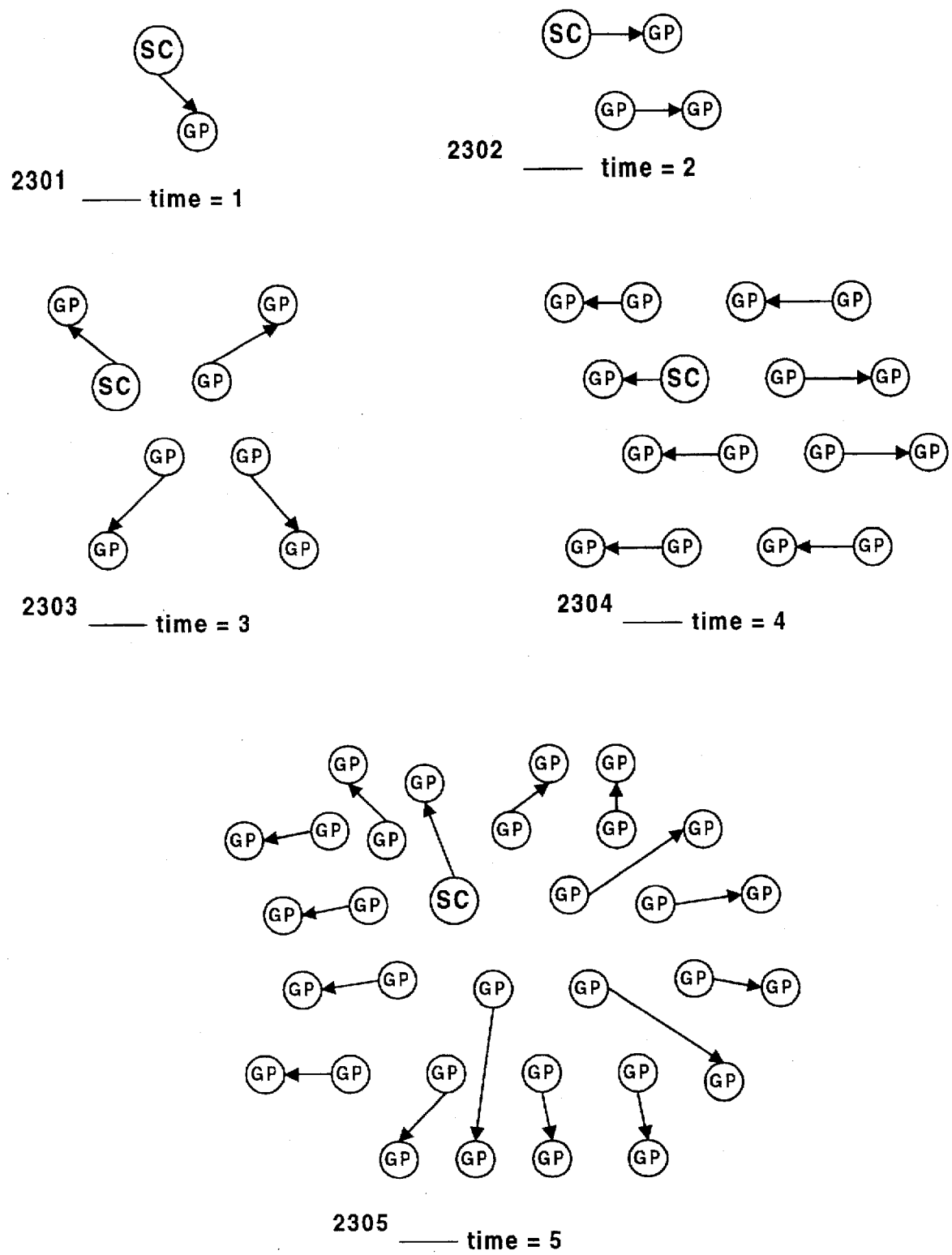
FIGS. 23(a) and (b) illustrate the relay instructions distribution chain reaction that is initiated by the scheduling computer.

FIGS. 23a and 23b illustrate the exploding chain reaction of Relay Instructions DTP deliveries which ensues following the enqueuing on the scheduling computer, denoted by SC, of a Relay Instructions Job which represents a Master Fax Job Schedule. Ideal conditions are assumed for this illustrative example. In item 2301, at time unit one, the scheduling computer sends the highest priority Relay Instructions DTP to a GP computer. This is represented by a directed arc between the SC and the GP which indicates that the SC is transmitting to the GP. In item 2302, at time unit two, there are two deliveries in progress: SC sends to its second highest priority GP, and the GP which received at time unit one sends to its highest priority GP. In item 2303, at time unit three, there are four deliveries in progress, each involving sending to a new GP computer. Items 2304–2307 continue this explosion with there being $2^6=64$ parallel distributions in progress at time seven.

Figure 24:
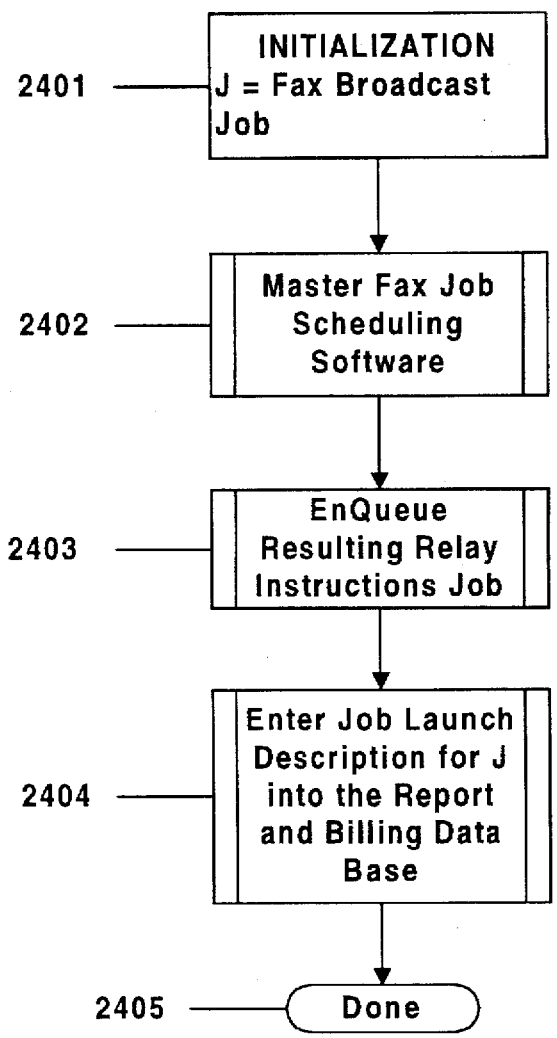
FIG. 24 is a flow chart describing the general processing steps required by the scheduling computer's software to process a fax broadcast job that is either received from another computer or is internally generated by the scheduling computer.

In the discussion of FIG. 22 it was indicated that in this embodiment of the invention Fax Broadcast Jobs received over the modem are scheduled without using the Job Queue mechanism. In other parts of the Software, and in extensions to the current embodiment, it will be necessary to invoke the Master Fax Job Scheduling Software operating on Fax Broadcast (Sub)Jobs which come from other sources and in these cases the Job Queue mechanism will be used. FIG. 24 illustrates the JQ Handler Software for Fax Broadcast Jobs. Item 2401 is an initialization step in which the Fax Broadcast Job is identified as variable J. In item 2402 the Master Fax Job Scheduling Software of FIG. 18 produces a resulting Master Fax Job Schedule which is enqueued to the scheduling computer's JQ as a Relay Instructions Job in item 2403. In item 2404 the launching of a Fax Job's processing is recorded in the Report and Billing Data Base. The information recorded includes the time of launch, the Master Fax Job Schedule itself, and the estimated time of completion for each computer involved in processing the Fax Broadcast Job. Following these data base entries, the Software terminates in item 2405.

Thus far an open loop mechanism has been described for processing a Fax Broadcast Job. The scheduling computer, which has ultimate responsibility for all Fax Deliveries, needs to be sure that Relay Instructions arrive at the indicated Distribution Computers and that the Fax Delivery GP Computers successfully complete the indicated Fax Delivery processing. In addition, the scheduling computer needs to know for each recipient in the Fax Broadcast Job whether or not the Fax Document was successfully delivered. The invention's Completion Notice DTP, in conjunction with making recordings in the Report and Billing Data Base (RBDB), is the vehicle for closing the loop.

The recording process begins when the scheduling computer sends Relay Instructions Jobs to GP computers. After transmitting a Relay Instructions DTP to a receiving GP computer, the scheduling computer records in the RBDB that the GP computer has received its Relay Instructions. This recording is done in the scheduling computer's Data Delivery Software, FIG. 4 item 413. Any Fax Deliveries processed by the scheduling computer are also recorded in the RBDB. This recording is done in the scheduling computer's Fax Delivery Software, FIG. 6 items 604 and 613.

Figure 25:
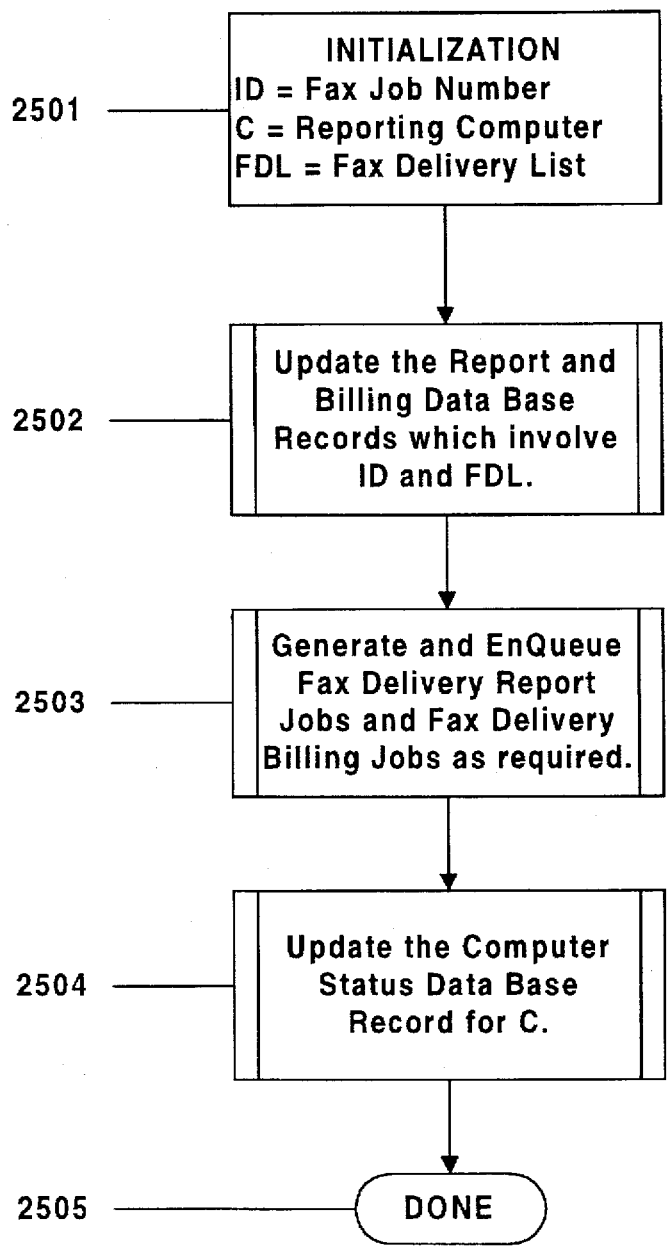
FIG. 25 is a flow chart describing the general processing steps required by the scheduling computer's software to process a job completion notice data transmission package that is received from another computer.

After completing its Fax Delivery processing, each Delivery GP computer in the Master Fax Job Schedule is expected to send to the scheduling computer a Completion Notice DTP. The number of bytes in a Completion Notice DTP is relatively small and thus, for a large number of Fax Recipients, the cost of these transmissions is an insignificant part of the total Fax Broadcast Job processing cost. FIG. 25 illustrates the scheduling computer Software handling of Completion Notices received from GP computers. Item 2501 is an initialization step in which the involved Fax Broadcast Job is identified (ID), the reporting GP computer is identified (C), and the assigned Fax Delivery List (FDL) is identified. In item 2502 two forms of RBDB recordings take place. First, each Fax Recipient in the FDL is recorded as either a successful delivery or as a failed delivery. Second, C and all its predecessor GP computers in the Master Fax Job Schedule for ID are recorded as having received their Relay Instructions. That is, since C has received its Relay Instructions each computer along the chain of Distribution Computers that starts with the scheduling computer and that ends with C must also have received their Relay Instructions. In item 2503 a check is made to see if all GP computers involved in processing the Fax Broadcast Job ID have sent Completion Notices and if so, report and billing jobs are created. In item 2504 GP computer C's status is updated in the Computer Status Data Base to indicate that C is active. If a Status DTP was also included with the transmission which sent the Completion Notice, then in item 2504 C's current activity load is also updated. The Software then terminates in item 2505.

Once the Master Fax Job Schedule has been constructed and Fax Broadcast Job processing has begun, the scheduling computer must ensure that timely Fax Delivery attempts are made to all indicated Fax Recipients even if unforeseen errors arise. The Master Fax Job Schedule was constructed based on knowledge of GP computer availability and load, both of which may change subsequent to the construction of the Schedule. There are two mechanisms in the invention which are used to guarantee that Fax Delivery attempts are made to all indicated Fax Recipients in a timely fashion: the Error Notice DTP, and the scheduling computer's Job Progress Monitoring. Job Progress Monitoring will be described below in the discussions on FIGS. 27–29.

Figure 26:
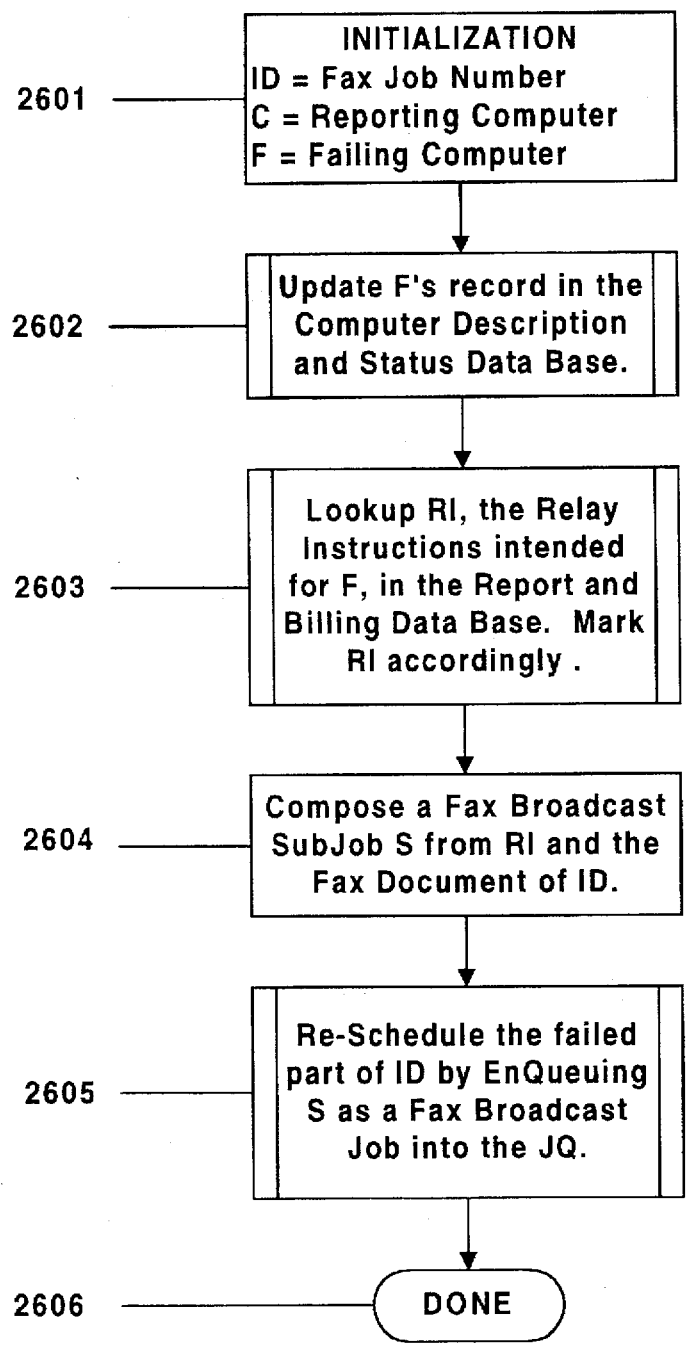
FIG. 26 is a flow chart describing the general processing steps required by the scheduling computer's software to process a job processing error notice data transmission package that is received from another computer.

An Error Notice DTP is the vehicle used by a GP computer (A) to inform the scheduling computer that it is unable to transmit a Relay Instructions DTP to an indicated other GP computer (B). This could happen if B becomes unavailable or if B has become so overloaded that it rejects A's attempt to deliver the Relay Instructions DTP. Upon receiving an Error Notice DTP, the scheduling computer's Data Receive Software will create an Error Notice Job in FIG. 5 item 509 and enqueue the JQE with a very high priority. FIG. 26 illustrates the scheduling computer's Software that handles processing the Error Notice DTPs received from GP computers. Item 2601 is an initialization step in which the job number of the involved Fax Broadcast Job is identified as ID, the GP computer sending the Error Notice DTP is identified as C, and the GP computer which either failed or rejected the Relay Instructions DTP is identified as F. In item 2602 the scheduling computer updates the Computer Status Data Base entry for F to reflect either that F is unavailable or to reflect its heavy load. Note that in the case of a heavy load, F's load will lighten as it completes Fax Deliveries and the scheduling computer will be informed of this as Completion Notice DTPs are received from F. In the case of F being unavailable, F remains unavailable until it sends a Status Update Notice to the scheduling computer. In item 2603 the Relay Instructions which C was to deliver to F are retrieved from the RBDB, are identified as RI, and a record is made in the RBDB indicating that re-scheduling is needed. In item 2604 a Fax Broadcast SubJob S is constructed from the Fax Recipients listed in RI. Included in this list are any and all Fax Recipients to which F would have delivered, and any and all Fax Recipients to which F's successor GP computers would have delivered. In item 2605 the SubJob S is enqueued in the scheduling computer's JQ as a Fax Broadcast Job with a high priority level and the Software then terminates in item 2606.

Figure 27A:
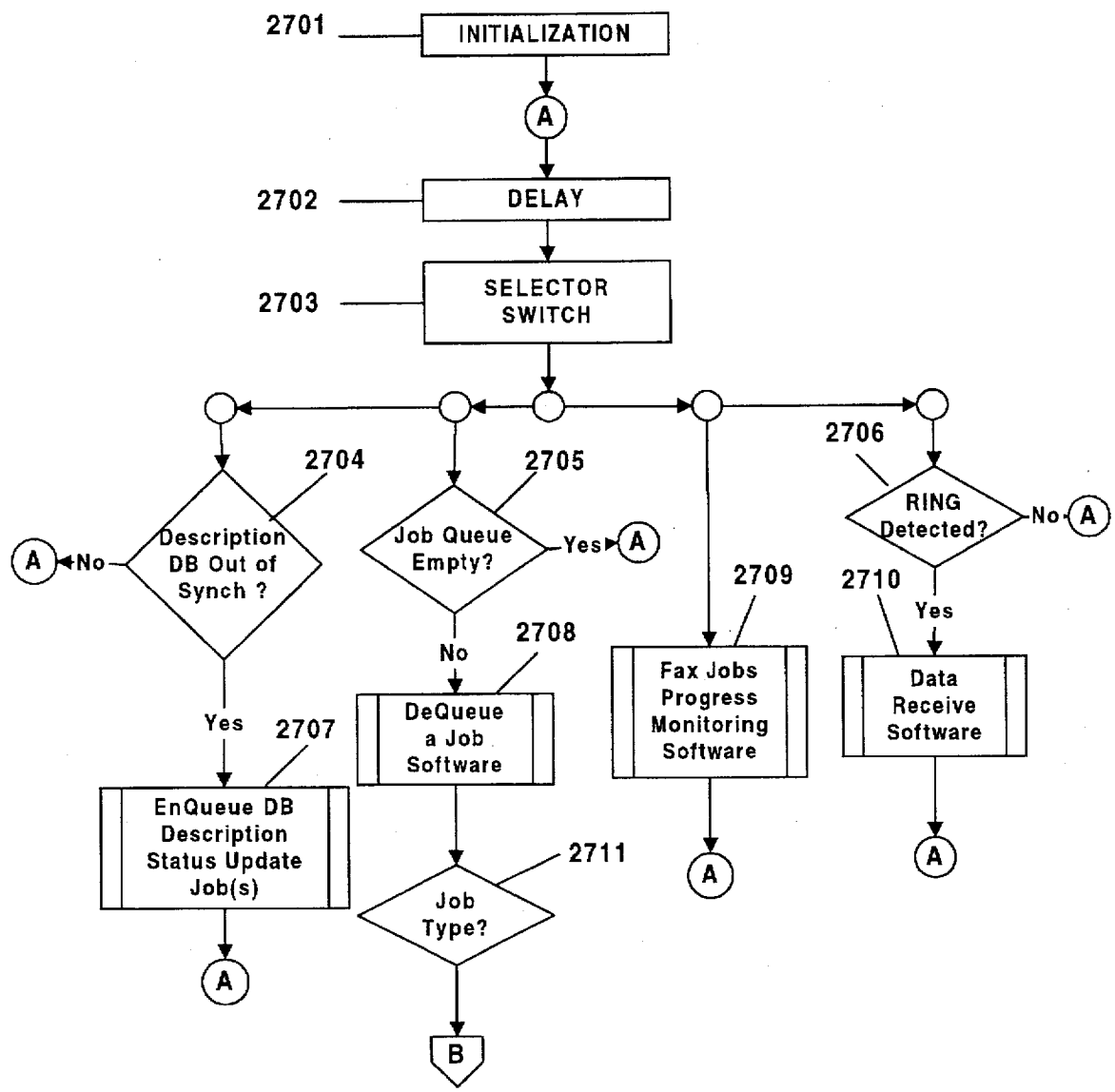
FIG. 27a is a flow chart describing the general processing steps required by the scheduling computer's software for controlling the operation of the software that is resident on the scheduling computer.

The Software that controls the operations of the scheduling computer (SC) is illustrated in FIGS. 27a and 27b. When SC is reset or powered on, an initialization step takes place in item 2701. Initialization involves testing the attached communication devices, updating data bases, and setting control parameters such as watch dog timers and selector switches. Since SC is a highly reliable computer, the initialization step takes place infrequently. Following initialization, the Software enters a non-terminating loop beginning at item 2702. Item 2702 is a time delay which allows the GP computers an opportunity to transmit DTPs to the SC. Without such a delay in this first embodiment of the invention, the SC could in effect be unavailable to receive DTPs over its single modem for an arbitrarily long period of time. Item 2703 is a selector switch that multiplexes the flow of control between items 2704–2706 and 2709 under a time division appropriate for the activities listed therein. In item 2704 a test is made to see if the any of SC's Computer Description Data Bases have recently changed and, if so, one or more Description and Status Data Base Update Jobs are enqueued to the JQ in item 2707. Note that if the SC's Description has changed, then a job will be created for each known GP computer. In item 2706, a test is made to determine if the modem has detected an incoming call. If so, then the SC's previously described Data Receive Software is invoked in item 2710. In item 2709 the Fax Jobs Progress Monitoring Software is invoked. This Software will be described below in the discussion on FIG. 28.

In item 2705, a test is made to see if there are entries in the JQ. If so, then in item 2708 the Queuing Discipline is used to dequeue the highest priority JQE from the JQ. Item 2711 is a case selector on the dequeued JQE element type. If a Fax Broadcast Job was selected, then the Fax Broadcast Job Handler Software that was described in the discussion on FIG. 24 is invoked in item 2712. If a Fax Delivery JQE was selected, then the Fax Delivery Software that was described in the discussion on FIG. 6 is invoked in item 2713. If a Relay Instructions JQE was selected, then the Data Delivery Software that was described in the discussion on FIG. 4 is invoked in item 2714 to transmit instructions and data to a GP computer. If a Completion Notice Job was selected, then the Completion Notice Handler Software that was described in the discussion on FIG. 25 is invoked in item 2715. If an Error Notice Job was selected, then the Error Notice Handler Software that was described in the discussion on FIG. 26 is invoked in item 2716. If a Computer Description Update Job was selected, then the Data Delivery Software is invoked in item 2717. If a Fax Delivery or Fax Billing Report Job is selected, then the prior art Report Writer Software is invoked in item 2718. Lastly, if a Deliver Status Probe Job is selected, then the Fax Delivery Status Probe Software is invoked in item 2719. The Fax Delivery Status Probe Software will be described below in the discussion on FIG. 29.

Note that when a GP computer agrees to receive a Relay Instructions DTP, it is contracting to timely process the Relay Instruction distributions and the Fax Deliveries contained in the Relay Instructions DTP. Unforeseen circumstances, however, could prevent the GP computer from fulfilling its obligations. For example, soon after receiving the Relay Instructions DTP there could be a power failure or the modem's PSTN subscriber line could go dead. Since no Error Notice DTP will be issued in cases such as these, there could be a considerable passage of time before the scheduling computer becomes aware that there is a problem, thereby compromising the goal of rapid Fax Delivery. The purpose of the Fax Jobs Progress Monitoring Software, illustrated in FIG. 28, is to make the scheduling computer aware of such possibilities in a more timely fashion. Item 2801 is an initialization step in which the number of Fax Broadcast Jobs in progress is identified as N and in which a Fax Broadcast Job counter index i is set to 1. The Progress Monitoring Software consists of an outer loop, starting at item 2802, which examines each Fax Broadcast Job in progress, and an inner loop, starting at item 2806, which examines the reporting status of each GP computer associated with the Fax Broadcast Job being examined. Items 2805 and 2802 control the outer loop and when it has completed, the Progress Monitoring Software terminates in item 2803.

A Delivering Computer is any GP computer that is involved with the processing of the Fax Broadcast Job. Item 2804 initializes the Progress Monitoring Software's inner loop by identifying the number M of Delivering Computers in Job i and by setting a Delivering Computer counter index j to 1. Items 2808 and 2806 control the inner loop and when it is completed the outer loop is iterated in item 2805. In item 2807 the $j_{th}$ GPC in the $i^{th}$ Fax Job is examined against the expected completion time recorded in the RBDB. If $GPC_j$ has completed or is not yet critically late, the inner loop iterates in item 2808. If $GPC_j$ is critically late in reporting completion, then a Delivery Status Probe Job for $GPC_j$ is enqueued in item 2810, provided such a Probe Job of GPC$_j$ is not already enqueued as determined by the test in item 2809. The inner loop is then iterated in item 2808.

Illustrated in FIG. 29 is the scheduling computer's Software for processing Delivery Status Probe Jobs. Item 2901 is an initialization step in which the computer to be probed is identified as GPC, the number of Fax Broadcast Jobs for which GPC is critically late is identified as N, and a Fax Broadcast Job counter index i is set to 1. In item 2902 an attempt is made by the scheduling computer to establish a modem connection with GPC. Connection in this case means that modems physically connect, the scheduling computer identifies itself to the GPC and passes a security test, and then the two computers agree to communicate on-line by using the Probe Protocol that is described below. In item 2903 a test to see if the connection was established takes place. Implied before proceeding to item 2907, but not depicted in FIG. 29, is a requeuing of the job to yield a multitude of connection attempts should the modem physically fail to connect in item 2902. Should the scheduling computer ultimately fail to establish a connection with GPC, then a System Alert is raised in item 2907.

The details of a System Alert lie outside the scope of this invention but would include activities such as placing a voice call or activating a repair man's beeper. At this point the scheduling computer assumes that GPC is unavailable and records this conclusion in item 2908 where an entry is made in the Computer Status Data Base. Then, in item 2911 each of GPC's outstanding Relay Instruction Jobs, one for each Fax Broadcast Job involving GPC as a Delivering Computer, are rescheduled as Fax Broadcast SubJobs. Note that when a connection with GPC cannot be established, there is a possibility that some or all of the Fax Deliveries for which GPC has responsibility might get duplicated due to the extreme recovery action.

A probe protocol is a dialog between the scheduling computer and a GP computer whose details are implied by the processing in item 2909. If the scheduling computer successfully connects with GPC in item 2903, then a loop through each Fax Broadcast Job that involves GPC takes place. Items 2904 and 2905 control the loop and when the loop finishes the Probe Software terminates in item 2906. In item 2909 the scheduling computer and GPC negotiate whether or not the deadline for the i$^{th}$ delivery can be moved out to an agreeable time. If so, then in item 2910 the scheduling computer updates the applicable RBDB entries. If not, then the scheduling computer tells the GPC to cancel the remainder of the i$^{th}$ delivery, and the applicable RBDB entries are updated accordingly in item 2912. Following the cancellation, in item 2914 a Fax Broadcast Sub Job for completing the i$^{th}$ delivery is created and enqueued to the scheduling computer JQ.

Several variations to the above discussions on Completion Notices, Error Notices, and scheduling computer Probe Jobs are now suggested for consideration when rendering this invention to practice. First, the definition of a Completion Notice can be extended to include sending information to the scheduling computer about a GP computer's successful delivery of Relay Instructions to other GP computers. Combined with appropriate modifications to the scheduling computer software, this extension provides the scheduling computer with more timely direct feedback on this aspect of the Fax Job Processing.

The second variation alters the GP computer software to periodically send Completion Notices to the scheduling computer rather than sending them immediately after creation. Combined with packaging several Completion Notices into a single DTP, and with suitable modifications to the scheduling computer software, this variation potentially reduces the number of connections needed to process a Fax Broadcast Job.

The third variation extends the data flow which occurs when the scheduling computer sends a DTP to a GP computer from single directional flow to bi-directional flow. Whenever the scheduling computer connects to a GP computer for the purpose of sending a DTP, during the connection the GP computer is given the opportunity to send to the scheduling computer any Completion Notices or Error Notices that are in the GP computer's Job Queue. This variation, called the "backflow notice" strategy, potentially reduces the number of connections needed to process a Fax Broadcast Job.

The fourth variation extends the backflow notice strategy to a chain of GP computers. Whenever a GP computer connects to another GP computer for the purpose of sending Relay Instructions, during the connection the receiving GP computer is given the opportunity to send to the sending GP computer any Completion Notices that have been "recently" generated by the receiving GP computer. This variation, called the "chained backflow notice" strategy, potentially causes a replication of individual Completion Notices to make their way back to the scheduling computer. When several Fax Broadcast Jobs are being processed simultaneously, suitable use of chained backflow notices potentially eliminates the need for the GP computers to initiate connections to the scheduling computer solely for the purpose of sending Completion Notices.

Figure 30:
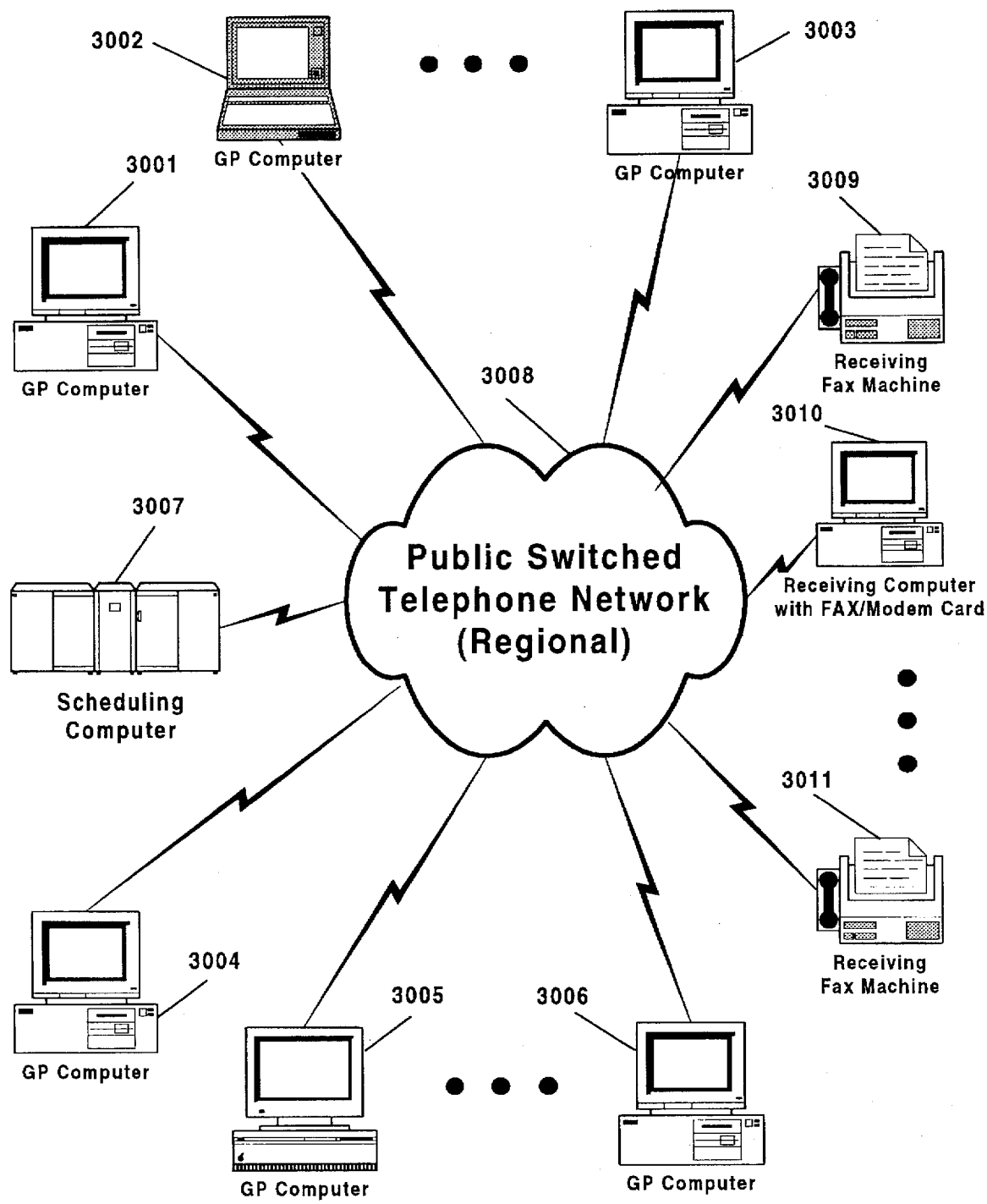
FIG. 30 is a schematic diagram that illustrates a single region scheduling computer, its GP computers, and fax reception apparatus, all of which communicate using the public switched telephone network.

FIG. 30 summaries the apparatus of the first embodiment of this invention. Item 3007 represents the single fault tolerant scheduling computer running the scheduling computer Software that was described above. Items 3001–3006 represent a variety of GP computers known to the scheduling computer, each of which is running the GP computer Software that was described above. Item 3008 represents the Public Switched Telephone Network, where in this embodiment of the invention the region covered is the Worldwide PSTN. Items 3009–3011 represent Fax Reception Devices. All computers are capable of communicating to each other via modem, and each computer is capable of delivering a Fax Document to any Fax Reception Device. Not shown directly is apparatus for transmitting a Fax Broadcast Job to the scheduling computer. Methods are known in prior art for doing such submission from a computer or from a fax machine.

SECOND EMBODIMENT

Figure 31:
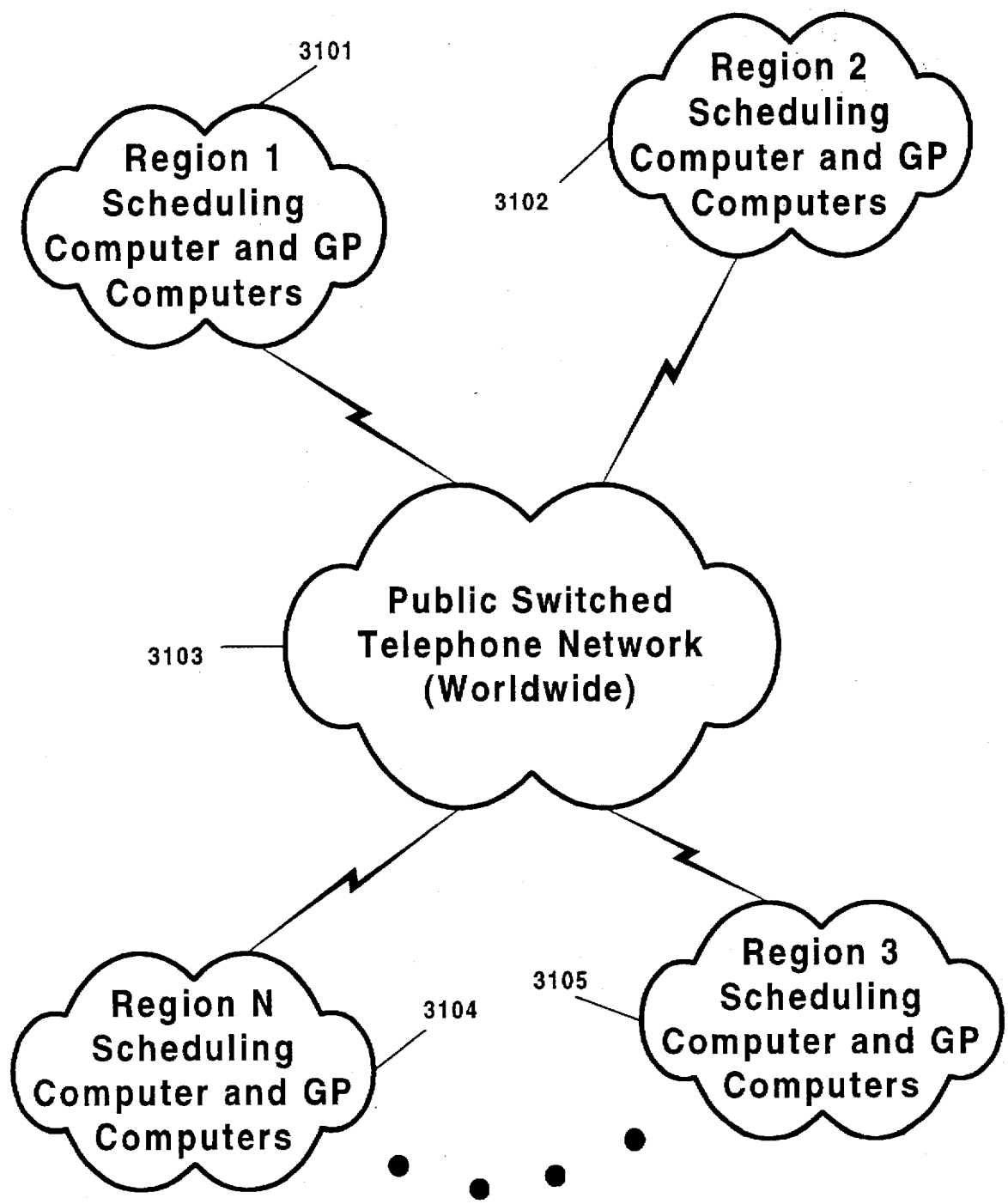
FIG. 31 is a schematic diagram that illustrates multiple regional scheduling computers and their GP computers, in which the scheduling computers and GP computers communicate using the public switched telephone network.

The second embodiment of the invention extends the methods and apparatus of the first embodiment from a single scheduling computer to multiple scheduling computers. FIG. 31 illustrates multiple scheduling computers, each of which is associated with a Region. A Region consists of a scheduling computer, a set of GP computers, and a subset of all PSTN Telephone Numbers. Items 3101, 3102, 3104, and 3105 represent Regions, each of which is an example of the apparatus illustrated in FIG. 30. The regional scheduling computers run the same software that was described for the first embodiment, with some additional software that is described below. The regional GP computers run exactly the same software that was described in the first embodiment of the invention.

One computer is said to "know about" another computer if the first computer maintains a Computer Description and Status Data Base which contains information about the second computer. Each GP computer knows about only one scheduling computer, that being the regional scheduling computer of the Region to which the GP computer belongs. Likewise, a regional scheduling computer knows about only the GP computers belonging to its Region. Each regional scheduling computer knows about all other regional scheduling computers. Thus, each computer can call and send data to any computer it knows about.

The Regional Telephone Number subsets are selected to be a partition of all PSTN numbers: that is, each subset is disjoint from each other subset and the Telephone Numbers gathered from all subsets combine to comprise the set of all PSTN Telephone Numbers. As in the first embodiment of the invention, each computer is capable of sending a Fax Document to any legal PSTN Telephone Number. The strategy, however, is for the Regions to represent geographic areas encompassing related sets of Telephone Numbers and to place GP computers at or near concentrations of telephone numbers. Thus, in practice, a GP computer will be scheduled to send Fax Documents only to the telephone numbers in the Region to which it belongs. In North America, for example, a Region could be defined as all the Telephone Numbers in one or in a multitude of area codes.

The first extension to the scheduling computer Software is to the scheduling computer's Description and Status Data Base, where additional information is recorded on all other regional scheduling computers. The following lists the information areas that a regional scheduling computer maintains about itself and about each other regional scheduling computer:

Physical Location and Operational Staff
Computer Configuration Description
Communication and Security Parameters
History and DB Synchronization Status The definition of these fields parallel the definitions given above in the first embodiment of the invention.

The second extension to the scheduling computer Software involves Fax Broadcast Job processing. While each regional scheduling computer is capable of receiving Fax Broadcast Jobs from any source, in practice Fax Broadcast Jobs will be submitted to the regional scheduling computer local to the source. The Fax Recipients in the Fax Broadcast Job are examined to determine the number of fax deliveries for each of the Regions. For any Region R having a sufficiently large number of Fax Recipients (threshold), the local scheduling computer will form a Fax Broadcast Sub Job that will be submitted to the scheduling computer for Region R.

When there is a small number of Regions, sequential submission of Fax Broadcast SubJobs to the regional scheduling computers by the local scheduling computer is sufficient. The same sequential submission strategy would be used in any representation of the second embodiment if the Fax Broadcast Job's Fax Recipients are such that only a small number of Regions have a recipient count greater than the threshold. If a Fax Broadcast Job causes the counts for a large number of Regions to exceed the threshold, then a third extension to the scheduling computer's Software is needed. In the third extension, Fax Broadcast Sub Jobs are submitted to regional scheduling computers in parallel. The parallelism is achieved by the local scheduling computer initiating a Fax Broadcast Sub Job submission chain reaction which takes place among the regional scheduling computers. This is analogous to the Fax Delivery Assignments distribution chain reaction that takes place among the GP computers; a phenomenon that takes place as a result of processing the Master Fax Job Scheduling Software on the invention's apparatus.

AN ILLUSTRATIVE EXAMPLE OF THE INVENTION

To illustrate the Fax Delivery chain reaction that takes place as a result of the methods and apparatus of this invention, a single scheduling computer example is given in which the Region covered is the State of Connecticut. Assume that the scheduling computer is located in the town of Branford and assume that there is available a set of 15 GP computers located in the following Connecticut municipalities: Bridgeport, Danbury, Enfield, Hartford, Meriden, Middletown, New Haven, New London, Norwalk, Norwich, Putnum, Stamford, Trumbull, Waterbury, Westport. For illustrative purposes, assume that the scheduling computer has received a Fax Broadcast Job consisting of 320 Fax Recipients and that it takes one time unit to deliver the Fax Document to a single Fax Recipient. In analyzing this example, we will ignore delivery cost and concentrate only on the chronological time required to deliver the 320 faxes. Assume further that the time required to relay the Fax Document and Fax Delivery Instructions between computers is one time unit. This is a valid assumption since the number of bytes required to represent Relay Instructions is dominated by the number of bytes needed to represent a typical Fax Document. Moreover, in practice the time required to relay a Fax Document between computers will be no more than the time required to deliver the Fax Document to a Fax Reception Device, and quite often less time will be required. In the analysis we will assume no transmission or other types of errors occur.

If the scheduling computer were to deliver the Fax Document sequentially to the Fax Recipients, it would take 320 time units to complete the Fax Broadcast Job. If the scheduling computer were to factor the problem so that each computer, including itself, is responsible for delivering to 20 Fax Recipients, and then sequentially instruct each of the 15 GP computers to deliver to 20 Fax Recipients, it would take 35 time units to complete the Fax Broadcast Job.

The following illustrates the method of this invention. As in the above sequential approach, the scheduling computer first factors the problem so that each computer, including the scheduling computer itself, is responsible for delivering to 20 Fax Recipients. The scheduling computer then initiates the Fax Delivery chain reaction by doing the following at chronological time 1:

The scheduling computer sends to the Bridgeport GP computer the Fax Document, telephone numbers for the Bridgeport GP computer's 20 Fax Recipients, and Relay Instructions.

At chronological time 2 the following takes place:

The scheduling computer sends to the Danbury GP computer the Fax Document, telephone numbers for the Danbury GP computer's 20 Fax Recipients, and Relay Instructions.

The Bridgeport GP computer sends to the Enfield GP computer the Fax Document, telephone numbers for the Enfield GP computer's 20 Fax Recipients, and Relay instructions.

At chronological time 3 the following takes place:

The scheduling computer sends to the Hartford GP computer the Fax Document, telephone numbers for the Hartford GP computer's 20 Fax Recipients, and Relay Instructions.

The Bridgeport GP computer sends to the Meriden GP computer the Fax Document, telephone numbers for the Meriden GP computer's 20 Fax Recipients, and Relay Instructions.

The Danbury GP computer sends to the Middletown GP computer the Fax Document, telephone numbers for the Middletown GP computer's 20 Fax Recipients, and Relay Instructions.

The Enfield GP computer sends to the New Haven GP computer the Fax Document, telephone numbers for the New Haven GP computer's 20 Fax Recipients, and Relay Instructions.

At chronological time 4 the following takes place:

The scheduling computer sends to the New London GP computer the Fax Document and telephone numbers for the New London GP computer's 20 Fax Recipients.

The Bridgeport GP computer sends to the Norwalk GP computer the Fax Document and telephone numbers for the Norwalk GP computer's 20 Fax Recipients.

The Danbury GP computer sends to the Norwich GP computer the Fax Document and telephone numbers for the Norwich GP computer's 20 Fax Recipients.

The Enfield GP computer sends to the Putnum GP computer the Fax Document and telephone numbers for the Putnum GP computer's 20 Fax Recipients.

The Hartford GP computer sends to the Stamford GP computer the Fax Document and telephone numbers for the Stamford GP computer's 20 Fax Recipients.

The Meriden GP computer sends to the Trumbull GP computer the Fax Document and telephone numbers for the Trumbull GP computer's 20 Fax Recipients.

The Middletown GP computer sends to the Waterbury GP computer the Fax Document and telephone numbers for the Waterbury GP computer's 20 Fax Recipients.

The New Haven GP computer sends to the Westport GP computer the Fax Document and telephone numbers for the Westport GP computer's 20 Fax Recipients.

Finally, at chronological time 5 all 16 computers commence delivering to their 20 Fax Recipients. Consequently, using the method and apparatus of this invention it would take 24 time units to complete the Fax Broadcast Job.

A more dramatic illustration of the time savings of this invention, too lengthy to present in detail, is a Fax Broadcast Job with 10,240 Fax Recipients, and a scheduling computer having available a set of 1,023 GP computers. One computer sequentially delivering to all Fax Recipients would take 10,240 time units and is most likely impractical. By assigning each computer 10 Fax Recipients and using sequential distribution, the Fax Broadcast Job would take 1,033 time units to complete the delivery to all Fax Recipients. However, using the chain reaction method of this invention, the Fax Broadcast Job would take 20 time units to complete the delivery to all Fax Recipients.

A third embodiment of the invention will now be described. In the first two embodiments of the invention, the scheduling computer achieves an exponential fax delivery chain reaction by using a binomial tree in constructing a master fax job schedule, the processing of which leads to all computers working in parallel at relaying instructions and/or delivering faxes. In this third embodiment, an exponential fax delivery chain reaction will be achieved without the necessity of all computers working in parallel during the entire processing of the fax broadcast job. This is done by the scheduling computer constructing a master fax job schedule based on a binary tree.

Figure 32:
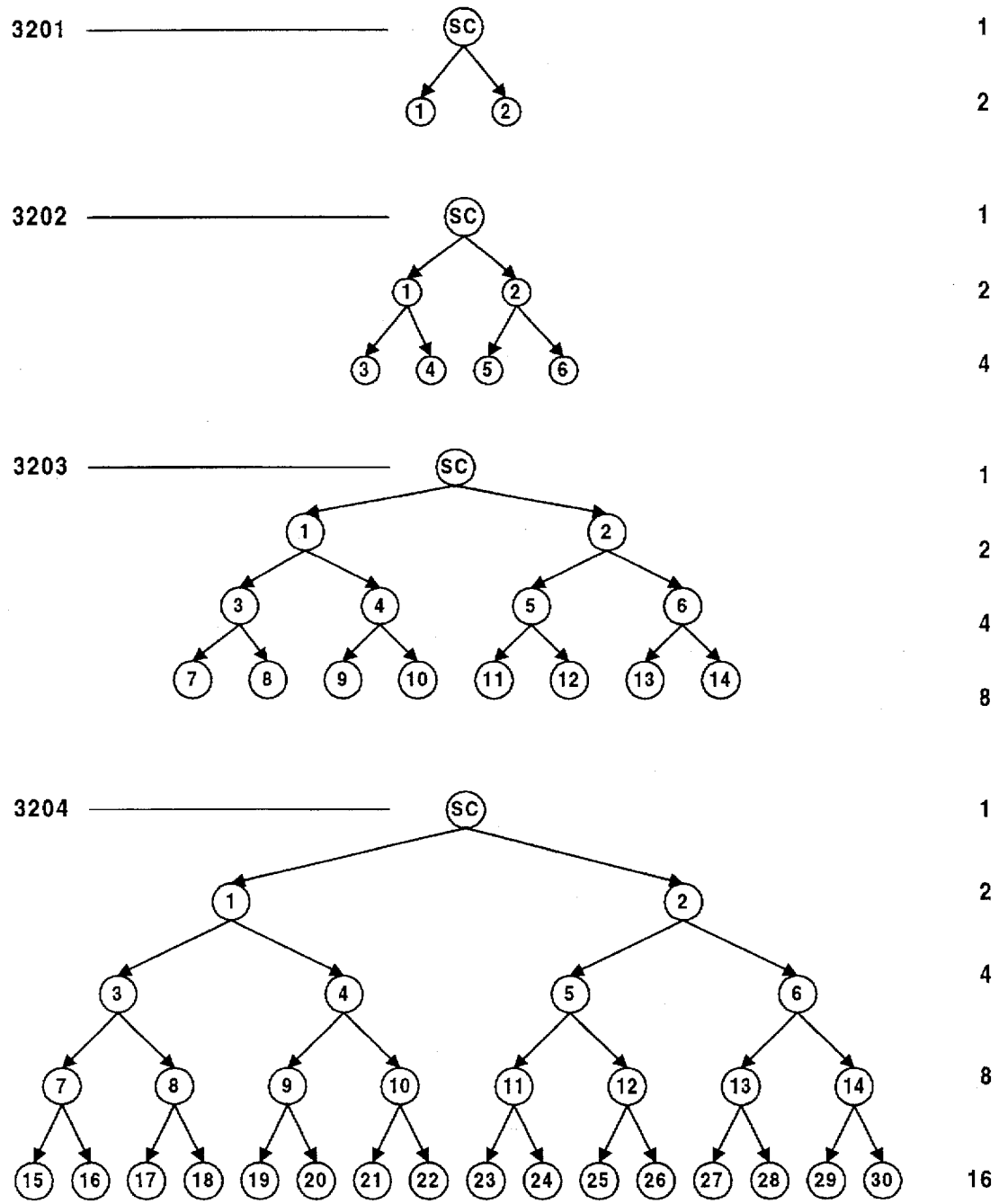
FIG. 32 is a diagram illustrating the directed binary tree data structure.

Each node in a binary tree has at most two successor nodes, which is in contrast to a binomial tree wherein there is no pre-defined limit on a node's number of successor nodes. In FIG. 32 four examples of complete binary trees are illustrated. The definitions of complete and partial binary trees are analogous to those in the above definition of binomial trees that accompanied the discussion on FIG. 13. Binary trees can be generalized to n-ary trees, n>1, in which each node has at most n successor nodes.

Item 3201 of FIG. 32 illustrates the complete binary tree of order 1. Items 3202, 3203, and 3204 illustrate complete binary trees of order 2, 3, and 4 respectively. A node count for each iterative level in generating a complete binary tree is listed for each example and these counts illustrate that there are $2^k$ nodes at level k in the complete binary tree. The node labels illustrated in FIG. 32 correspond to labeling the root node with the scheduling computer and with labeling each other node with a distinct GP computer. For convenience, call the lower numbered successor node the left successor node and the higher numbered node the right successor node.

The software of the first embodiment of the invention with the following changes constitutes the software of the third embodiment:

The Master Fax Job Scheduling Software, illustrated in FIG. 18, is modified to generate directed binary trees rather than directed binomial trees.

The Node Association Software, illustrated in FIGS. 19a and 19b, is modified to label directed binary trees rather than directed binomial trees.

The Node Pruning Software, illustrated in FIG. 20, is modified to prune directed binary trees rather than directed binomial trees.

The Node Collapsing Software, illustrated in FIG. 21, is modified to collapse directed binary trees rather than directed binomial trees.

As a result of these changes, each computer will first relay instructions to the computer labeling its left successor node, then it will relay instructions to the computer labeling its right successor node, and lastly it will deliver the fax document to its assigned subset of the fax recipients.

The fourth embodiment of the invention is a simplification of the third embodiment in which the directed binary tree to be used for distributing the relay instructions is predefined. That is, the directed binary tree used by the scheduling computer is predefined and pre-labeled with GP computers and stored in the memory of the scheduling computer, and the information needed by any computer to connect to the GP computers labeling its left and right successor nodes is configured into the memory of the computer.

The software of the third embodiment of the invention with the following changes constitutes the software of the fourth embodiment:

The Master Fax Job Scheduling Software, illustrated in FIG. 18, is modified to create a working copy of the pre-defined/pre-labeled directed binary tree.

The Node Association Software, illustrated in FIGS. 19a and 19b, is modified to label the working directed binary tree with the fax delivery assignments.

The Node Pruning Software, illustrated in FIG. 20, is modified to prune the working directed binary tree.

The Node Collapsing Software, illustrated in FIG. 21, is modified to collapse the working directed binary tree rather than an arbitrary directed binary tree.

As can be appreciated from a review of the four embodiments of the exponential distribution trees described, there are a wide variety of types of distribution trees that will quickly deliver the fax or other data set. The enhanced speed is a result of utilizing a distribution tree that has at least two, and preferably many, levels. This exponential distribution involves many GP computers and permits distribution of faxes and other data sets to a massive number of recipients.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. A method of delivering a fax to a group of final recipients, each final recipient having delivery instructions including salutation information and delivery information, from a scheduling computer via a plurality of general purpose (GP) computers, the method comprising:

a. providing a data base of cost and speed for communication between the computers and the fax recipients;

b. partitioning the group of fax recipients into a plurality of final sets for delivery by said GP computers c. assigning each delivery set to a GP computer for delivery of the fax to the final recipients and assigning paths from the scheduling computer to the delivery GP computer via a plurality of GP computers, utilizing the data base of cost and speed to determine the partitioning and paths;

d. determining the number of recipients and assigning a number of recipients per GP delivery computer;

e. for each recipient minimizing the cost based on the data base of cost information and assigning that particular recipient to a delivery GP computer for eventual delivery to said particular recipient;

f. counting the number of deliveries assigned to each GP computer;

g. determining if the number of deliveries assigned to each GP computer is level, and if the number is level increasing the level by an increment of one, and if the number is not level, selecting the GP computer and the recipient to level the number of deliveries assigned to each GP computer; and h. continuing the above steps (d) through (g) until all fax recipients are assigned;

i. communicating from the scheduling computer to one of the GP computers a broadcasting job comprising the fax to be delivered, the distribution instructions for said one GP computer and the other GP computers in its assigned paths, and said delivery instructions for said final recipients including said salutation information and said delivery information;

i. communicating from said one GP computer to a second GP computer a portion of said broadcasting job received from the scheduling computer, said portion of said broadcasting job comprising the fax to be delivered, the distribution instructions for said second GP computer and any other GP computers in its assigned paths, and said delivery instructions including said salutation information and said delivery information for each delivery GP computer assigned to deliver faxes to the final recipients; and k. delivering the fax from the GP computers assigned to deliver faxes, said delivery GP computers utilizing said salutation information and the delivery information received from the scheduling computer via the path of GP computers.

2. A method according to claim 1 and further including the step of each said delivery GP computer communicating to the scheduling computer information concerning the success or failure of the delivery of the fax to each said recipient assigned to it.

3. A method according to claim 1 and further including, prior to the scheduling computer delivering any fax job, determining to the status of each GP computer including whether or not the GP computer is operational and not overloaded.

4. An apparatus for delivering a fax to a group of recipients each having delivery instructions including salutation information and delivery information, each recipient having apparatus for receiving the fax, the apparatus comprising:

at least one scheduling computer having memory, said memory including delivery instructions for each recipient, said memory having a computer program for partitioning the group of recipients into a plurality of sets for final delivery;

a plurality of general purpose computers (GP), each GP computer having a communications mechanism for communicating with another GP computer and said fax receiving apparatus;

said scheduling computer assigning each final delivery set to a GP computer for delivery to its assigned recipients, said scheduling computer defining paths for communication of the fax via a plurality of GP computers, said scheduling computer communicating to one of said GP computers a broadcasting job comprising the fax to be delivered, the distribution instructions of said one GP computer and the other GP computers in its assigned path including instructions for portioning said broadcasting job, and said delivery instructions including the salutation information and the delivery information for each said GP computer in its path assigned to deliver faxes;

said one GP computer communicating to a second GP computer a portion of said broadcasting job received from the scheduling computer utilizing said portioning instructions, said portion of said broadcasting job comprising the fax to be delivered, the distribution instructions for the second GP computer and any other GP computers in its assigned path and said portioning instructions, and said delivery instructions including the salutation information and the delivery information for each GP computer assigned to deliver faxes;

said GP computers utilizing said salutation information and the delivery information received from the scheduling computer via the path of GP computers to deliver the fax to each recipient.

5. A method of delivering a data set to a group of recipients, each recipient having delivery information, said data set being distributed and delivered by a plurality of general purpose (GP) computers from a scheduling computer, the method comprising:

defining paths for communicating the data set via a plurality of said GP computers to deliver said data set to a recipient;

communicating from the scheduling computer to one of the GP computers a broadcasting job comprising the data set to be delivered, the distribution instructions for said one GP computer and the other GP computers in its assigned path, said distribution instructions including instructions for portioning the broadcasting job;

communicating from said one GP computer to a second GP computer a portion of said broadcasting job received by said one GP computer from the scheduling computer, said portion of said broadcasting job comprising the data set to be delivered and distribution instructions for said second GP computer and any other GP computers in its assigned path including further portioning instructions; and delivering the data set from the GP computers to a recipient.

6. A method according to claim 5 wherein portions of the broadcast job are delivered to said GP computers in an exponential distribution comprising a tree having at least two levels and said second GP computer at a second level delivers said portion of said broadcast job received from said one GP computer to a third GP computer located at a third level of said tree.

7. A method according to claim 6 wherein said scheduling computer delivers another portion of said broadcast job to a fourth GP computer at a first level, and wherein said fourth GP computer delivers a portion of the broadcast job received from the scheduling computer to a fifth GP computer at said second level of said tree.

8. A method according to claim 7 wherein said scheduling computer sends out portions of said broadcast job to a different GP computer through a plurality of levels, with each continuing level, the broadcast job being delivered in portions to an increasing number of GP computers, said GP computers in turn, distributing still another portion of said broadcast job to other GP computers, said broadcast job being divided up into a multitude of portions to be distributed and delivered by said GP computers.

9. A method of delivering a data set to a group of recipients, each recipient having delivery information, said data sets being distributed and delivered by a plurality of general purpose (GP) computers, the method comprising:

determining the GP computers that are available to assist in delivery of the data sets;

utilizing an exponential progression having at least two levels for distributing a broadcasting job comprising said data set to be delivered and the distribution instructions for delivery of said data set through a path of GP computers, including instructions for portioning the broadcasting job at each level of the exponential progression, dividing said broadcasting job at each level according to the portioning instructions received from the previous level, said distribution of said data sets and the eventually delivery of said data sets being divided among said GP computers to enhance the speed of delivery of said data sets.

10. A method according to claim 9 wherein said exponential geometric progression is a binomial expansion.

11. A method according to claim 9 wherein said geometric progression is a binary expansion.

12. A method of telephonically delivering a fax to a group of final recipients, each final recipient having final delivery instructions including salutation information and delivery information, from a scheduling computer via a plurality of general purpose (GP) computers over a telephone network, the method comprising:

a. providing a telephonic connection among said GP computers to permit any GP computer to connect and disconnect with other GP computers;

b. partitioning the group of fax recipients into a plurality of final sets for delivery by said GP computers;

c. assigning each delivery set to a delivery GP computer for delivery to the final recipients and assigning paths from the scheduling computer to the delivery computer via a plurality of GP computers;

d. communicating from the scheduling computer to one of the GP computers a broadcasting job comprising the fax to be delivered, the distribution instructions for said one GP computer and the other GP computers in its assigned paths, said distribution instructions including instructions for portioning the broadcasting job, and said delivery instructions for said final recipients including said final delivery instructions;

e. communicating telephonically from said one GP computer to a second GP computer at a first level a first portion of said broadcasting job received from the scheduling computer, said first portion of said broadcasting job comprising the fax to be delivered, the distribution instructions for said second GP computer and any other GP computers in its assigned paths including said portioning instructions, and said final delivery instructions including said salutation information and said delivery information for each delivery GP computer assigned to deliver faxes to the final recipients, and then disconnecting the telephonic communication between said one GP computer and said second GP computer;

f. communicating telephonically from said one GP computer to a third GP computer at a second level a second portion of said broadcasting job and then disconnecting the telephonic communication between said one GP computer and said third GP computer; and g. delivering the fax from the GP computers assigned to deliver faxes, said delivery GP computer utilizing said salutation information and the delivery information received from the scheduling computer via the path of GP computers.

13. A method according to claim 12 and further including:

communicating telephonically from said second GP computer to a fourth GP computer at said second level a subportion of said first portion of said broadcasting job and then disconnecting the telephonic communication between said second GP computer and said fourth GP computer.

14. A method according to claim 13 and further including:

communicating from said second GP computer to still another GP computer at a third level a sub-subportion of said first portion of the broadcasting job and then disconnecting the telephonic communication between said second GP computer and said still another GP computer.

15. A method according to claim 14 wherein the method of steps of claim 15 are reiterated to at least five levels.

* * * * *